(12) United States Patent
Van Eijndhoven et al.

(10) Patent No.: US 9,081,928 B2
(45) Date of Patent: Jul. 14, 2015

(54) EMBEDDED SYSTEM DEVELOPMENT

(75) Inventors: Jos Van Eijndhoven, Waalre (NL);
Tommy Kamps, Den Bosch (NL);
Maurice Kastelijn, Eindhoven (NL);
Martijn Rutten, Eindhoven (NL); Paul Stravers, Eindhoven (NL)

(73) Assignee: Vector Fabrics, B.V., Eindhoven (NL)

( * ) Notice: Subject to any disclaimer, the term of this patent is extended or adjusted under 35 U.S.C. 154(b) by 0 days.

(21) Appl. No.: 13/375,754

(22) PCT Filed: Jun. 1, 2010

(86) PCT No.: PCT/NL2010/050330
§ 371 (c)(1),
(2), (4) Date: Feb. 20, 2012

(87) PCT Pub. No.: WO2010/140883
PCT Pub. Date: Dec. 9, 2010

(65) Prior Publication Data
US 2012/0144376 A1    Jun. 7, 2012

(30) Foreign Application Priority Data

Jun. 2, 2009 (NL) .................................. 2002951
Jan. 8, 2010 (NL) .................................. 2004078

(51) Int. Cl.
*G06F 9/45* (2006.01)
*G06F 17/50* (2006.01)

(52) U.S. Cl.
CPC .............. *G06F 17/505* (2013.01); *G06F 8/456* (2013.01); *G06F 2217/86* (2013.01)

(58) Field of Classification Search
CPC .................................................... G06F 17/505
USPC ....................................................... 717/146
See application file for complete search history.

(56) References Cited

U.S. PATENT DOCUMENTS 7,418,583 B2 *   8/2008   Shibayama et al. .......... 712/228
7,694,253 B2 *   4/2010   Campos et al. ............... 716/106
(Continued)

FOREIGN PATENT DOCUMENTS

EP    1569104 A2 *   8/2005

OTHER PUBLICATIONS

International Search Report Dated February 7, 2011, for International Patent Application No. PCT/NL2010/050330 Filed Jun. 1, 2010; 3 Pages.

(Continued)

*Primary Examiner* — Li B Zhen
*Assistant Examiner* — Sen Chen
(74) *Attorney, Agent, or Firm* — Constellation Law Group PLLC

(57) ABSTRACT

A computer-implemented method of automatically generating an embedded system on the basis of an original computer program, comprising analyzing the original computer program, comprising a step of compiling the original computer program into an executable to obtain data flow graphs with static data dependencies and a step of executing the executable using test data to provide dynamic data dependencies as communication patterns between load and store operations of the original computer program, and a step of transforming the original computer program into an intermediary computer program that exhibits multi-threaded parallelism with inter-thread communication, which comprises identifying at least one static and/or dynamic data dependency that crosses a thread boundary and converting said data dependency into a buffered communication channel with read/write access.

15 Claims, 34 Drawing Sheets

(56) References Cited

U.S. PATENT DOCUMENTS

| | | | |
|---|---|---|---|
| 8,161,502 B2* | 4/2012 | Peng et al. | 719/330 |
| 2004/0103410 A1* | 5/2004 | Sakai | 717/146 |
| 2010/0042981 A1* | 2/2010 | Dreyer et al. | 717/146 |

OTHER PUBLICATIONS

Written Opinion Dated February 7, 2011, for International Patent Application No. PCT/NL2010/050330 Filed Jun. 1, 2010; 5 Pages.

Girkar et al. (Mar. 1, 1992) "Automatic Extraction of Functional Parallelism From Ordinary Programs"; IEEE Transactions on Parallel and Distributed Systems; IEEE Service Center; Los Alamitos, CA, USA; 3(2):166-178.

Kahn, Giles (1974) "The Semantics of a Simple Language for Parallel Programming"; Information Processing; North-Holland Publishing Company; 74:471-475.

Janssen et al. (1996) "Controlled Node Splitting"; Delft University of Technology; 12 Pages.

* cited by examiner

997

```c
#include <stdio.h>
#include "types.h"
include <stdlib.h> main()
{
  FILE *rgb_fp;
  FILE *yuv_fp;
  int x_sz = 64;
  int y_sz = 48;
  int sz = x_sz * y_sz;
  int8_t *rp = malloc(sz);
  int8_t *gp = malloc(sz);
  int8_t *bp = malloc(sz);
  int8_t *yp = malloc(sz);
  int8_t *up = malloc(sz);
  int8_t *vp = malloc(sz);
  int n=0;
  rgb_fp = fopen("pict.rgb", "r");
  if (rgb_fp == NULL)
  {
     perror("Error: cannot read pict.rgb");
     exit(1);
  }
  yuv_fp = fopen("pict.yuv", "w");
  if (yuv_fp == NULL)
  {
     perror("Error: cannot write pict.yuv");
     exit(1);
  }
  while (read_rgb(rgb_fp, sz, rp, gp, bp) == sz)
  {
    printf("Converting picture #%d\n", ++n);
    rgb2yuv(x_sz, y_sz, rp, gp, bp, yp, up, vp);
    write_yuv(yuv_fp, sz, yp, up, vp);
  }
  fclose(rgb_fp);
  fclose(yuv_fp);
  return 0;
} int read_rgb(FILE *fp, int sz,
             int8_t *rp, int8_t *gp, int8_t *bp)
{
  int i;
  for (i = 0; i < sz; ++i)
  {
    int c;
    if ((c = fgetc(fp)) == EOF) return i;
    *rp++ = c;
    if ((c = fgetc(fp)) == EOF) return i;
    *gp++ = c;
    if ((c = fgetc(fp)) == EOF) return i;
    *bp++ = c;
  }
  return i;
} int write_yuv(FILE *fp, int sz,
              int8_t *yp, int8_t *up, int8_t *vp)
{
  int i;
  for (i = 0; i < sz; ++i)
  {
    int c;
    c = *yp++;
    if (fputc(c,fp) == EOF) return i;
    c = *up++;
    if (fputc(c,fp) == EOF) return i;
    c = *vp++;
    if (fputc(c,fp) == EOF) return i;
  }
  return i;
}
```

```
#include "types.h"
include <stdint.h> void rgb2yuv(int x_sz, int y_sz,
             int8_t *rp, int8_t *gp, int8_t *bp,
             int8_t *yp, int8_t *up, int8_t *vp)
{
    int i;
    int i_max = x_sz * y_sz;
    for (i = 0; i < i_max; ++i)
    {
        int16_t y,u,v;
        int16_t r,g,b;
        /* load the RGB pixel */
        r = *rp++;
        g = *gp++;
        b = *bp++;
        /* perform color space transformation */
        y = 66 * r + 129 * g + 25 * b;
        u = -38 * r - 74 * g + 112 * b;
        v = 112 * r - 94 * g - 18 * b;
        /* round to 8 bit */
        y = (y + 128) >> 8;
        u = (u + 128) >> 8;
        v = (v + 128) >> 8;
        /* add bias and store in YUV memory */
        *yp++ = y +16;      /* shift to [16,235] range */
        *up++ = u +128;     /* shift to [16,239] range */
        *vp++ = v +128;     /* shift to [16,239] range */
    }
}
```

```
.file◌    "rgb2yuv.c"
.source◌  "src/rgb2yuv.c"
.section◌       .text.rgb2yuv, "ax",@progbits
.align◌ 4
.global◌ $rgb2yuv
.type◌   $rgb2yuv, @function
$rgb2yuv:
    enter @value, @args u0/sw u1/sw a0/p/sb a1/p/sb a2/p/sb↵
    a3/p/sb a4/p/sb a5/p/sb, @varargs , @no_frame, @locals 0 " ", @outargs 0, @save
    [2] u13/p/sb = [1]mov [2]a0/p/sb
    [3] u12/p/sb = [1]mov [3]a1/p/sb
    [4] u11/p/sb = [1]mov [4]a2/p/sb
    [5] u10/p/sb = [1]mov [5]a3/p/sb
    [6] u9/p/sb = [1]mov [6]a4/p/sb
    [7] u8/p/sb = [1]mov [7]a5/p/sb
    [9] u7/sw = [8]mul [10]u1/sw, [11]u0/sw
    [12] u6/sw = [8]mov 0
    jmp $.L2
$.L3:
    a1 = [13]mov [2]u13/p/sb
    a0 = [13]add a1, [12]u6/sw
    [14]u2/sw = [13]lds.b a0
    a1 = [13]mov [3]u12/p/sb
    a0 = [13]add a1, [12]u6/sw
    [15]u4/sw = [13]lds.b a0
    a1 = [13]mov [4]u11/p/sb
    a0 = [13]add a1, [12]u6/sw
    [16]u5/sw = [13]lds.b a0
    u3 = [17]mul [15]u4/sw, 129
    u0 = [17]mul [14]u2/sw, 66
    u3 = [17]add.h u3, u0
    u0 = [17]mul [16]u5/sw, 25
    u3 = [17]add.h u3, u0
    u3 = [17]cvt.sw.sh u3
    u3 = [17]add u3, 128
    u0 = [18]mul [16]u5/sw, 112
    u1 = [18]mul [14]u2/sw, -38
    u0 = [18]add.h u0, u1
    u1 = [18]mul [15]u4/sw, 74
    u0 = [18]sub.h u0, u1
    u0 = [18]cvt.sw.sh u0
    u0 = [18]add u0, 128 u2 = [19]mul [14]u2/sw, 112
    u4 = [19]mul [15]u4/sw, 94
    u2 = [19]sub.h u2, u4
    u5 = [19]mul [16]u5/sw, 18
    u2 = [19]sub.h u2, u5
    u2 = [19]cvt.sw.sh u2
    u2 = [19]add u2, 128
    a1 = [20]mov [5]u10/p/sb
    a0 = [20]add a1, [12]u6/sw
    [21]u3/sw = [20]shiftr u3, 8
    u3 = [20]add.b [21]u3/sw, 16
    [20]st.b a0, u3
    a1 = [22]mov [6]u9/p/sb
    a0 = [22]add a1, [12]u6/sw
    [23]u0/sw = [22]shiftr u0, 8
    u0 = [22]add.b [23]u0/sw, -128
    [22]st.b a0, u0
    a1 = [24]mov [7]u8/p/sb
    a0 = [24]add a1, [12]u6/sw
    [25]u2/sw = [24]shiftr u2, 8
    u2 = [24]add.b [25]u2/sw, -128
    [24]st.b a0, u2
    [12]u6/sw = [26]add [12]u6/sw, 1
```

FIG. 6-1

$. L2:
```
g0 = [26]cmpge [12]u6/sw, [9]u7/sw
if (!g0) [26]jmp $.L3
leave
.size $rgb2yuv, .-$rgb2yuv
.ident "GCG: (GNU) 4.2.2"

.section .vfloc
.long 26
.long 2
.string "src/rgb2yuv.c"
.long 7
.string "@"
.long 1
.byte 0
.long 9
.string "@"
.long 8
.byte 0
.long 10
.string "@"
.long 26
.byte 0
.long 19
.string "@"
.long 13
.byte 0
.long 23
.string "@"
.long 17
.byte 0
.long 24
.string "@"
.long 18
.byte 0
.long 25
.string "@"
.long 19
.byte 0
.long 27
.string "@"
```
```
.long 20
.byte 0
.long 28
.string "@"
.long 22
.byte 0
.long 29
.string "@"
.long 24
.byte 0
.long -1
.string ""
.long 0
.string "D. 2242"
.long 25
.string "D. 2239"
.long 23
.string "D. 2236"
.long 21
.string "D. 2214"
.long 16
.string "D. 2210"
.long 15
.string "D. 2207"
.long 14
.string "i"
```

FIG. 6-2

```
main()
{
    int i = 1;      ⎫
    int s = 0;      ⎬ BB0
                    ⎭
    while (i < 10)  } BB1
    {
        s = s + f(i);   ⎫
        i = i + 1;      ⎬ BB2
                        ⎭
    }
    return 0        } BB3
}
```
FIG. 25(a)
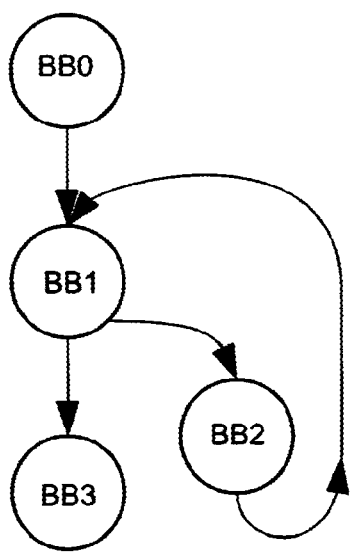
FIG. 25(b)
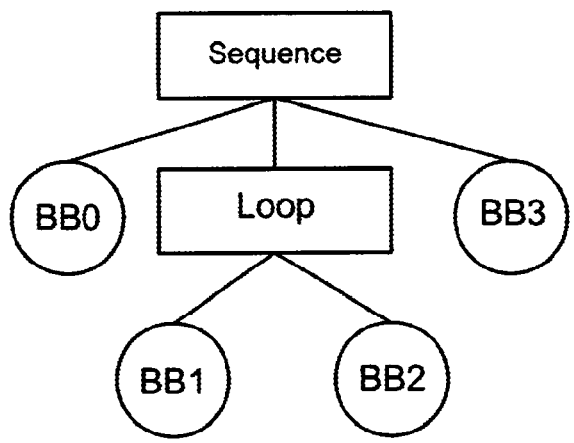
FIG. 25(c)

EMBEDDED SYSTEM DEVELOPMENT

PRIORITY CLAIM

The present application is a national phase application filed pursuant to 35 USC §371 of International Patent Application No. PCT/NL2010/050330, filed 1 Jun. 2010; which application claims the benefit of Dutch Patent Application No. 2002951, filed 2 Jun. 2009, and further claims the benefit of Dutch Patent Application No. 2004078, filed 8 Jan. 2010; all of the foregoing applications are incorporated herein by reference in their entireties.

BACKGROUND

Embedded systems are in widespread use, for example in consumer electronics (televisions, mobile phones, microwaves, cameras, etc.), cars, industrial robots and telecommunication systems. Embedded systems are made up of a combination of special-purpose hardware and software, designed to function optimally for the desired purpose. They differ from personal computer systems because the hardware and software is specifically designed for a limited number of functions, and the system must meet several constraints, for example on response time, power consumption, cost, size, weight or form factor.

The use of embedded systems is growing rapidly, as is their complexity. The design of embedded systems therefore is receiving increased attention, in particular with regards to performance and stability of the systems. An important aspect of embedded system design is determining which function(s) to implement in software and which in hardware. The main advantage of using software is that it requires limited physical space on the circuit board. Using specific hardware on the other hand usually provides a significant speedup for the feature in question. Traditionally, this determination is almost entirely done manually, which is very time consuming. Therefore, only few hardware/software partitioning options can be explored. As a result it is hard to guarantee that an optimal solution has been created that optimally satisfies the design constraints.

Even worse, existing code can often not be reused or requires significant rewrites that take almost as much effort as rewriting the code from scratch for the new platform. This is problematic in particular when the existing code has been tested against the functional requirements, because the newly written or rewritten code needs to be tested again. This is of course a waste of effort.

Partially automated techniques for creating hardware/software combinations do exist but have significant constraints. One constraint in particular is that most of these techniques require the use of "SystemC", which may be thought of as a subset of the well-known C++ programming language that is tailored towards programming embedded systems. Standard C++ constructs can be used together with specific libraries and constructs to ease programming. However, these constructs are limited to what can be expressed using the underlying Register Transfer Level (RTL) language. Thus, they restrict programmers from using arbitrary C++ programming constructs, or from reusing existing code written for other platforms. Other languages, such as CleanC, similarly limit the programming constructs and control flow that can be used.

Again, this also hampers the reuse of existing code. Such code has to be rewritten to conform to the limitations of the chosen language, which may not even be possible in all cases. The resulting code in addition is specific to a certain hardware platform or configuration.

What is desired is a tool that can address the problem of transforming arbitrary software source code into an improved partitioning of specific hardware and software.

European patent application EP1569104A2 discloses a method and system for automatically transforming essentially sequential code into a plurality of codes which are to be executed in parallel to achieve the same or equivalent result to the sequential code. User-defined task boundaries are determined in the input code to thereby define a plurality of tasks. It is then determined if the essentially sequential application code can be separated at least one of said user-defined tasks boundaries and if so at least one code of the plurality of codes for at least one of said tasks is automatically generated. Essentially sequential code can be transformed into pipelined code, in which the pipelined code has at least two processes or tasks, one of said processes or tasks generating/producing information (data) in a first time frame, for use/consumption by another of said processes or tasks in a second (later) time frame. In pipelining, processes using different data can be executed at the same or similar time.

SUMMARY

The invention provides for a tool for transforming software source code into an improved partitioning of specific hardware and software. Such improvements may be found in reduced costs or circuit board space, faster operating or response time or a better choice for specific hardware components. The choices in this partitioning can be made depending on various circumstances, such as hardware restrictions, desired application, response time or cost. Choices may even differ for the same source code, as the same code can be useful in different devices that have different constraints. Preferably the tool is part of a software compiler tool chain. Also preferably the step of analyzing the original computer program comprises generating structural and behavioral program models that provide indications of at least one of: the run time of every function invocation, the run time of every loop body invocation, the number of times each loop body is executed, indications of memory dependencies and indications of streaming dependencies.

In particular, the invention provides for a computer-implemented method of automatically generating an embedded system on the basis of an original computer program, which embedded system provides a parallelized hardware and software implementation of the original computer program, which parallelized implementation satisfies one or more predetermined criteria regarding hardware constraints of the embedded system.

The invention is characterized by a step of analyzing the original computer program, comprising a step of compiling the original computer program into an executable to obtain data flow graphs with static data dependencies and a step of executing the executable using test data to provide dynamic data dependencies as communication patterns between load and store operations of the original computer program, and a step of transforming the original computer program into an intermediary computer program that exhibits multi-threaded parallelism with inter-thread communication, which comprises identifying at least one dynamic data dependency that crosses a thread boundary which dependency comprises a communication pattern that observes ordering relations between loads and stores and converting said dynamic data dependency into a buffered communication channel with read/write access.

An important issue in the generation of embedded systems is to improve the parallel behavior of software that is converted into an embedded hardware/software combination. Known manual parallelization methods easily fail to detect some dynamic data dependencies, which would lead to a multi-threaded program that exhibits hard-to-find run-time behavioral errors. The invention uses a novel, automated combination of static and dynamic data dependency detection to ensure all relevant data dependencies are identified.

The invention advantageously identifies dynamic data dependencies that cross thread boundaries, as such dependencies contribute to suboptimal performance of the embedded system. If such dependencies comprise communication patterns that observe ordering relations between loads and stores, e.g. as a saw tooth pattern or a first-in-first-out pattern, then these dependencies are replaced by buffered communication channels. Buffers have the advantage that they do not introduce inter-thread synchronization points, thus allowing each thread to operate separately. This significantly improves the performance of the embedded system.

More generally, the invention advantageously permits developers to focus on the high-level functional description in languages such as C without requirements for manual editing, translation or tuning of this high-level code. This approach allows the product designer to view the impact of his decisions from an architectural perspective on the final implementation. This is of course where the biggest bang for the buck can be achieved and not at the physical level further down the design flow where optimization takes place on the level of gates or wires.

The invention can work both with FPGAs and dedicated ASICs.

In an embodiment the step of compiling comprises causing the executable to be annotated with extra code fragments that include one or more instructions that output observations regarding the dynamic behavior of the original computer program, in particular regarding loop nesting and loop iteration counts, which observations become part of said communication pattern, and in which the step of converting identified dynamic data dependencies that cross a thread boundary in the intermediary program is done on the basis of the observations that are output by the extra code fragments. In this embodiment, annotations are inserted into the executable that correspond to dynamic behavior of the program. With these annotations a replacement of a data dependency with a buffer becomes a straightforward operation.

In a further event tokens in an annotation stream or alternatively the observations of the previous embodiment are used to decide whether the data dependency fits the ordering requirements of a "distribute loop" parallelization, and only parallelizing the corresponding part of the original computer program if this is the case. By adding loop nesting information, it becomes possible to separately identify loops in the original computer program. This had the advantage that a more specific buffer can be introduced for this type of data dependency. For other data dependencies, e.g. over forward pipeline boundaries, one may implement a streaming channel.

In a further embodiment the communication pattern indicates a data dependency into or out of a parallel loop, which dependency is accommodated by plain variables with repeated dereferencing, and avoiding the buffered channel conversion for this dependency. This improvement avoids the overhead of a buffered channel implementation. Allowing data communication through plain variables leads to a simple low-cost embedded system. The loop nesting information is required to decide for such implementation. The resulting implementation where processes communicate with their environment through shared variables is beyond the mathematical restrictions of the Kahn Process Network model.

A further embodiment comprises executing the step of transforming multiple times, each time varying the number of created threads in the intermediary computer program and the exact locations in the program where the threads are separated from each other to obtain multiple intermediary computer programs, followed by a step of evaluating each of the multiple intermediary computer programs based on at least one evaluation criterion, such as estimated implementation cost or performance of the embedded system, and generating the embedded system from one of the multiple intermediary computer programs that best matches the one or more evaluation criterion. Preferably the match of one of the multiple intermediary computer programs is at least partially determined from user input.

A yet further embodiment comprises executing the step of analyzing multiple times, each time using different sets of test data to produce different sets of data dependencies, followed by a step of merging each set of identified data dependencies into a single set of data dependencies, where this single set is structured as had it resulted from a single program execution on a the combined test data. By execution on different input data, more complete program coverage can be obtained, reducing the risk of undiscovered data dependencies. One example is the execution of a video decoding program on different video streams originating from different encoders or with different image resolutions. Preferably, the multiple executions are executed in parallel, to reduce the needed amount of time. The merging results in a single set of data dependencies as if the dependencies were all processed through a single program execution.

In a further embodiment the analysis process recognizes updates to the available memory space, such as through free( ) and malloc( ) function calls from the C library, and disregards detected dependencies between load/store operations that occur before and after these memory space updates.

This embodiment recognizes that some load and store operations do not need to be replaced with communication buffers. This applies in particular to load and store operations that are separated by memory allocation or freeing operations, e.g. the well-known malloc( ) and free( ) function calls in the C language. By excluding those, needless introductions of buffers and thus needless increase in memory in the embedded system is avoided.

In a further embodiment at least one thread from the intermediary computer program is converted into a dedicated hardware accelerator that performs the thread's functionality in the embedded system operating in parallel to a processor that executes at least one thread of the software implementation. Implementing some of the threads of the parallelized program in a hardware accelerator allows reaching an overall increased processing throughput and/or allows the system to reach its performance requirements with lower energy consumption.

The invention further provides for a system for producing devices with embedded hardware/software solutions that relies on the above mentioned tool.

The invention further provides for computer program products that provide the tool's functionality when executed on a computer.

BRIEF DESCRIPTION OF THE DRAWINGS

The invention will now be described in more detail in conjunction with the figures, in which:

FIGS. 25(a), (b) and (c) show an embodiment of a program view tree.

In the figures, same reference numbers indicate same or similar features.

DETAILED DESCRIPTION

Background: Embedded Systems

Figure 1:
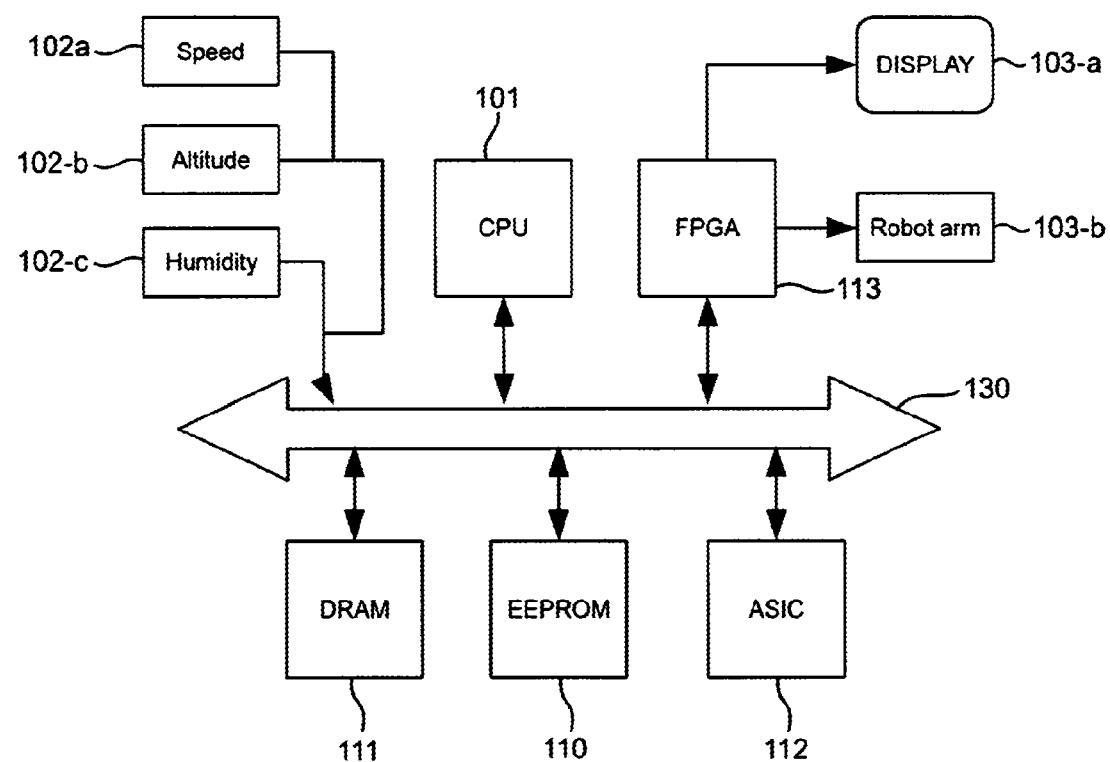
FIG. 1 schematically shows an example embedded system.

FIG. 1 schematically shows an example embedded system. The system in FIG. 1 is used by way of example to show and explain common hardware, software and design constructs in embedded systems. It by no means limits the usefulness or scope of the invention: the invention can be used for any type of embedded system for any purpose. The system is built around a central processing unit CPU 101. Many CPU architectures can be used in embedded systems. Popular choices are RISC and VLIW-based CPU architectures.

The CPU receives input from sensors 102-a, 102-b, 102-c, which may provide digital input that can be used directly, or analog input that needs to be converted using an AD convertor. By way of example, three sensors are shown: sensor 102-a to provide input on speed, sensor 102-b to provide input on altitude and sensor 102-c to provide input on humidity. The input is transformed into output signals that e.g. may control an actuator which controls a mechanical arm 103-b or show human-readable output on a display screen 103-a. The display screen 103-a may be provided with its own embedded system or processor to transform input signals into output. To facilitate communication between all the different components, a bus 130 is provided.

Embedded systems, as noted above, are made up of a combination of special-purpose hardware and software, designed to function optimally for a certain purpose. Embedded systems are, as the name suggests, embedded into larger products such as televisions, radios, mobile phones, DVD players and other consumer electronics, but also in other apparatus such as industrial robots, cars or airplanes.

The hardware used in a particular embedded system broadly falls into two categories: special-purpose chips and other hardware that provides specific functions ("accelerators") and more general-purpose chips that are capable of executing software that provides specific functionality. The embedded software, sometimes referred to as firmware, is shown here as stored in an EEPROM 110. Many other types of memory chips are available, for example read-only memories (ROM), programmable ROM (PROM), erasable programmable ROM (EPROM), flash memory and non-volatile random access memories (non-volatile RAM). A dynamic random access memory DRAM 111 is provided to permit temporary storage of data.

In addition, an FPGA 113 and an ASIC 112 are shown that are both designed to include many hardware components that otherwise would have to be included separately on the printed circuit board. A Field Programmable Gate Array (FPGA) is a semiconductor device containing programmable logic blocks and interconnects. The FPGA can be programmed and reprogrammed at any time, hence the name. This provides the use of FPGAs an advantage over Application-Specific Integrated Circuits (ASICs) when designing prototypes or small runs. ASICs on the other hand are more economical to produce in large numbers, and typically operate at greater speed than an FPGA with the same functionality. For the purposes of the present invention, whether to use an FPGA or ASIC (or both) to provide certain functionality is usually not relevant.

The embedded system shown in FIG. 1 includes the CPU 101 as a separate component but typically it is more cost-effective to integrate the CPU 101 in the FPGA 113 or ASIC 112, as this reduces the number of chips in the embedded system. Also, the invention presented here is capable of creating embedded systems that include a multitude of CPUs and accelerators that are all operating concurrently.

Embedded System Design

The goal of embedded system design is to come up with an embedded system that provides the most optimal division of functionality between software and hardware. What is "optimal" depends on many factors, such as the maximum price for the unit, the available space in the device's encasing, desired operating speed, real-time requirements, safety regulations or availability of suitable hardware accelerators.

Designing embedded systems requires the use of specific tools, collectively often referred to as a tool chain. A tool chain is a collection of software tools which are used to develop (embedded) software, from the writing of code to the production of the final and building of the embedded software and/or hardware descriptions in e.g. VHDL. The tools in a tool chain typically include compiler front ends and back ends, linkers, libraries, debuggers, preprocessors and testing tools. The actual production of the hardware that corresponds to the generated hardware description, as well as the loading of the firmware or embedded software onto the hardware, is usually done elsewhere and is considered to be out of the scope of this document.

The invention provides for an automated transformation of such a functional specification into a hardware-level representation and consequently into a complete design of an embedded system which has an improved partitioning of specific hardware and software. Such improvements may be found in reduced costs or circuit board space, faster operating or response time or a better choice for specific hardware components.

The design of embedded system starts with a functional specification or prototype of the intended functionality of the system. This specification is written in a high-level programming language such as C, C++ or Java. This permits testing and verification of the specification in a simulation or test bench. Subsequently this specification needs to be transformed from a high-level, sequential representation into a new, lower-level representation that takes the concurrency and other aspects of the embedded system into account. This has the advantage that the tested and verified specification is transformed in a predictable way, which ensures (to the extent possible) that the resulting lower-level representation will conform to the same requirements as the high-level specification.

Overview of the Invention

Figure 2:
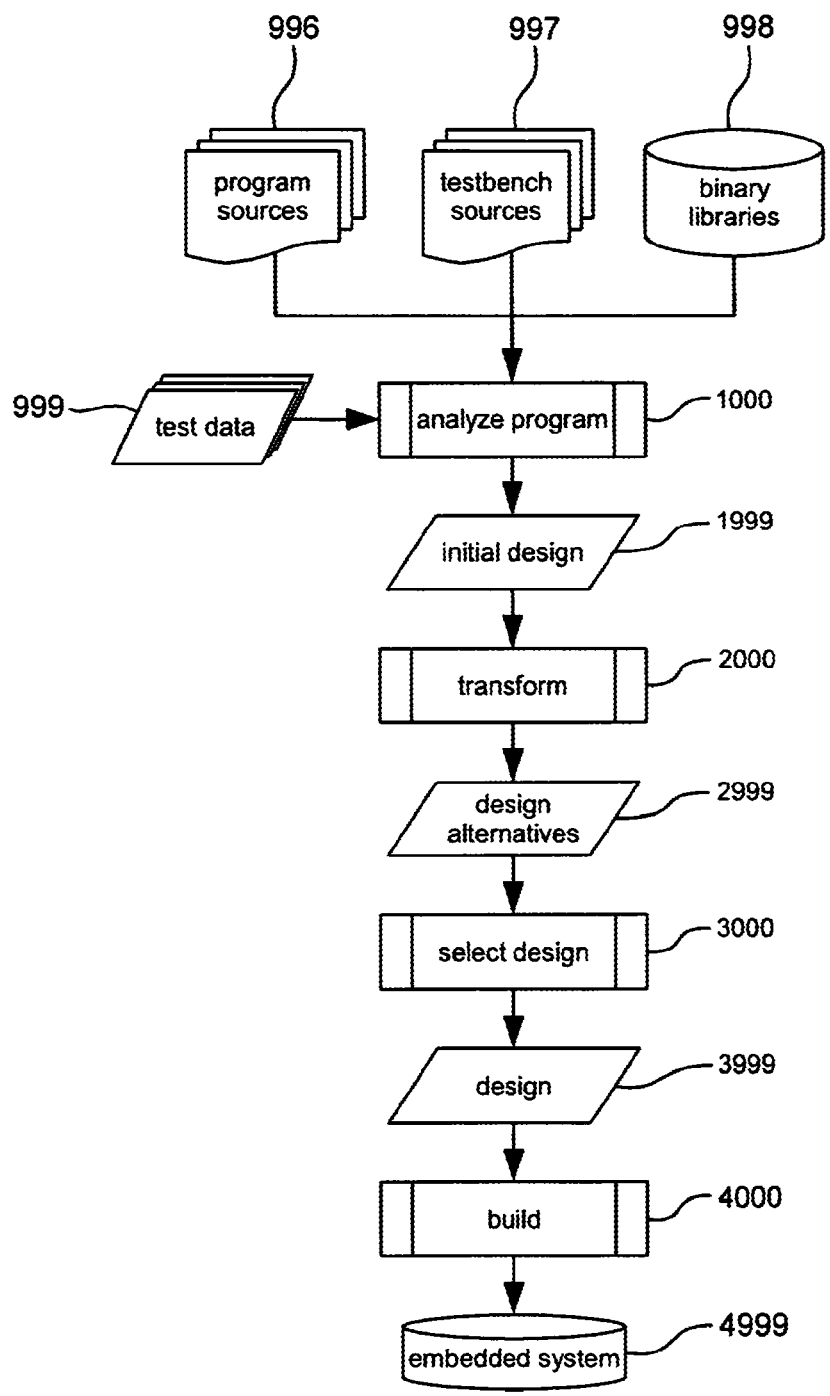
FIG. 2 schematically shows a high-level flowchart of the functionality provided by the invention.

FIG. 2 schematically shows a high-level flowchart of the functionality provided by the invention. Below, this functionality is referred to as a tool chain. Parts of this tool chain may be based on generally available tool chains such as the open source GNU Compiler Collection (gcc) tool chain whose frontend provides useful functionality in the compilation process 1100. For the sake of clarity, the tool's functionality is described by reference to the steps undertaken by a programmer using the tool. The tool implements four steps: analysis 1000, transformation 2000, selection 3000 and build 4000, which will be elaborated upon below. Generally speaking, user-provided program sources 996, testbench sources 997 and libraries 998 are transformed and processed in various ways so as to obtain an embedded system 4999. It is assumed that a programmer has previously prepared the functional specification in the high-level programming language as above.

In the analysis step 1000, the program source 996 is subjected to static and dynamic program analysis to obtain structural and behavioral program models. These models are used in the transformation step 2000 to derive a number of so-called design alternatives 2999 that satisfy the design criteria. In the selection step 3000 the design alternatives 2999 are presented for comparison to allow for user selection of the most optimal design. In the build step 4000 the selected design is mapped to a combination of software and hardware that represents the desired embedded system 4999. These steps are discussed below in more detail.

Program Analysis Process

Figure 3:
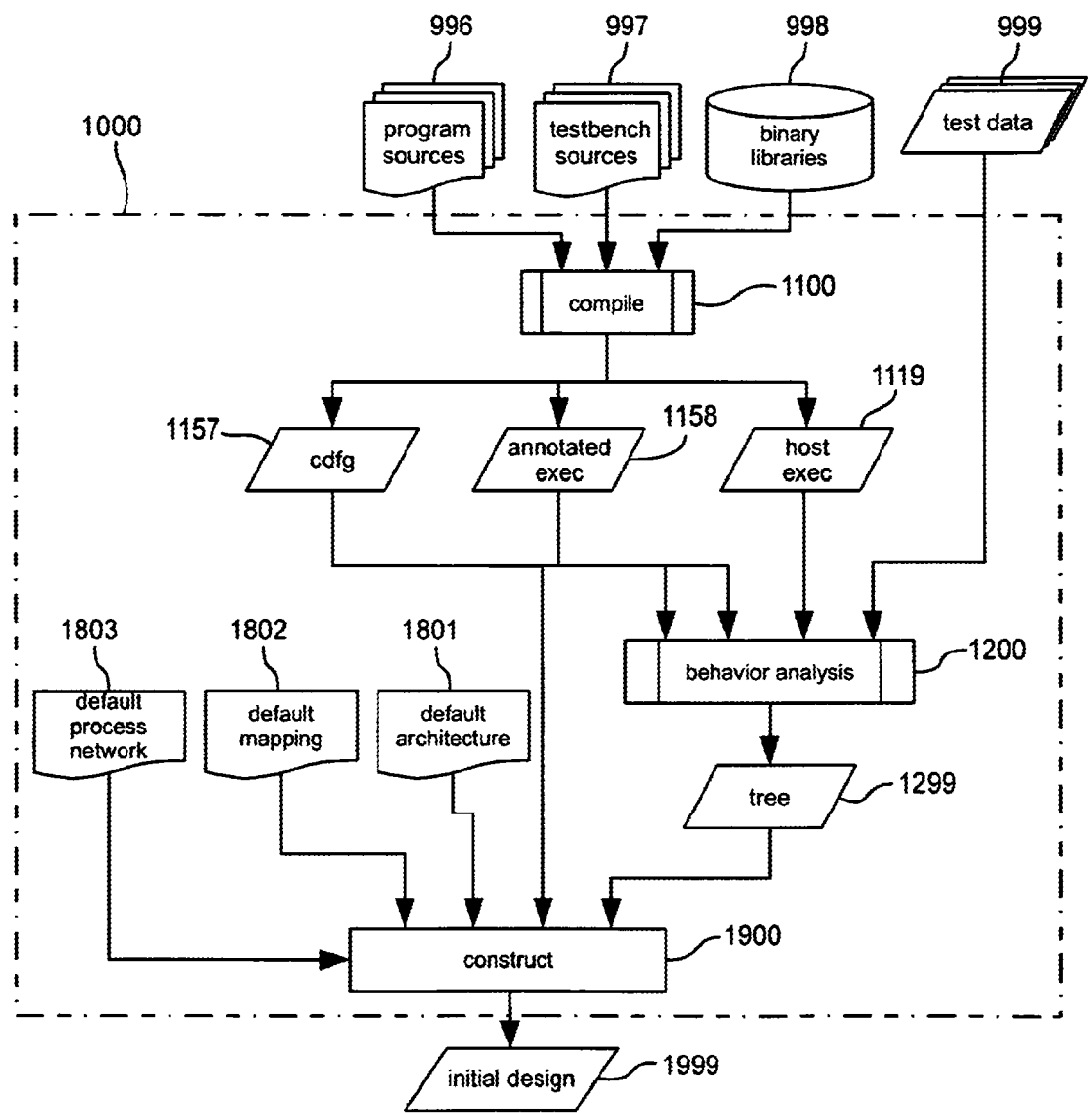
FIG. 3 shows a preferred embodiment of the program analysis process of the invention.
Figure 5:
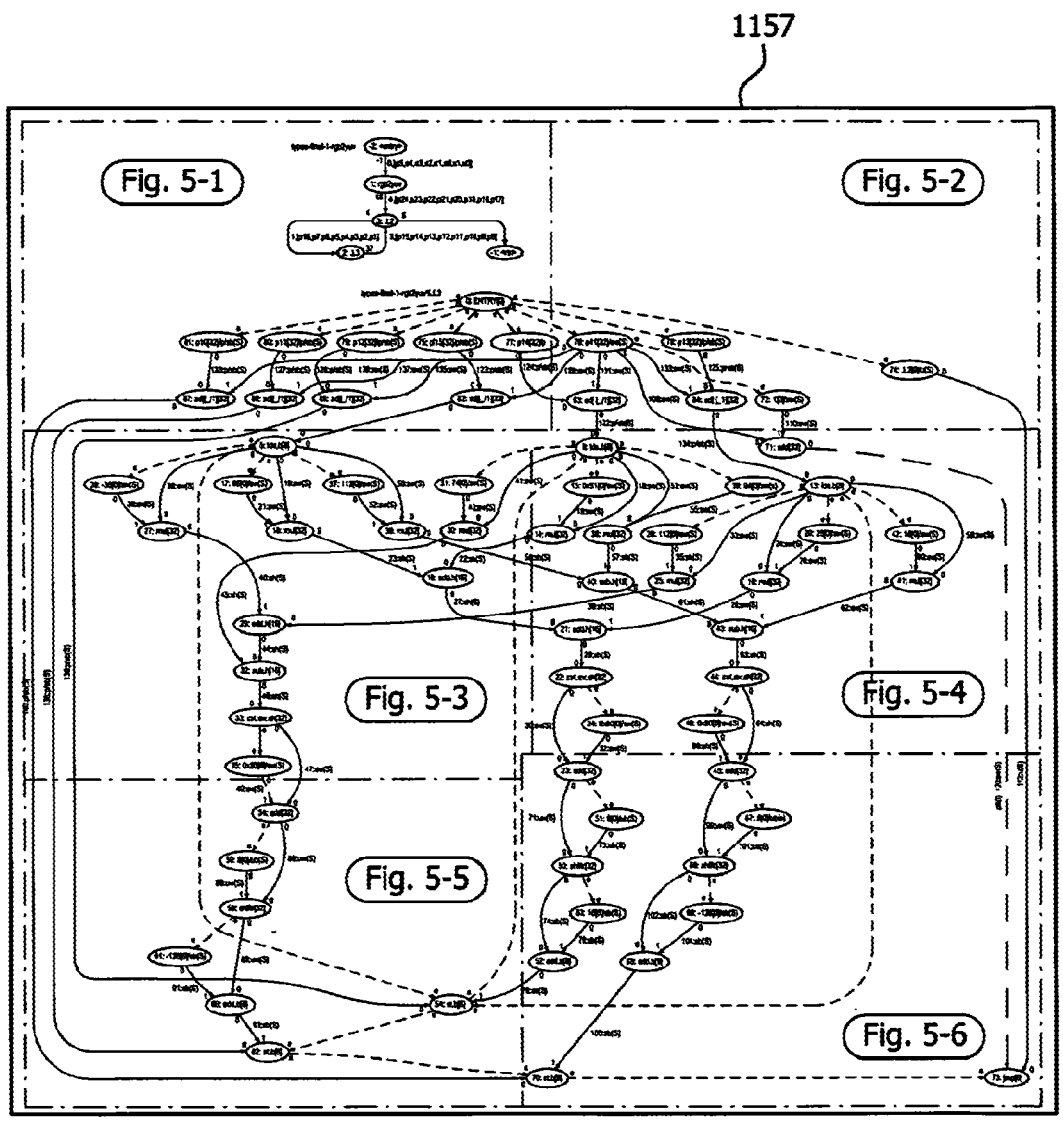
FIG. 5 shows an exemplary sample control-dataflow graph (CDFG) corresponding to the sample program source of FIG. 4.
Figures 1, 5:
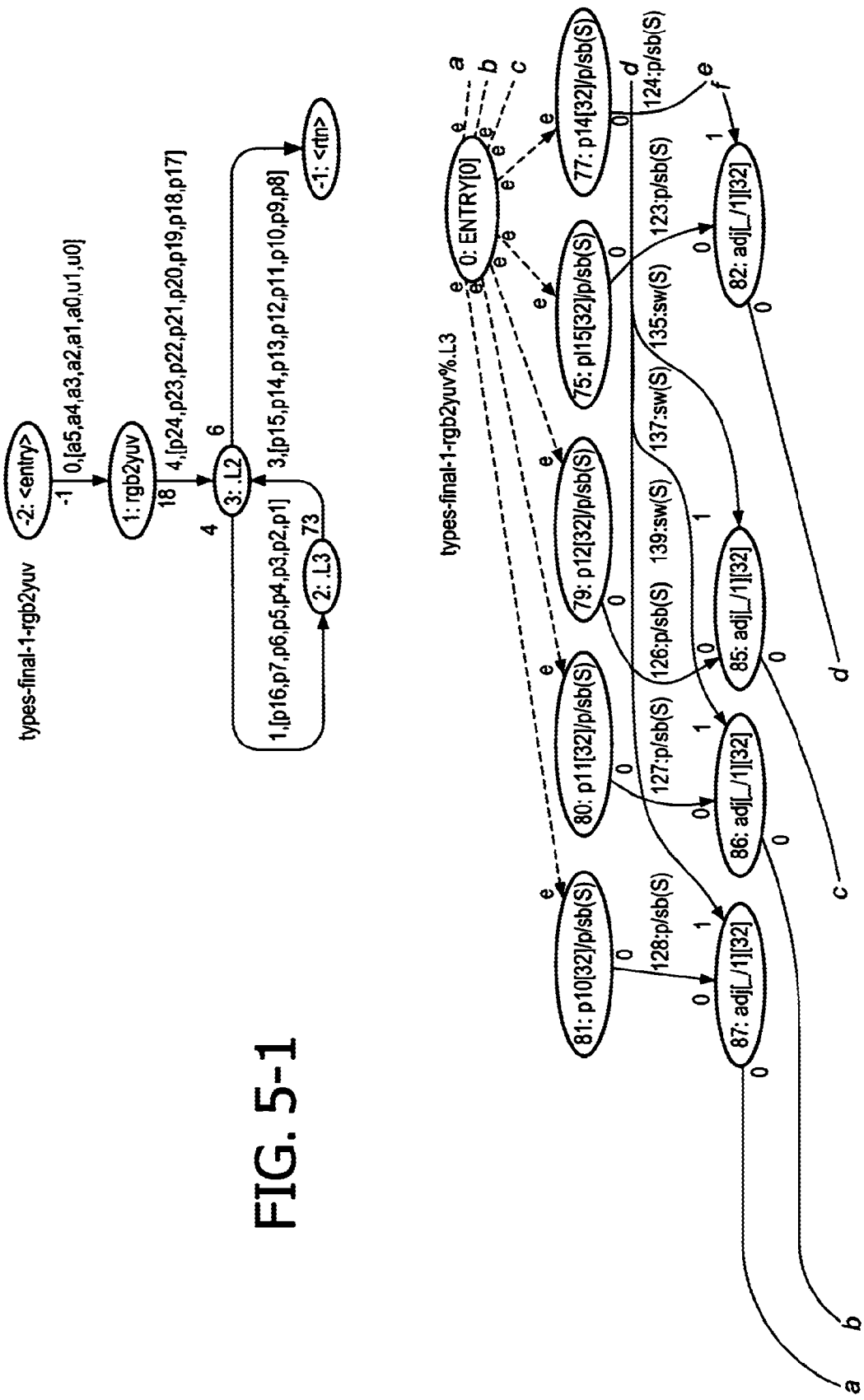
Figures 2, 5:
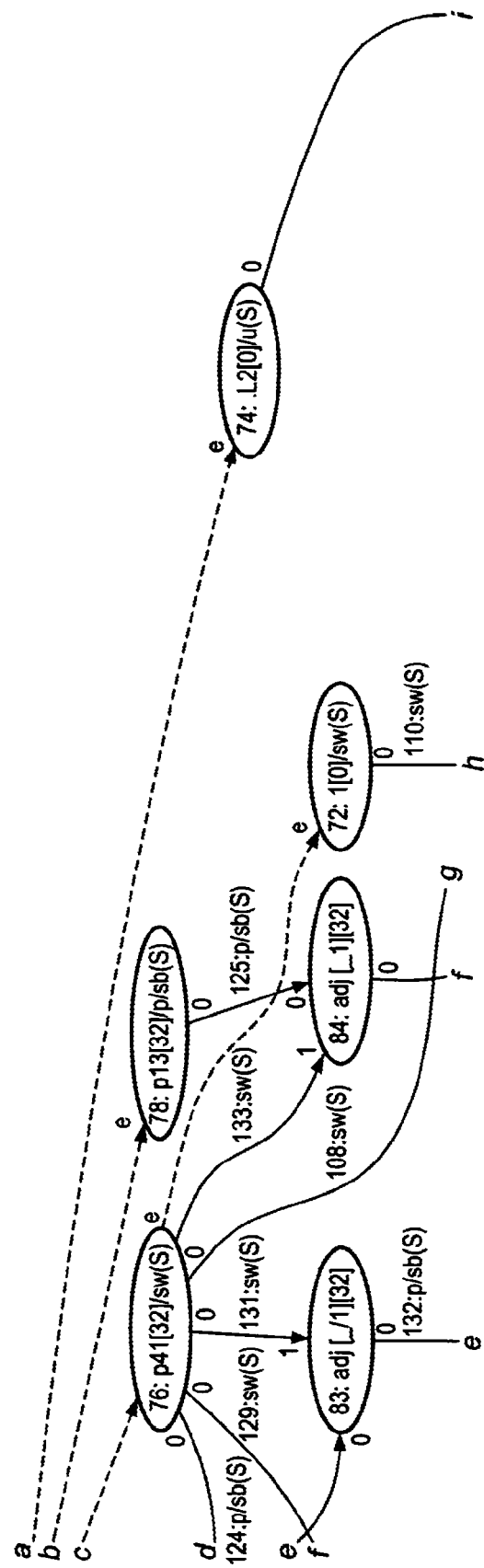
Figures 3, 5:
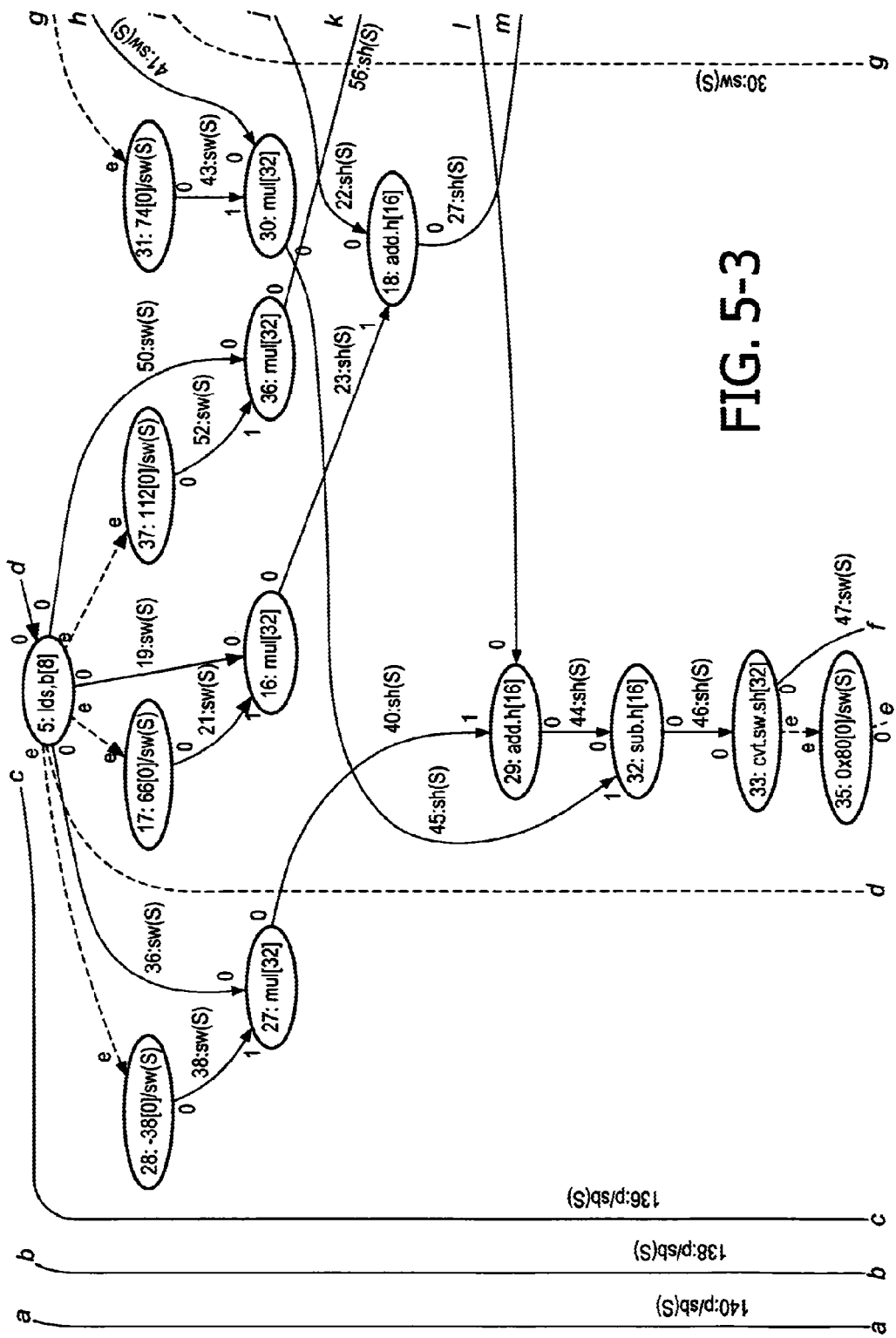
Figures 4, 5:
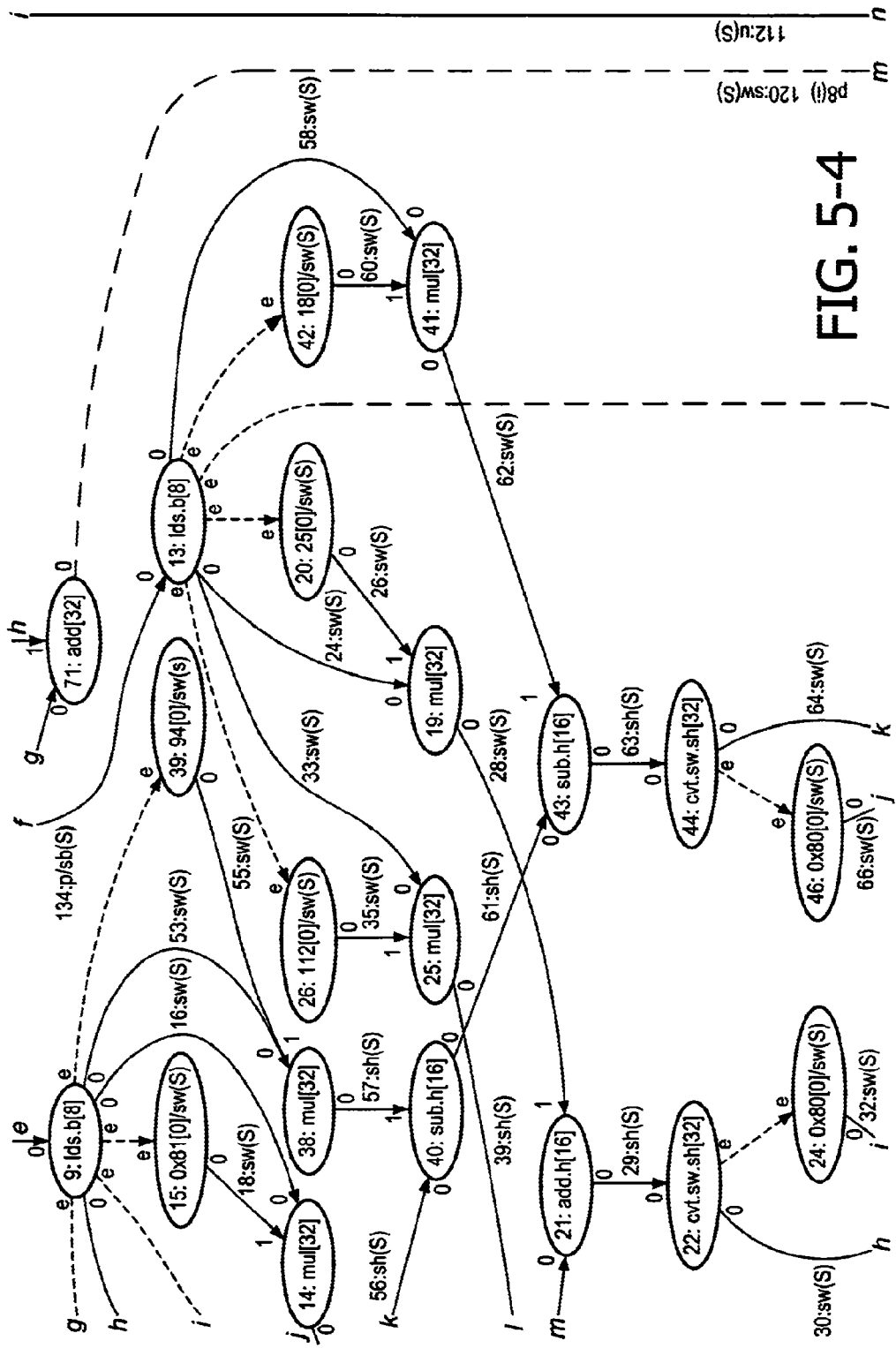
FIG. 4 shows a sample program source and test bench source to illustrate input to be processed by the invention.
Figure 5:
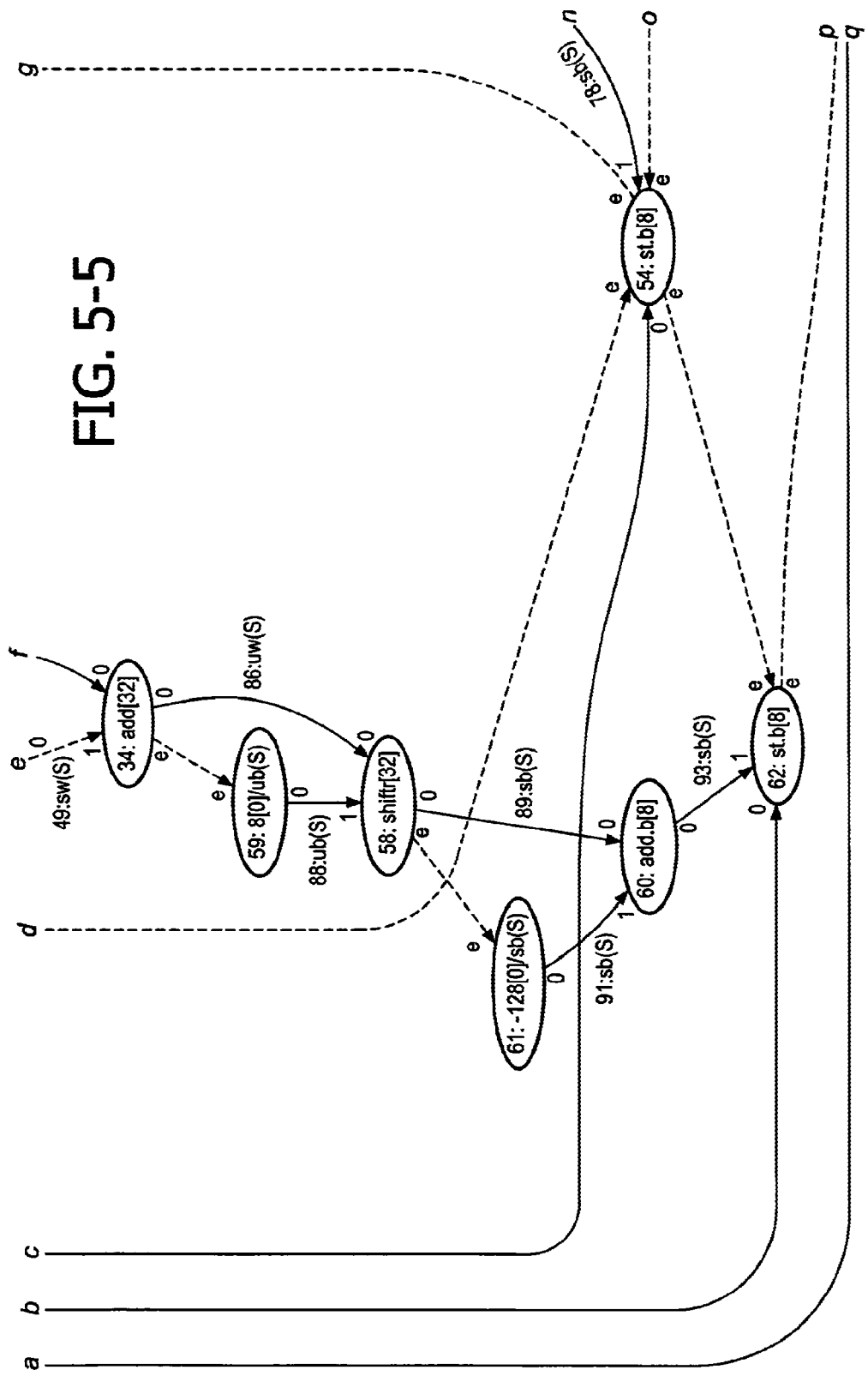

FIG. 3 shows a preferred embodiment of the program analysis process 1000 according to the present invention. In this process, the program sources 996, test bench sources 997 and libraries 998 are compiled 1100 and combined with test data 999 to produce the initial design 1999. This initial design 1999 will be used as a starting point for transformation process 2000 which produces multiple design alternatives 2999. For illustrative purposes FIG. 4 shows a sample program source 996 and test bench source 997. These sources are written in the C language, but any other high-level programming language may be used as well.

Figures 5, 6:
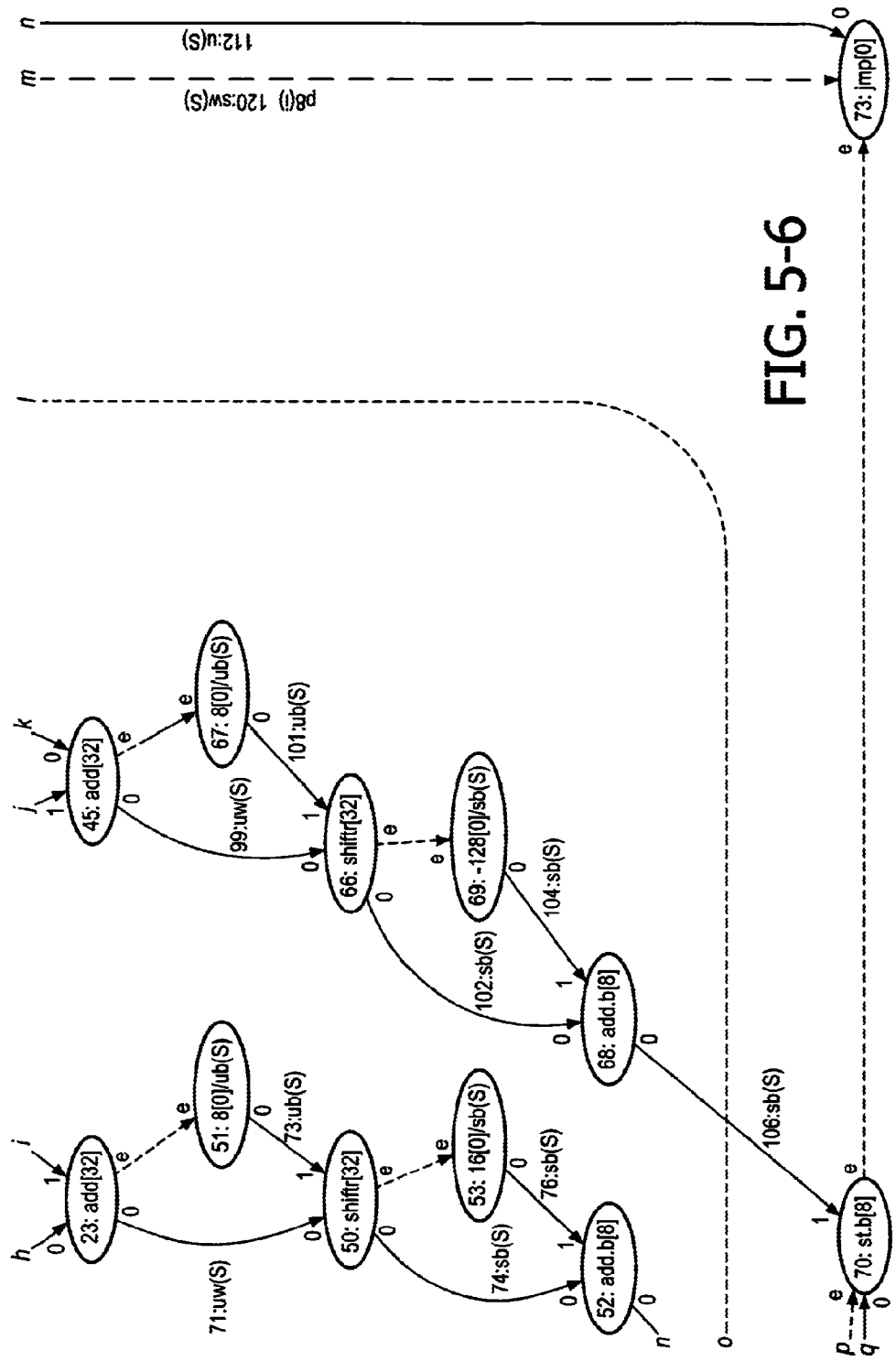
FIG. 6 shows an exemplary sample annotated executable corresponding to the sample program source of FIG. 4.

The compilation step 1100 translates the user-provided program sources 996 and test bench sources 997, and then links it with the libraries 998. The result of the compilation step 1100 is divided in three parts. A control-dataflow graph 1157 (abbreviated CDFG) captures the static structure of the program 996. An exemplary sample CDFG 1157 corresponding to the sample program source 996 of FIG. 4 is shown in FIG. 5. The annotated executable 1158 is an executable program based on a particular instruction set, such as the well-known x86 instruction set, in which every instruction can be annotated with information that links the instruction back to a specific part of the CDFG 1157. An exemplary sample annotated executable corresponding to the sample program source 996 of FIG. 4 is shown in FIG. 6. The host executable 1199 is an executable image that can run on the host computer; it contains the compiled test bench 997 and libraries 998 and a reference to the annotated executable 1158. Some parts or all of the libraries 998 may also be linked dynamically with the host executable 1199.

The analysis step 1200 uses the CDFG 1157, annotated executable 1158 and host executable 1199 to capture the behavior of the program 996 into a data structure that is called a tree 1299. To do so effectively the analyzer 1200 requires test data 999. It is important that the test data 999 exhibits a good coverage of the program 996. This means that the test data 999 causes the annotated executable to execute all important instructions of the program source 996 in ways that are representative for the normal behavior of the program 996.

The tree 1299 represents the dynamic behavior of program 996 when test data 999 is applied. This includes the following information: the instance hierarchy of function calls and loops; execution count of each loop body that is present in the CDFG; execution count of each source code instruction; the communication patterns that occur when a LOAD instruction reads data from a memory address that previously was written by a STORE instruction; the function call hierarchy.

Figure 7:
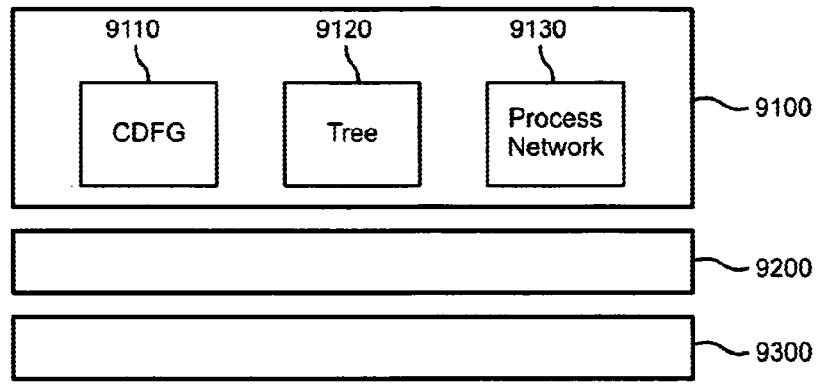
FIG. 7 schematically illustrates the concept of "designs" within the context of the invention.
Figure 8:
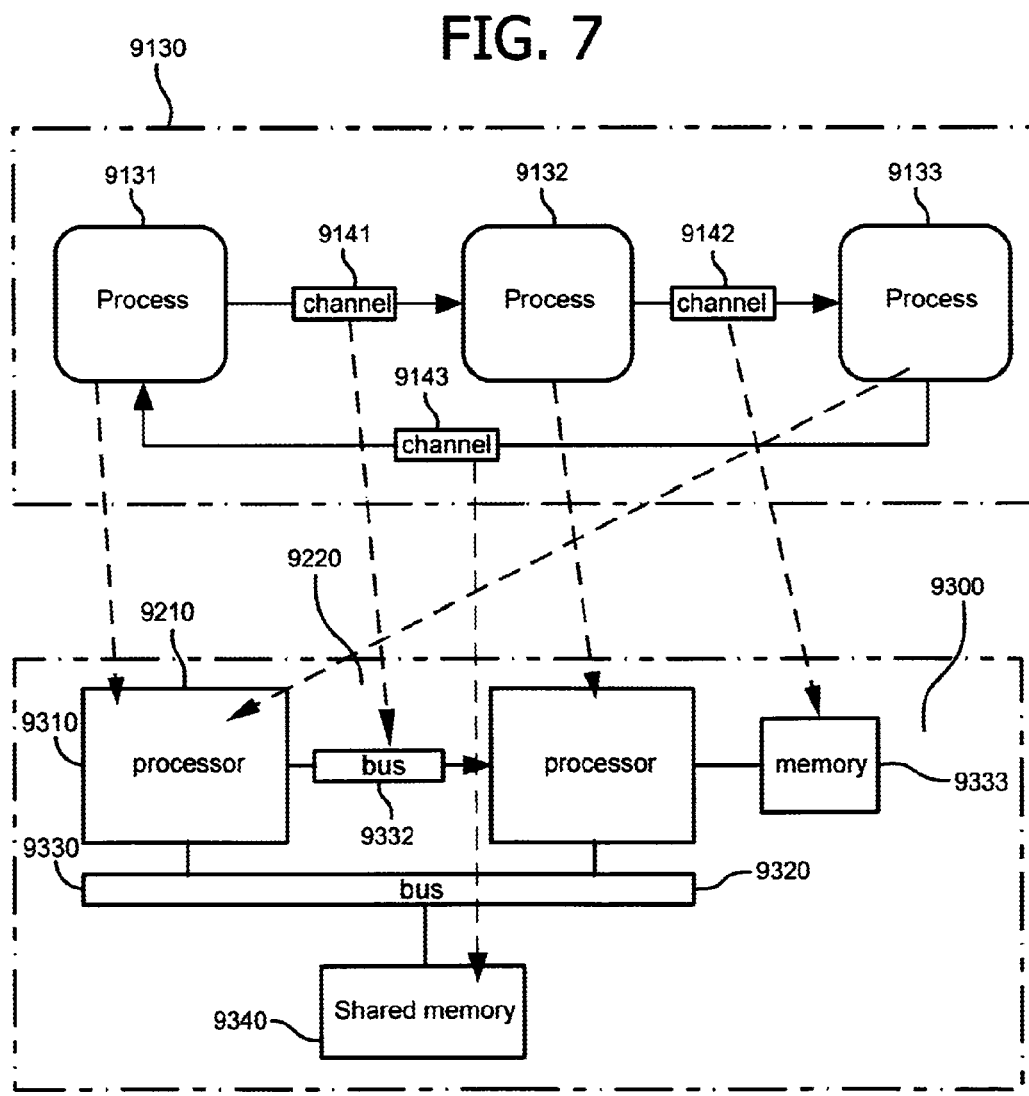
FIG. 8 shows an example design.

After the tree 1299 and the CDFG 1157 have been computed, initial design construction step 1900 constructs the initial design 1999. Before discussing the above steps in more detail, first a general discussion of what designs in this context represent is needed. As shown in FIG. 7, a design is a data structure containing information about a computer program and its mapping to an embedded system that consists of three top-level parts: application 9100, mapping 9200, and architecture 9300. FIG. 8 details an elaborate design, again by way of example.

The application 9100 in FIG. 8 links a CDFG 9110, a tree 9120, and a process network 9130. In the initial design 1999, these would be CDFG 1157, tree 1299 and process network 1803. However, it should be noted that an initial design typically is very simplistic. A design such as shown in FIG. 8 would only be obtained after several transformation operations as discussed below. Also note that the CDFG 9110 is in fact a collection of function CDFGs, each of which represents a function body. The tree 9120 specifies the instance hierarchy of the functions, and in this way it links the function CDFGs to each other.

The process network 9130 represents the assignment of program elements such as functions and loops to processes or threads 9131 and the assignment of read and write operations in the program to communication channels 9141 between processes. The process network 9130 defines a set of processes 9131 that are interconnected through communication channels 9141.

A particular style of process networks, where the communication channels are unbounded FIFO buffers is known in literature as Kahn Process Network (Kahn, G., 1974. "The semantics of a simple language for parallel programming", in: Information Processing, pages 471-475). The initial (default) process network 1803 is constructed by assigning all program elements to a single, unconnected process. The transformation process 2000 discussed below may move some program elements to a newly created process and add required communication channels.

The architecture 9300 of a design represents the hardware structure of the final embedded system 4999. The initial (default) architecture 1801 typically consists of a single processor with associated memory and peripherals such as a bus required to execute the complete program 996. The architecture 9300 as shown is more complex: it contains two processors 9310, 9320, one with its own memory 9333, a point-to-point link 9332 interconnecting the two and a bus 9330 to facilitate communication and access to memory 9340.

The mapping 9200 represents a projection of each process 9131, channel 9141, instruction, function, loop, and/or data item of the application 5100 to at least one component of the architecture 9300. The initial (default) mapping 1802 maps the only process in the initial application to the only processor in the initial architecture and maps all data items in the program 996 to the only memory in the initial architecture. As said the architecture 9300 is more complex, which is confirmed by examining the mapping 9200 as shown. Processes 9131 and 9133 have both been mapped to processor 9310. Process 9132 however is assigned its own processor 9320. Channel 9141 is mapped to point-to-point link 9332, but channels 9142 and 9143 are mapped to memory 9333 and 9340 in the implementation. The bus 9330 was added when the initial design was created and usually remains in place to connect all the items.

Compilation Process

Figure 9A:
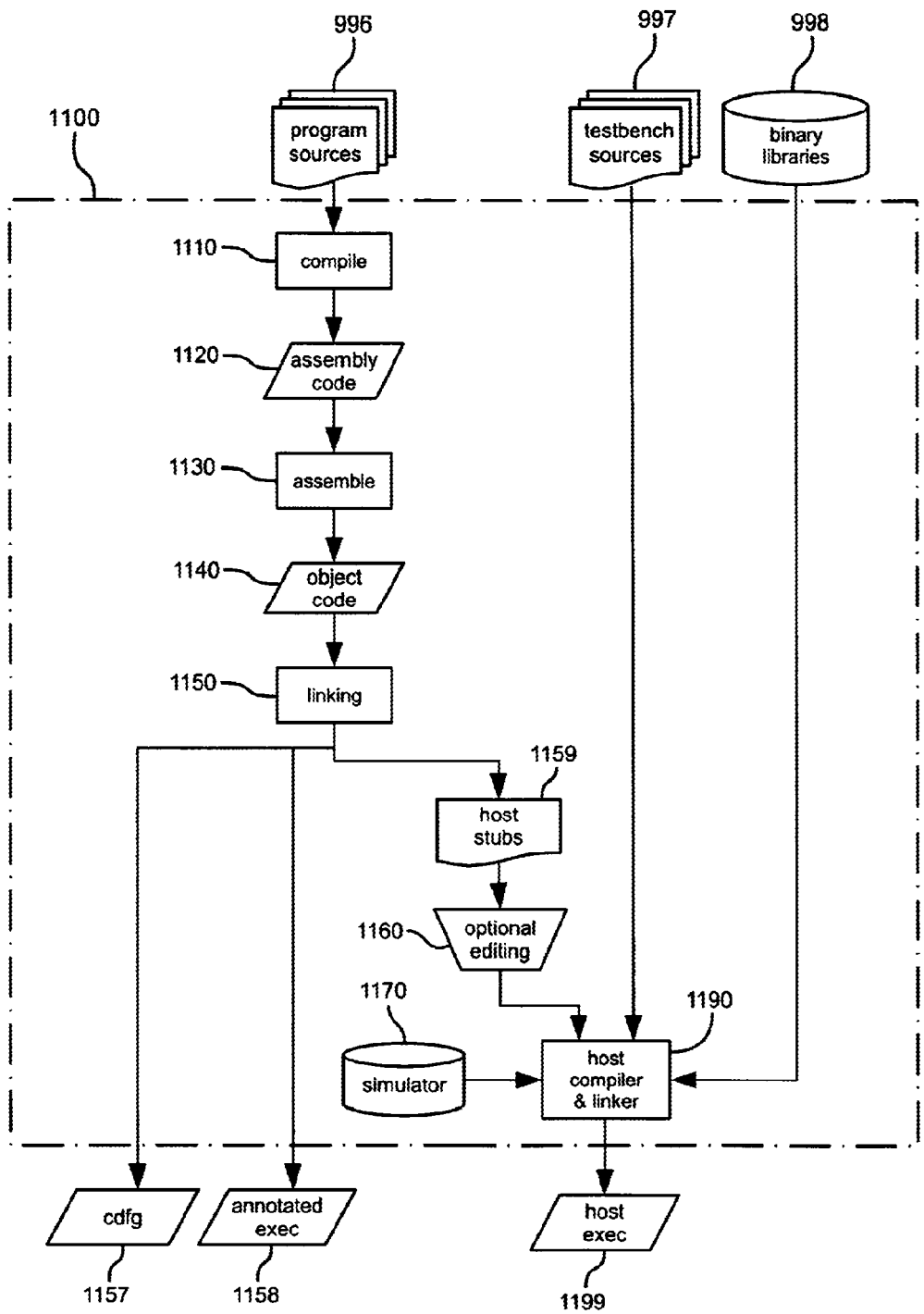
FIG. 9(a) shows a first embodiment of the compilation step of the process of FIG. 3.

FIG. 9A shows the compilation process 1100 in more detail. The program sources 996 first are translated by a front-end module 1110 to assembly instructions 1120. The instructions are grouped by their function in program 996, i.e. instructions that appear in the same source program function are grouped and marked as such in the assembly instructions 1120. The function entry marks include the following information: datatype of the function return value; number and datatype of the function arguments; whether the function accepts a variable number of arguments in addition to the fixed arguments.

The format of each instruction includes the following information: the program source file 996, line and column numbers containing the code fragment of which the source code instruction is derived; the operation that the instruction performs (e.g. add, subtract, multiply, etc.); the names of the registers on which the instruction operates; the datatypes of the values that the instruction operates on; the datatype of the value that the instruction produces if available. The information is preferably represented in a way that keeps the size of the assembly instructions 1120 small.

In addition to instructions, the assembly instructions 1120 contain a detailed description of the datatypes that occur in the original program sources 996, including the origin of the datatype declaration. This can later be used in build step 4000 to create an embedded system that is linked with a different implementation of the binary libraries 998.

The assembly step 1130 translates the assembly instructions 1120 into object code format 1140, e.g. the x86 format. The binary instruction format 1140 consists of two main parts: for each function in the assembly file 1120 there is a control data flow graph (CDFG) representing the static structure of the function; and for each function there is an object code section that will later be linked into the annotated executable 1158. The object code section contains relocation information for the purpose of linking by linking step 1150. The concept of relocation information is known to persons skilled in the art of compilers and will not be elaborated upon further.

In addition to the information already present in the assembly instructions 1120, the object code format 1140 includes the following information: each source code instruction has been assigned a sequence number that is unique to the assembly function 1120 that it appears in; each instruction has been translated to a binary format that enables the analysis process 1200 to do its work efficiently; the datatype of all operands in all instructions has been determined by applying a new technique of datatype propagation. This is usually necessary because, depending on the assembly language used, not all operands in the assembly instructions 1120 carry a datatype but for proper operation of the transform 2000 and build 4000 steps it is desirable that the datatypes of all values in the CDFG are known.

The nodes in the CDFG are marked with the numbers of the corresponding instructions in the object code section, such that the relationship between executed operations in the object code section and the nodes in the CDFG can be established in the analysis step 1200.

The linking step 1150 links the object code sections to form the annotated executable 1158. In addition to the steps performed by ordinary linkers, linking step 1150 performs at least one of the following steps:

All functions in the annotated executable 1158 are assigned a sequence number that is unique to the executable 1158. As a result, functions can be referred to by number instead of by name which is an advantage if the source program 996 is written in a language like C where function names are not necessarily unique in a program; the function CDFGs present in the object code 1140 are combined to form the overall program CDFG 1157 that represents the static structure of program 996.

A human-readable file with host stubs 1159 is constructed. The host stubs 1159 are small functions that are called by the annotated executable 1158 for all external calls that the linking step 1150 cannot resolve. In this way the program 996 can call functions in the test bench 997. The user can perform an optional manual editing step 1160 to allow more complex interaction between the test bench 997 and the program 996.

Finally the host compiler and linker are invoked in step 1190 to perform the classic operations, known to persons skilled in the art of compiling, to translate the host stubs 1159 and the test bench 997 to host object code, then link the resulting objects with binary libraries 998 and instruction set simulator 1170 to form the host executable 1199. The function of instruction set simulator 1170 is to allow the test bench 997 to call functions of program 996. The instruction set simulator 1170 provides a software processor (also known as an interpreter) that is required to execute functions present in the annotated executable 1158.

In a preferred embodiment a special type of source code instruction is supported, which is known as an intrinsic instruction. Intrinsic instructions represent functionality that is unknown to the compiler. The compiler only knows the number and datatype of the operands, and a number that uniquely identifies the functionality of the intrinsic. Whenever an intrinsic instruction is encountered by the analyzer 1200 a user-provided function is invoked to implement the functionality of the intrinsic instruction. In this way the instruction set can be extended by the user.

The intrinsic instructions can be carried throughout the tool chain. If the intrinsic instruction is eventually mapped to a hardware component, the user must provide an implementation of the hardware. This allows so-called "black box IP" to be included in the embedded system 4999, such that the user can build embedded systems 4999 that include components created by $3^{rd}$ party vendors, or components with a behavior or structure that cannot handled efficiently by the present invention.

Intrinsic instructions, or just 'intrinsics' for short, can also map to a software implementation in the embedded system 4999. One useful application of software intrinsics is representing a standard software library like the well-known 'libc' library on Linux and other Unix-like operating systems by intrinsic instructions. The analysis step 1200 becomes much more efficient when functionality of such standard software libraries is executed by the host processor instead of the instruction set interpreters 1211 and 1170. In addition, the implementation details of the intrinsics do not need to be considered during transform step 2000 which makes said step more efficient. During the build step 4000 a compatible implementation of the necessary standard library or libraries is linked into the embedded system 4999. Software intrinsics thus enable build step 4000 to insert a highly optimized version of the intrinsics, for example an implementation that has been manually encoded in the assembly language of the target platform.

Figure 9B:
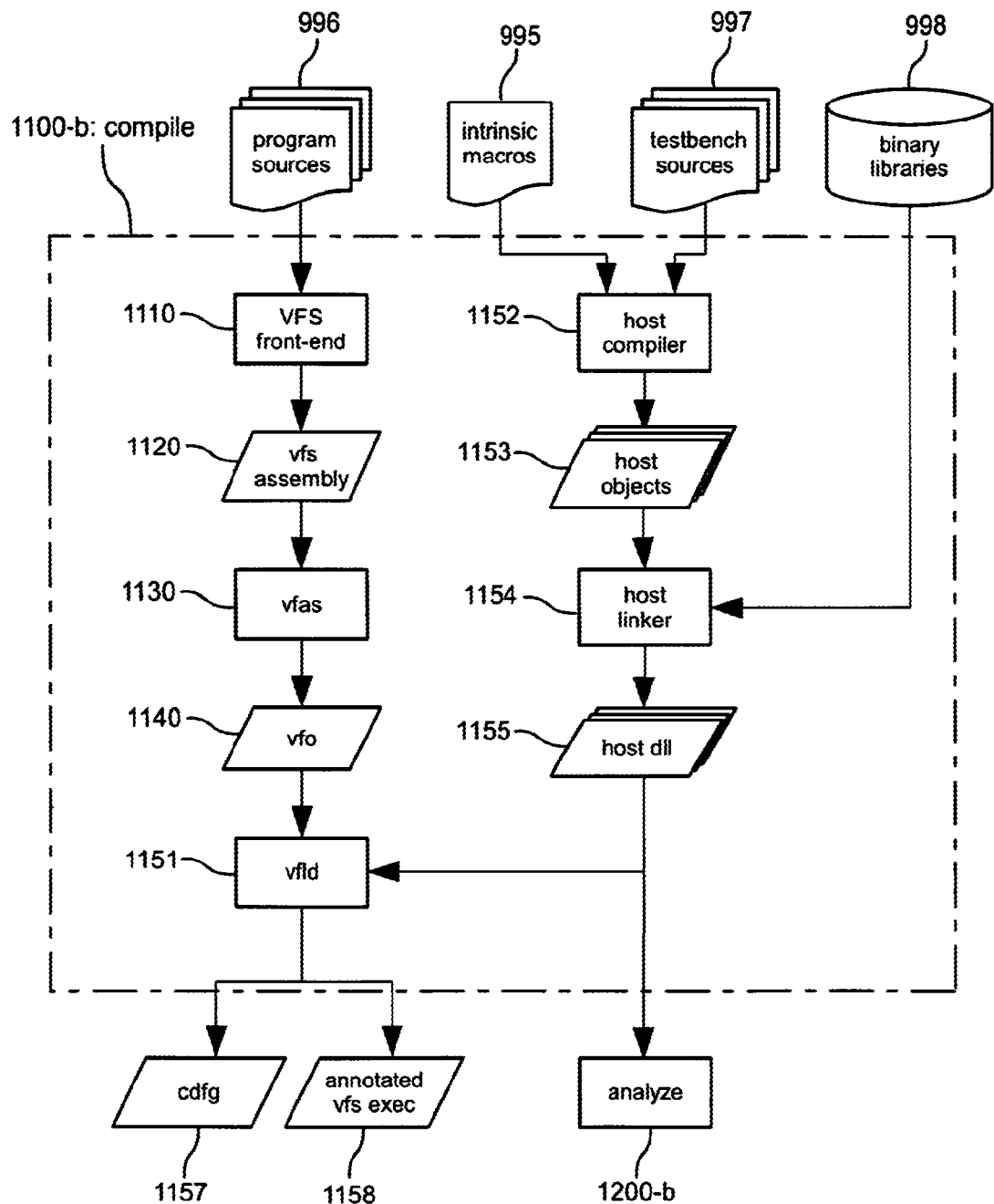
FIG. 9(b) shows a second embodiment of the compilation step of the process of FIG. 3.

FIG. 9B shows an alternative embodiment of the compilation process 1100, denoted as compilation process 1100-b. In this alternative approach 1100-b, the testbench 997 comprises source code that defines intrinsic functions. The functions are marked as intrinsic by wrapping them in C-language macros defined in the intrinsic macros header file 995. These marked functions are then compiled to host objects 1153 by host compiler 1152 and linked into dynamically loadable libraries (DLLs) 1155 by a host linker (not shown in FIG. 9B).

Linking step 1151 performs the typical linking steps known to persons skilled in the art. In addition, linking step 1151 performs at least one of the following steps.

All functions in the annotated executable 1158 are assigned a sequence number that is unique to the executable 1158. As a result, functions can be referred to by number instead of by name which is an advantage if the source program 996 is written in a language like C where function names are not necessarily unique in a program; the function CDFGs present in the object code 1140 are combined to form the overall program CDFG 1157 that represents the static structure of program 996.

All variables in the annotated executable 1158 that have a so-called 'static' scope are renamed so that they have globally unique names. In addition, their scope is changed from 'static' to 'global'. The effect of this is that transform step 2000 and build step 4000 do not have to deal with additional complexity caused by name conflicts and statically scoped variables.

All function calls in the object code 1120 are matched against the list of intrinsics defined by the host DLLs 1155. For each function call that resolves to a host-compiled function in a DLL the linker changes the 'call' instruction to the corresponding 'intrinsic call' instruction. The effect of this is that when in a later step the instruction set simulator 1211 encounters such an intrinsic call instruction, it transfers control to the host-compiled implementation of the intrinsic, as provided by the host DLLs 1155. When the host-compiled implementation of the intrinsic returns, the instruction set simulator continues executing at the instruction immediately after the intrinsic call.

Analysis Step

Figure 10A:
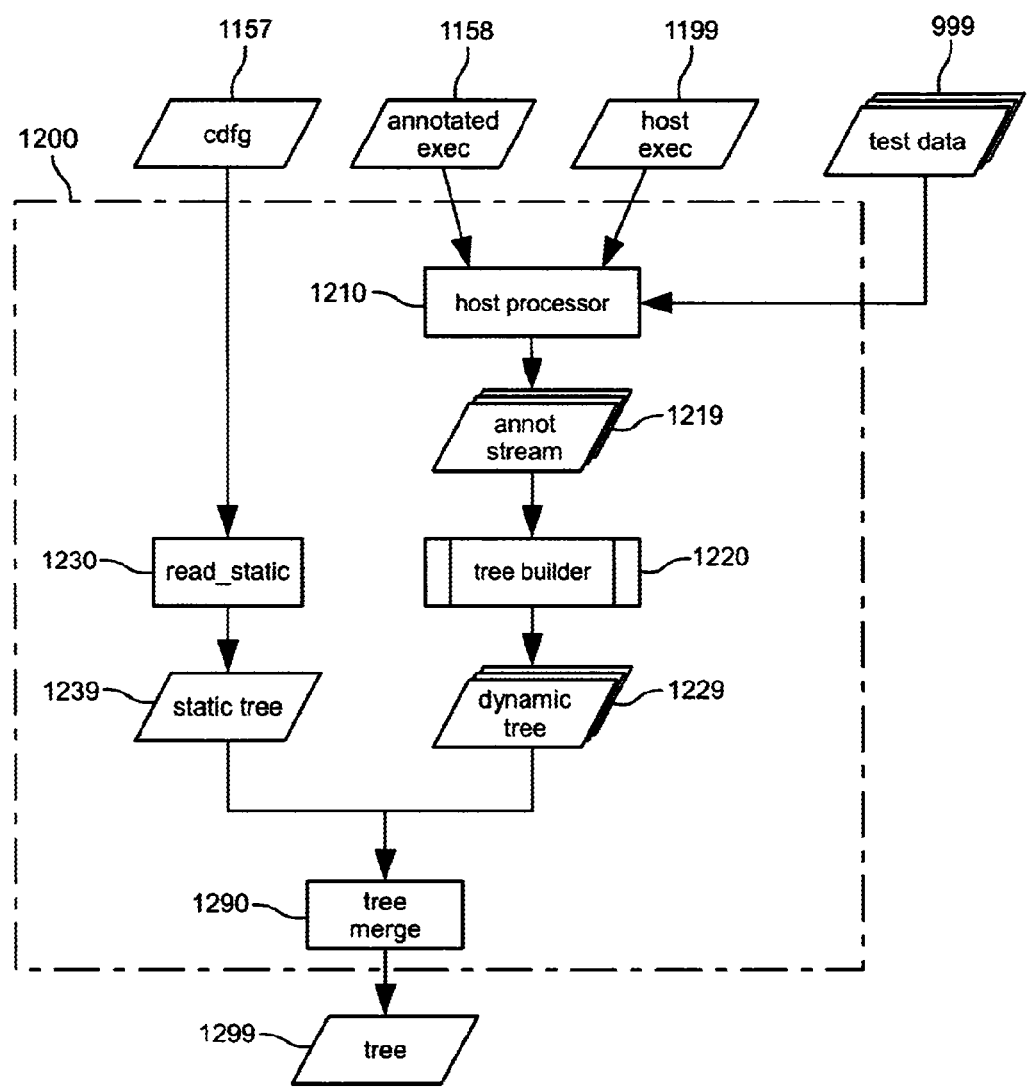
FIG. 10(a) shows a first embodiment of the analysis step of the process of FIG. 3 in more detail.

FIG. 10A shows a preferred embodiment of analysis step 1200 in more detail. The CDFG 1157 together with the annotated executable 1158 is analyzed using the compiled test bench 997 and test data 999. There are two ways to construct the tree 1299, a static and a dynamic way. These two ways are preferably both used to obtain the best analysis of the behavior of the program 996.

The static way is to derive a tree from the static CDFG structure 1157 of the program 996. This occurs in the read_static 1230 step. Static tree 1239 extracted in this step is mainly limited to function invocation patterns. For example, the static tree 1239 may contain information that function "foo" calls function "bar" in two different places, and that it calls "printf" in one place.

Figure 11:
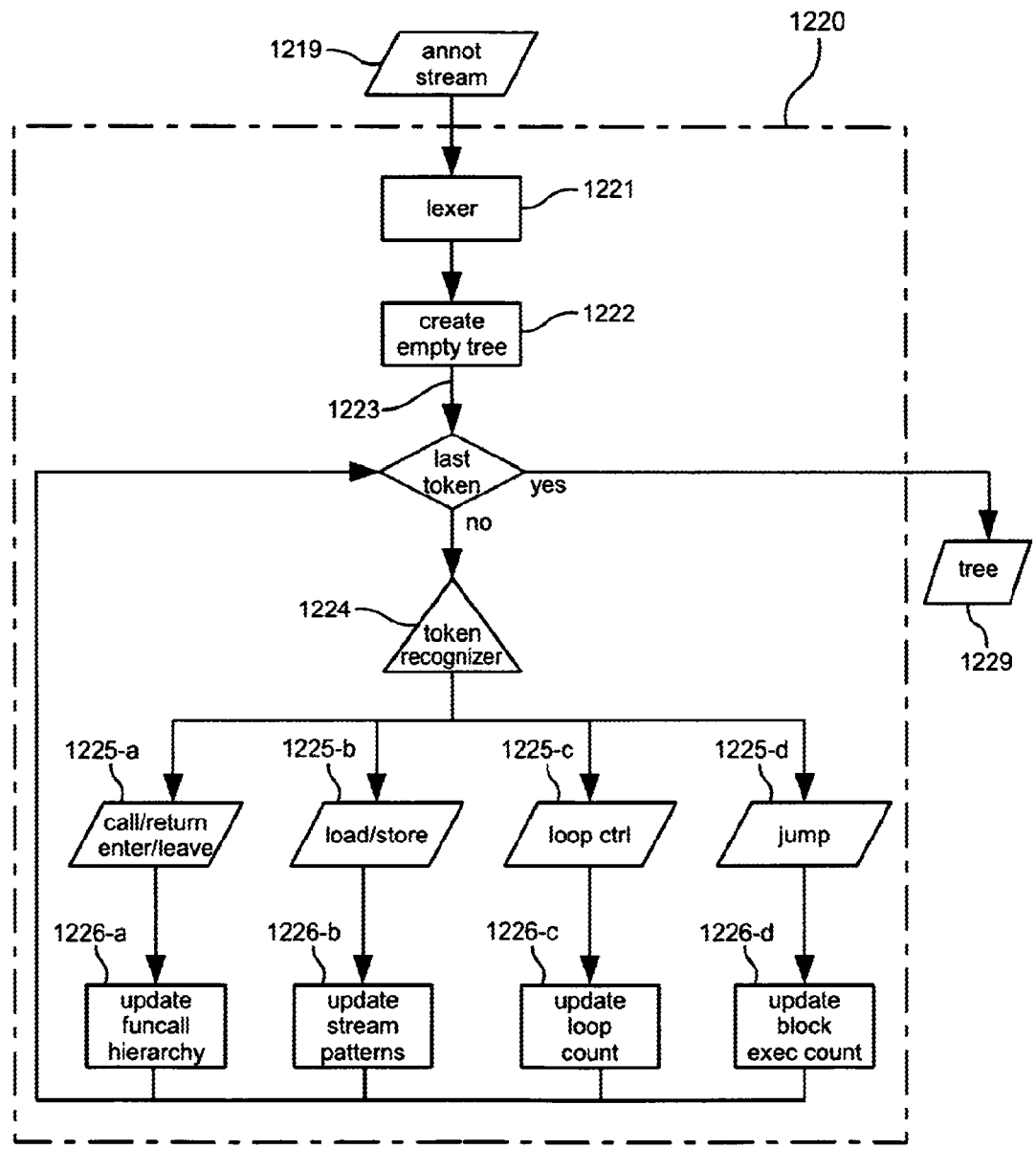
FIG. 11 shows the tree creation step of the analysis step of FIG. 10A or 10B in more detail.

The dynamic way to derive a tree is to execute 1210 the annotated executable 1158 and test bench 997 on a host processor. Step 1210 is discussed in more detail below. Briefly, the host processor calls an instruction interpreter to execute the annotated executable 1158. The instruction interpreter inserts tokens that represent events that occur during the execution of annotated executable 1158 and test bench 997 with test data 999. Said sequence of tokens comprises the annotation stream 1219, which then is passed to analysis process 1220, discussed in more detail with reference to FIG. 11. Analysis process 1220 analyzes the event annotations and constructs a dynamic tree 1229 as a result.

The steps to construct a dynamic tree can be repeated with different test data sets as often as is required to improve code coverage. This results in multiple versions of dynamic tree 1229, say 1229a, 1229b, etc. The static and dynamic trees 1239, 1129 constructed this way are combined in the tree_merge 1290 step, resulting in a single tree 1299 that captures the accumulated observed behavior that was captured in the individual trees 1239, 1229a, 1229b, . . . .

Analysis step 1200 does not require full code coverage. However, when the code coverage is less than 100% certain transformations may require manual confirmation because the transform step 2000 (discussed below) cannot automatically determine its correctness.

The operation of step 1210 will now be discussed in more detail. The host processor starts executing instructions from the host executable 1199. At some point the host executable 1199 invokes a function from the annotated executable. It does so by calling the interpreter in instruction set simulator 1170 with as argument the name of the desired function (say FOO) in the annotated executable 1158, plus a list of arguments that need to be passed to the called function. The code in instruction set simulator 1170 then performs a lookup to find the start address of FOO. It then invokes the interpreter with the start address of FOO and the function arguments that were passed from the host executable 1199.

Certain datatypes may need conversion before they can be handled by the annotated executable 1158. In such cases an optional manual step 1160 should have introduced code to perform this conversion. The most common conversion case where data items created on the host interpreter are referenced by the annotated executable 1158 is automatically handled by the interpreter as follows: embedded system addresses are recognized because of the special address range assigned to the embedded system's memory. If the interpreter encounters an address that is outside the embedded system's memory space, it handles the address dereference (i.e. load or store) by directly dereferencing the host memory.

Another situation can also be handled automatically: embedded system memory space is marked on the host processor as an invalid range, such that dereferencing that range is trapped by the host processor. The trap handler performs the dereferencing of embedded system memory and returns control to the host executable right after the embedded system memory dereference.

When the interpreter returns, the code in instruction set simulator 1170 takes the return value of function FOO and passes it back to the calling host function.

It is also possible for functions to call functions in the host executable 1199. This is supported in two ways: (a) if a system call instruction is encountered, the interpreter passes control to the host environment to provide the requested system service; (b) if the function is handled by a host stub 1159 the interpreter passes control to the host stub 1159 and when the host stub 1159 returns the host stub passes the stub's return value back into the interpreter.

When data structures are passed between the host processor and the instruction set simulator, it is important that the memory addresses used by the instruction set simulator are also valid memory addresses to use by the host processor, and vice versa. To this end the linker steps 1150 and 1151 ensures that the memory addresses used by the annotated executable 1158 do not overlap with memory addresses used by host-compiled program, such as the host DLL 1155 and the binary libraries 998.

Figure 10B:
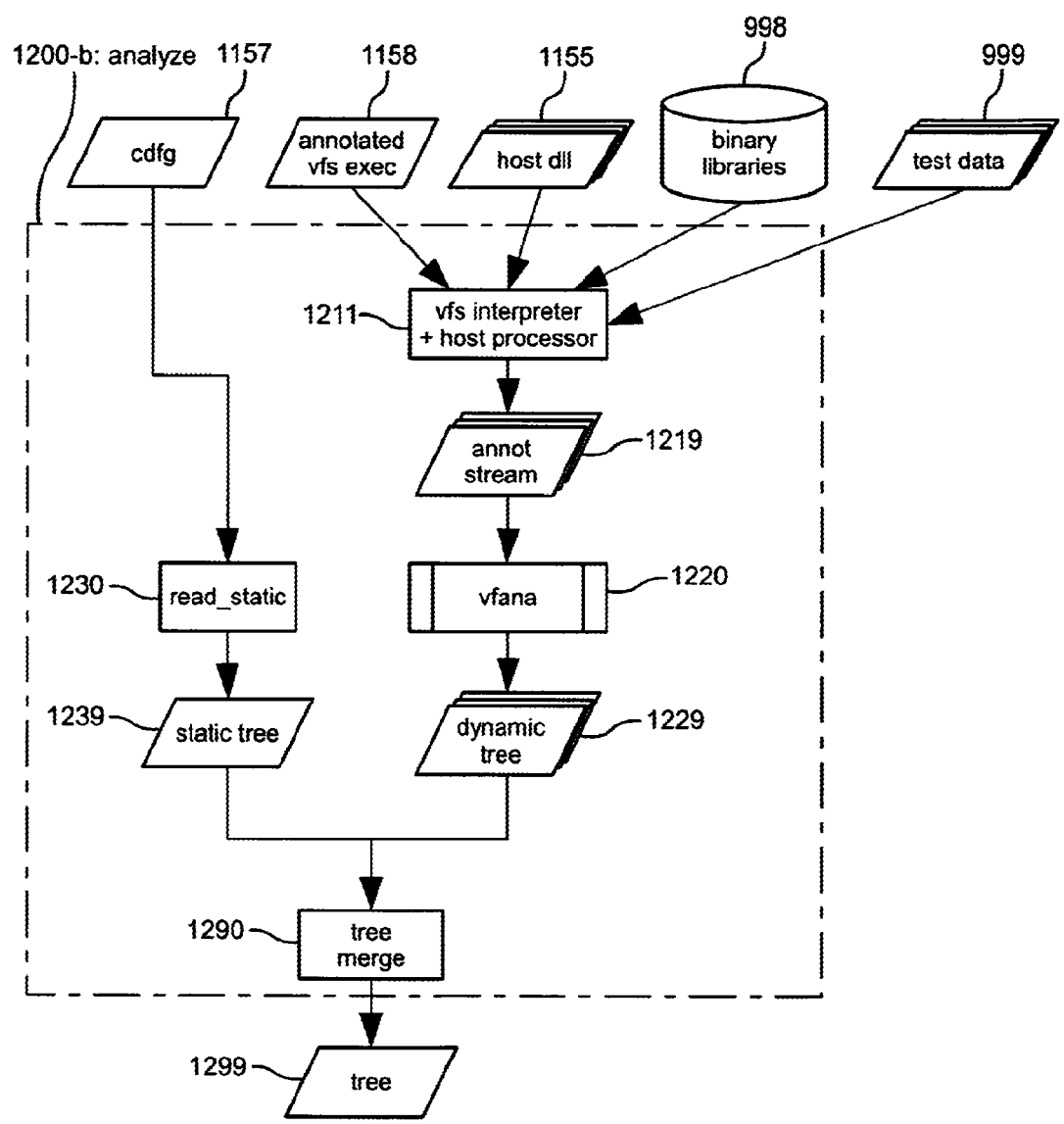
FIG. 10(b) shows a second embodiment of the analysis step of the process of FIG. 3 in more detail.

FIG. 10B shows an alternative embodiment of analyze step 1200, here denoted as step 1200-*b*. In this embodiment, analyze step 1200-*b* complements compile step 1100-*b*. The instruction set interpreter 1211 executes the annotated executable 1158, and whenever interpreter 1211 encounters an intrinsic call it passes control to the intrinsic implementation in the host DLLs 1155 (which in turn may call functions in the binary libraries 998). The instruction set simulator takes care of marshaling function parameters values to the host-compiled intrinsic in host DLL 1155, and it marshals the return value back into the instruction set interpreter when the intrinsic implementation returns.

It is important that the instruction set interpreter enables access from the host processor to all values computed by the annotated executable 1158 through the same memory address as the instruction set simulator uses. One possible way the instruction set simulator 1211 can implement this is to use the Posix mmap( ) system call to allocate the simulated memory segments at exactly the same host address as specified by the linker steps 1150/1151.

An important side effect of having the interpreter execute a particular function is the creation of one or more annotation streams 1219. The interpreter appends event tokens to the annotation streams 1219 as it executes instructions from the host executable 1199. The event tokens carry sequence numbers that refer to the operations and functions in the CDFG 1157 of the program 996.

It is possible to append all event tokens to a single stream. However it is also possible to distribute the event tokens to multiple streams such that each type analysis process 1220 is invoked, a shorter stream is handled. The advantage of this is that we can run multiple analysis processes 1220 in parallel, which results in a shorter overall analysis time on host computers that have multiple processors (as is the case in most modern computers).

Analysis Process

A preferred embodiment of analysis process 1220 is shown in FIG. 11A. In this embodiment, first a lexer 1221 splits the annotation stream in individual tokens, each of which represent a single event of the execution of the annotated executable 1158. For example, a token can represent a function call, or a taken jump, or the execution of a store operation, etc.

Next, an empty tree is created in step 1222 and assigned to the "current" tree. This tree will be incrementally grown by the following token processing. In step 1223 the next token received from the lexer is tested. If it is a token indicating the end of the stream of tokens then the current tree is output and the analysis process 1220 terminates. Otherwise in step 1224 the class of the token is recognized and the operation branches accordingly. Preferably there are four token classes:

(a) call/return/enter/leave tokens 1225-*a*. Call marks a function call, return marks the return from a function call. Enter marks the start of a function execution. The Enter token includes the function sequence number of the CDFG 1157. Leave marks the end of a function execution. These tokens cause the tree to be updated with information about the function call hierarchy. The advantage of having a separate token for function call and function entrance is that different pieces of information are available when emitting the token. For example, a function may be called through a function pointer, in which case it may be unknown which function is being called. By inspecting the enter token immediately succeeding the call token, this information can be recovered and stored in the tree.

(b) load/store token 1225-*b*. These tokens include the memory address and data size of a load or store operation, and the sequence number of the load/store operation in the CDFG 1157. Analysis process 1220 maintains a data structure that for each possible memory address keeps track of the store (identified by its unique function sequence number and instruction sequence number) has written that address recently. When analysis process 1220 recognizes a store token, it updates the data structure. When analysis process 1220 recognizes a load token, it performs a lookup in the data structure to see which store the load data comes from. In addition, the token stream may contain tokens for memory allocation, e.g. malloc( ) and alloca( ) and releasing memory, e.g. free( ) The analysis process uses said tokens to avoid false load/store dependencies when a new memory allocation reuses previously allocated memory space. Because the number of executed loads and stores can be very large, it is necessary to detect stream patterns immediately when a load is matched (through its address) to a preceding store.

An example of such a pattern could be a "saw tooth" pattern, where one function executes stores with an address pattern that increases by a fixed amount, then suddenly wraps back to a lower address from where the pattern repeats. If a load sequence can be detected that reads the stored data with the same saw tooth pattern, analysis process 1220 deduces that a stream is detected.

The detection of such streams has very important implications for the transform 2000 step—without streams there will be very few interesting transformations possible. If a stream pattern cannot be detected, the dependency between load/store operations to overlapping addresses is recorded in any case. Said dependencies also have important implications for the transform step 2000.

Optionally, a pattern could be detected which would only observe ordering relations between loads and stores. For example by observing that a value is always stored and loaded exactly once, and the values are loaded in exactly the same order as they are stored, a first-in-first-out (fifo) pattern can be detected even if the sequence of memory address does not resemble said "saw tooth" pattern.

(c) loop control tokens 1225-*c*. These come in three variants: LOOP_START, LOOP_NEXT and LOOP_END. Only the LOOP_START token carries a loop identifier that refers to the CDFG 1157. Because loops must be properly nested, LOOP_NEXT and LOOP_END tokens can be associated with their CDFG counterparts from their nesting level relative to LOOP_START tokens. The LOOP_NEXT token marks the next iteration of a loop. Analysis process 1220 updates the loop body execution counters in the tree when it recognizes loop control tokens.

(d) jump tokens 1225-*d*. Jump tokens are recognized to keep track of the execution counts of all instructions in the annotated executable 1158. For efficiency reasons the individual jump executions do not emit a jump token. Instead the interpreter resets a table of jump counters on every function entry and it emits the complete jump count table on every function exit. In this way, if a jump is executed a million times, we do not have to process a million jump tokens.

More specific information about the program behavior is available by combining information collected in the tree. For example, by multiplying the execution count of a load by the datasize it is possible to see what the bandwidth requirements of that load instruction are.

In another embodiment the state of the loop body execution counters is combined to form a so-called iteration vector. The data structure which for each possible memory address keeps track of the most recently executed store is then preferably also used to keep track of the iteration vectors for each of the recently executed stores. The iteration vector of a load can then be compared against the iteration vector of the most recently executed store on the same address. The outcome of such compare allows patterns to be constructed to not only tell which clusters of store and load instructions are communicating, but the pattern can also give information about the relative time that these communications occur. This information can be used to determine parallelization opportunities during transform step 2000.

CDFG Semantics

The control data flow graph (CDFG), created as result of compiling a (classic imperative) language, represents the control structure of a function/procedure body. At its top level, this is a control flow graph (CFG) where its nodes are basic blocks and its directed edges correspond to (potential) jumps from inside one basic block to the start of another basic block. A basic block corresponds to a section of straight-line code in the input program, which does not contain jump target locations except from its start. A CFG has a strictly sequential execution semantics, where only one node is active at any one time.

In a lower level of detail, each node of the CDFG contains itself a data flow graph (DFG). A DFG is a graph where each node represents an operation (basic examples are 'plus', 'minus', 'multiply'), and a directed edge models a data transfer from the output (result) of one operation to the input (argument) of a subsequent operation. An operational semantics is deployed for the DFG, where data values are captured in tokens, and where individual tokens can be queued on edges. A node in the DFG can execute, during which it consumes one or more tokens from its input edges, and produces one or more tokens on its outputs. At the 'top' of the DFG, source nodes introduce new tokens that are issued in the rest of the DFG for computations. Source nodes can create constant value tokens (from a hard coded value, or from a symbolic value which becomes known only later). Computation nodes typically have a small set of input ports and a single output port; some node types can have more than one output. A computation node picks (consumes) exactly one token from each of its inputs, performs its operation on those tokens, and then produces one token on each output port. This token flow operational model normally does not apply beyond the DFG node; in particular, it does not apply to the encompassing CDFG.

Each CFG has a unique start node that corresponds to the function entry block. A CFG node can have multiple outbound edges, representing the effect of (conditional) jumps. A CFG node can have multiple inbound edges. In that case the corresponding DFG does not need knowledge regarding which inbound edge was taken. Function calls are represented similar to basic computation nodes (like 'plus') inside the DFG. Therefore, function calls do not cause jumps that are visible as CFG edges.

Typically, values for variables are transferred (used) across CFG edges: the edges can be annotated with the live variables. This captures the static data dependencies: the ones that are directly available (at compile time) by program analysis. This contrasts with the 'dynamic' data dependencies which relate to communication and ordering constraints from load/store operations in memory. We assume that the CFG is made into a static single assignment (SSA) form: each variable (-name) is assigned only once. Multiple assignments have been removed by assigning to a new (derived) name. At the entry of each CFG node, so called 'phi' nodes explicitly merge different variables into a new assignment. After the SSA analysis has been done, any reference to a variable refers to a unique production (assignment) in either this same CFG node, or a CFG node that has a path to this node.

In general, loops in the CFG can be found by determining its 'strongly connected components'. A loop can have one or more entry nodes, which are those nodes that have predecessor nodes outside the loop. A 'loop-back' edge is an edge from a loop-node to a loop-entry node. If these loop-back edges are removed from the CFG and 'strongly connected components' are still found, these are proper sub-loops, leading to a hierarchy of nested loops (the loop nest tree).

For the sub-class of reducible graphs, all loops have exactly one entry-node. Note that these loops can have multiple loop-back edges and multiple loop-exit edges. In reducible graphs, these loop-back edges are easily found as back-edges in the tree that is constructed from a depth-first-search starting at the CFG start node. Especially in reducible graphs, the loop nest tree is unique. Creating this tree is useful for some other code-transformation steps. In particular it helps for an efficient computation of the SSA form of a program (either through building a dominator tree first, or directly). The publication of Janssen and Corporaal explains how to efficiently convert generic CFGs into reducible CFGs.

A program is represented as a collection of CDFGs, where a CDFG typically corresponds to a 'function' or 'procedure' of the input program. Function call nodes in the DFG can in many cases be resolved statically to the CDFG of the called function. Resolving this call relation is typically performed in a linking step such as steps 1150 or 1151. In other cases, resolving the called function can only be done dynamically during execution. Capturing this dynamic function call resolving is part of the analysis process, when building the tree.

Transformation Process

Figure 12:
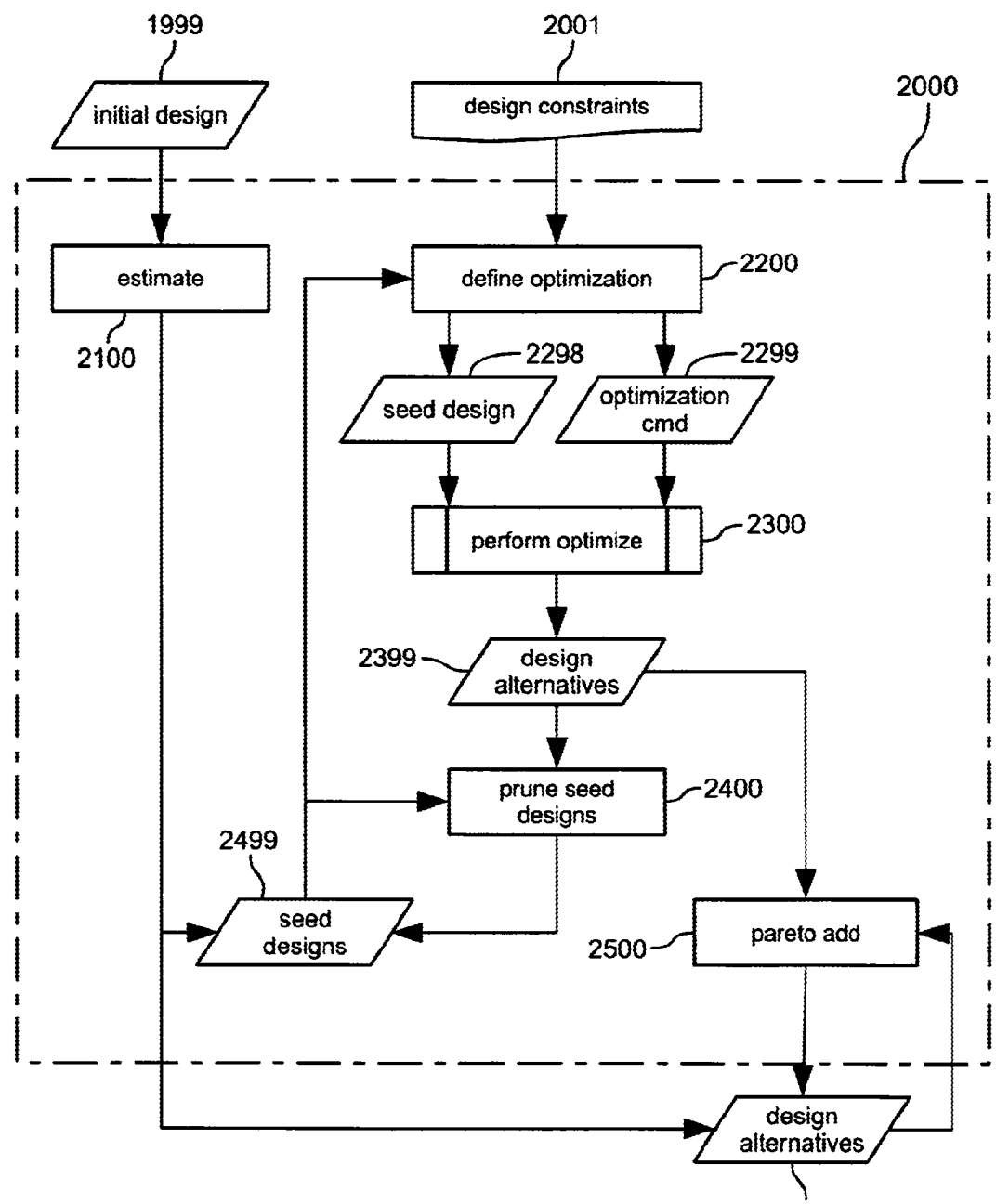
FIG. 12 shows a preferred embodiment of the design transformation process of the invention.

FIG. 12 shows a preferred embodiment of the design transformation process 2000 according to the invention. The design transformation process 2000 transforms the initial design 1999 as produced by the analysis step 1000 into multiple design alternatives 2999, each with different area and delay trade-offs. These alternatives are then offered to a user for selection of a preferred design, as discussed with reference to FIG. 19 below. Each design alternative contains a variation of the initial program 996 that takes particular area and delay trade-offs into account.

An estimator 2100 estimates various characteristics of each of the design alternatives 2999 for a given target architecture. For the sake of brevity, a design alternative together with the estimates of these characteristics is referred to hereafter as an estimated design. The estimated design is added to a seed pool 2499 as seed for further design optimizations and is referred hereafter as a seed design. This seed pool 2499 thus initially comprises only the initial estimated design, and is updated during the transformation step 2200 as discussed below. Each estimated design is also added as a design point on the design space view 3001 discussed below with reference to FIG. 19.

The remainder of this document refers only to area and delay as characteristics or optimization targets of a design. However, the described method can be applied for other design characteristics, such as power consumption.

In an alternative embodiment, the estimator 2100 is implemented by measuring the above characteristics from the execution of a virtual emulation platform that is generated from the design's CDFG 1157. An example is the execution of a SystemC model that may include data cache models and instruction-set simulators to obtain a cycle-accurate performance measurement.

The estimator 2100 examines all processes in the process network 1803 of a design and estimates the area and/or delay of each process individually. Area and/or delay of a single process is estimated by traversing all nodes in the tree 1299 of that process and adding the estimates for each node. The estimate of area and/or delay of a tree node is computed differently for the different target architecture components. The estimator 2100 uses the CDFG 1157 and the execution counts of loop bodies and instructions in the tree 1299 to estimate the delay of each tree node.

Transformation step 2200 identifies a bottleneck in a seed design 2298 that is selected from the seed pool 2499. The selection is based on the user-specified design constraints 2001 and the area and delay estimates of the seed design. To optimize the bottleneck, transformation step 2200 creates an optimization command 2299 which defines an optimization target for a function call or loop node in tree 1299. Optimization step 2300, discussed in more detail below with reference to FIG. 13, subsequently optimizes the function call or loop node in the seed design 2298 and generates multiple design alternatives 2399, with potentially different area and delay trade-offs. Optimizations include design transformations to increase concurrency and to map elements in the design alternative's program variation to computation and communication hardware in the embedded system. Step 2400 examines these design alternatives 2399 to select candidates for further optimization and may prune the design alternatives in the seed pool 2499 to retain a certain number of valuable design points. Value may be derived from the estimates of the desired characteristics or optimization characteristics of the design as well as the time the design resides in the seed pool already. Step 2500 adds a design alternative 2399 to the design alternatives 2999 if the design establishes a new pareto point.

In a preferred embodiment, transform process 2000 starts with an initial design consisting of a single microprocessor that executes the complete program 996. It then iteratively optimizes this design by selecting the design alternative with the lowest delay and adding this design alternative to the seed pool 2499 for the next optimization. Each intermediate pareto point is added to the design alternatives 2999.

In an alternative embodiment, steps 2200 and 2400 may be implemented as a manual process where the user selects a bottleneck and optimization command 2299. In such a user-directed process, the user is in control of the partitioning of the design into parallel processes while the actual design transformation and optimization step 2300 is automated. A graphical user interface displays the program structure with associated dependencies giving the user the required insight in the application behavior needed to select a bottleneck function or loop node. Step 2400 is implemented by displaying the pareto curve of design alternatives 2999, allowing the user to select a candidate design for further partitioning and optimization.

User Interface

In a preferred embodiment the program structure and associated dependencies are visualized graphically to enable quick filtering and selection of candidate call or loop nodes for automated optimization. In the visualization, the program analysis result is annotated to a tree that represents the program structure. This program view tree is a refined form of the profile tree 1299. The program view tree has a single top node representing the entire program 996. In the C programming language, this typically corresponds to the main( ) function. Each node in the tree is a representation of either:

a) A function call: Child nodes of this node represent the function body;
b) A loop: Child nodes of this node represent code segments (basic blocks) that are repeatedly executed due to this loop;
c) A condition: Child nodes of this node represent code segments that are mutually exclusive under some program condition;
d) A sequence: Child nodes of this node represent code segments that are executed after each other;
e) A leaf node: leaf nodes correspond to a sequence of instructions of the program, without internal control flow.

If nodes of type 'function', 'loop', or 'sequence' have multiple child nodes, these children have a prescribed execution order which is annotated for display in the view-tree data structure. For a 'condition' node with multiple children, also a display order is chosen.

An embodiment of such a program view tree is depicted in FIGS. 25(*a*), 25(*b*) and 25(*c*). FIG. 25(*a*) shows an example of computer program 996 in the C language, with annotated basic blocks BB0 to BB3. Basic block BB0 provides two declarations of variables. Basic block BB1 provides a while-loop, and basic block BB2 provides two statements inside this loop. Finally, basic block BB3 provides a return statement that terminates the program 996. FIG. 25(*b*) shows the CDFG of the main( ) function of this program. FIG. 25(c) depicts the corresponding program view tree as can be generated from the CDFG.

After program analysis, each node in the tree is annotated with a 'size' that represents the workload of or total time spent in the program for that subtree, for the provided program test input data 999. The 'size' of a node is the sum of its child nodes.

In one embodiment, this size is a single number, related to the number of executed operations in the subtree. In another embodiment, this size is represented as a rectangle where the program load corresponds to the rectangle area. The rectangle horizontal size relates to the length of the program code of the subtree, measured in operations, where the vertical size relates to the average execution count of the subtree code.

Given the 'size' of all nodes in the tree, the tree can be depicted with a method where each node obtains an x-coordinate derived from the node sizes and the child ordering, and obtains a y-coordinate related with the depth of the node from the tree root. In a preferred embodiment, 'load', 'store' and 'intrinsic call' DFG nodes are contained in a 'leaf' node of their own, where this 'leaf' does not contain any other code. Such embodiment results in a unique drawing coordinate of all load-, store- and intrinsic operations of the program. Such coordinates are used to draw the dependency relations attached to these nodes.

A consequence of the 'size' representing the workload is that for a loop node, the visualization shows the accumulated behavior over all iterations of the loop. For instance, a loop that calls a function 'foo( )' in each iteration, only one call to foo( ) is shown where the size of foo( ) corresponds to the time spent in foo( ) in all iterations of the loop. Similarly, dependencies that occurred in the loop are shown as if all dependencies occurred in a single loop iteration. This folding of loops allows the user to focus on loops as the prime candidates for optimization, and quickly prune loops for which the dependencies prevent parallel execution.

Constructing a program view tree from the CDFGs is in general a non-trivial step. The refinement of the profile tree with the 'condition' and 'sequence' nodes (next to the loop and call nodes) is straightforward only if the function body CDFG has a series-parallel structure. A series-parallel graph directly maps into a tree structure. In general a CDFG does not satisfy that property. Typically, CDFGs constructed by modern compilers satisfy merely the more general 'reducible' property. An algorithm is used to convert a 'reducible' CDFG into a 'series-parallel' structure, where the view tree is constructed on the fly. The constructed series-parallel (SP-) graph is created with one or more of the following aims in mind:

a) The SP-graph structure is very close to the original CDFG structure. In particular, when the CDFG already satisfies the SP property, the graph remains unmodified.
b) Modifications to the CDFG do not remove ordering constraints: if there was a path from node v1 to node v2 in the CDFG, the SP-graph also has a path from v1 to v2.
c) Modification steps of the graph are either:
Remove a (redundant) edge
Serialize edges: For a set of edges i specified with [va.i, vb.i], create one new node vs, and split each edge [va.i, vb.i] in to the pair of edges [va.i,vs] and [vs,vb.i]

Note that CDFGs and SP-graphs always have a unique 'top' node, that in reducible graphs each loop has a unique 'loop-entry' node, and loops are always properly nested. A suitable algorithm to transform a CDFG into an SP-graph (or the corresponding tree) is outlined through the following pseudo code:

```
sp_from_cdfg(graph:g, node:top_node) returns tree =
    case (top_node is a loop entry node):
        partition g in g1 and g2, such that
            g1 is the induced subgraph with the nodes belonging to the loop of
    top_node,
            g2 is the induced subgraph of g without g1.
        if (g2 is empty):
            return Loop(sp_from_cdfg(g1, top_node))
        else:
            serialize edges between g1 and g2 through a new node 'vs',
            remove inbound eges to 'vs',
            return Sequence(sp_from_cdfg(g1, top_node), sp_from_cdfg(g2, vs))
    case (top_node has no successors):
        return subtree_from_bb(top_node)
    case (top_node has single successor 'v2'):
        return Sequence(subtree_from_bb(top_node), sp_from_cdfg(g, v2))
    case (top_node has multiple successor nodes 'vx_set'):
        g1 = remove outbound edges of top_node which are redundant order
    constraints
        if (top_node has a just one outbound edge in g1):
            sp_from_cdfg(g1, top_node)
        else if (can partition 'vx_set' into two non-empty subsets 'vxs1',
    'vxs2',
            such that g1 does not hold a node which is reachable from both
    'vxs1' and 'vxs2'):
                create a v2 by serializing the edges from top_node to 'vxs2',
                g2 = remove inbound edges of v2 in g1,
                return Condition(sp_from_cdfg(g2, top_node), sp_from_cdfg(g2, v2))
        else
            partition 'vx_set' into two non-empty subsets 'vxs1', 'vxs2',
            such that a node 'vs' is reachable from both 'vxs1' and 'vxs2',
            and 'vs' does not have a predecessor that is reachable from both
    'vxs1' and 'vxs2'.
                partition g1 in g1a and g1b, such that
                    g1b = induced subgraph of g1 with vs and all nodes reachable from vs
                    g1a = induced subgraph of g1 without g1b,
                return Sequence(sp_from_cdfg(g1a,top_node), sp_from_cdfg(g1b, vs))
```

The above example algorithm generates a series-parallel tree with a vertex out-degree of two. A post-processing step on this tree can improve its structure by for instance merging several connected 'Sequence' nodes into a single Sequence node with higher out-degree.

In a preferred embodiment, the user selects a candidate loop or call node and a partitioning transformation by clicking and dragging a selected function or loop onto a new process icon using a pointing device. In a further embodiment, the user may also select a mapping of nodes and variables onto processor, peripheral hardware, and/or memory modules by a similar drag and drop mechanism. The user interface ensures that a user does not create illegal partitions by visually prohibiting the user to drag call or loop nodes onto a new process whenever data dependencies prohibit parallel execution.

Likewise, the user interface ensures the user creates a valid mapping by prohibiting illegal mappings, such as the mapping of recursive functions onto hardware or the allocating variables in a memory that is already fully allocated. The skilled person in the field of user interface design will easily be able to define many different graphical or other interfaces for modifying partitioning and mapping and to prohibit illegal partitions and mappings.

The visualization of dependencies enables a user to check if the dependencies captured by the analysis step 1200 correctly represent the data communication in the application. The following situations may occur
1) missing dependencies related to conditional read/write operations for which the condition was false;
2) identified address patterns that are either incorrect or incomplete due to data-dependent computation of the addresses;
3) dependencies that impose stronger constraints on the ordering of read/write operations than required for the application due to the inherent sequential style of programming in C.

In all cases, the user interface not only visualizes the dependencies and address patterns but also allows the user to edit the dependencies to ensure the correctness of automated transformations. In a preferred embodiment, editing a dependency is done by visually drawing a dependency line between two call or loop nodes, marking a dependency as invalid, or by selecting a particular access pattern on a set of read/write operations.

Design Management

Transform step 2000 derives a new design alternative from the seed design 2298 that exists in the seed pool. This step 2000 may be repeated as often as desired.

Preferably the transform step 2000 does not overwrite the seed design 2298 but creates a copy of the seed design 2298 in which some aspects are modified. Transform step 2000 does not overwrite the seed design 2298 as it may still be required as seed for another transformation, or as design alternative 2399 for the selection 3000 and build 4000 steps. Further, an advantage of creating a copy is that this facilitates design space exploration: one can quickly switch between design alternatives.

Preferably, all generated designs are recorded in a design database (not shown). The database manages the initial design 1999, seed designs 2499, and design alternatives 2399 and 2999. In a preferred embodiment the database stores a design as a set of references to different design files, such as the architecture file or a single compilation unit in the CDFG. To minimize the disk space, different designs may share design files for parts that are not modified in successive design transformations.

The design database stores meta information for each design, among others preferably the precise transformation commands used to execute each of the steps 1000, 2000, 3000 and/or 4000 to generate the design. These commands can be re-issued from the database to redo all transformations starting from a given seed design. This enables a user to rerun a sequence of transformations when the user modified the program sources 996, for instance to fix a bug or to remove data dependencies between operations. Rerunning these transformation commands also allows a user to re-create an existing database for a new version of the toolchain with a different format of internal design files and/or data structures.

Some of these transformation commands create parallel processes from the sequential input program 996. The estimator 2100 uses the stored transformation commands in the design database to decide how to combine the individual estimates of each process. For example, the overall delay of a pipeline of two processes is estimated as the addition of the estimated delays of each individual process. The "pipeline loop" transformation command informs the estimator that the two processes execute in a pipelined fashion. Conversely, the overall delay of two concurrent processes is the maximum of the estimated delays of the individual processes. Here, the "parallel loop" transformation informs the estimator the two processes have no dependencies on each other and execute concurrently. In addition, the estimator includes the effects of resource sharing, such as shared-memory communication.

Optimization Process

Figure 13:
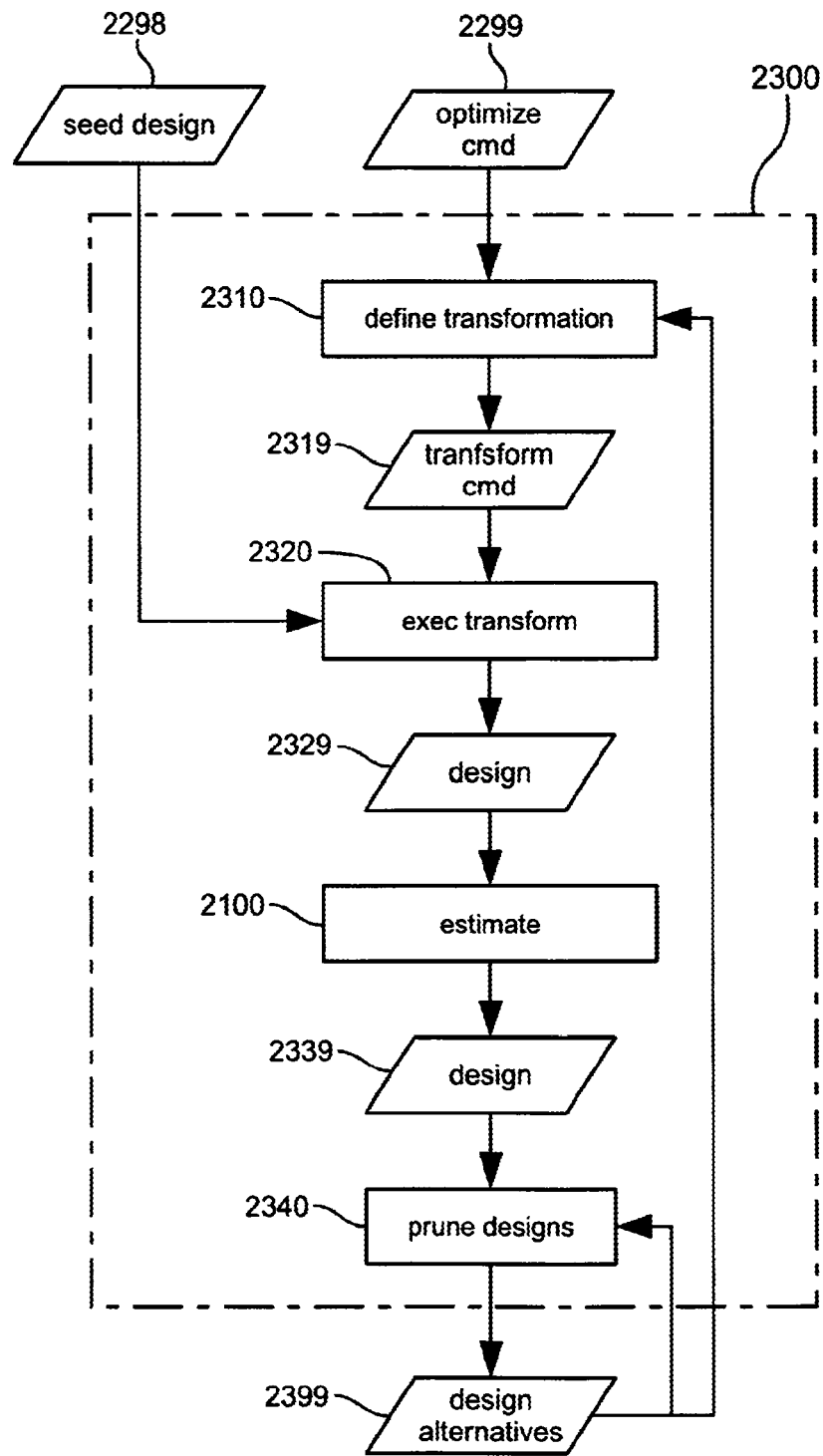
FIG. 13 shows one step of the optimization process of FIG. 12 in more detail.

FIG. 13 depicts a preferred embodiment of the optimization process 2300. Optimization process 2300 optimizes a function call or loop node in the tree 1299 of a seed design 2298 and generates one or more optimized design alternatives 2399. In step 2310 a transformation or sequence of transformations is determined in the form of transformation commands 2319. A transformation implementation step 2320 discussed in more detail below executes the transformation commands 2319 on a seed design 2298. These transformations increase concurrency, such as the "pipeline loop" or "parallel loop" transformations, accelerate parts of the program with the "remote procedure call" transformation, and/or move data communication to local memory with the "map variable" transformations.

If a requested transformation is not possible, for example due to data dependencies between elements in the program 996, step 2310 is repeated and an alternative transformation is executed.

The transformations may invalidate estimation information in the design. Thereto, an estimator 2100 updates the delay and area estimates of the transformed design 2329. If the resulting design 2339 is a pareto point with respect to the design alternatives 2399, it is added to the design alternatives 2399, otherwise it is discarded.

The optimization process 2300 may try different transformations to achieve the area or delay target specified in the optimize command 2299. The transformation 2320, estimate 2100, and prune 2340 processes may execute concurrently for different transformation commands 2319 to reduce execution time of the optimization process 2300. Also, a new transformation may be defined in step 2310 based on the results 2399 of a previous transformation. For instance, a "loop pipeline" transformation may not result in a balanced partitioning of the loop body. The optimization process 2300 may then decide to resort to a "remote procedure call" transformation that does not increase parallelism but maps the loop to a fast accelerator to reduce overall execution delay.

Transformation Implementation Step

The transformation implementation step 2320 transforms a seed design 2298 and generates a transformed design 2329. Transformations aim to increase performance of the design by splitting sequential code into concurrent processes, modifying the mapping of program elements onto hardware modules, and/or modifying the mapping of variables in the program 996 to different memories. Hereto, transformation implementation step 2320 transforms the application 9100, architecture 9300 and/or mapping 9200 of seed design 2298. The transformation command 2319 specifies the required transformation. A preferred embodiment includes but is not limited to the following transformation commands.

"remote procedure call" (RPC) transformation to move a loop or function call to another processor that executes the process more efficiently, e.g. an accelerator.

"distribute loop" transformation to split a loop body into two pipelined processes and transformation data dependencies (communication) from simple write-read dependencies to channel semantics.

"parallel loop" transformation to duplicate a loop with no loop-carried dependencies. Each copy of the loop has its own thread of control, where each such process performs the same operations on a different part of the input data set.

"software pipeline loop" transformation to move part of a loop body to a next iteration of the loop to reduce the critical path length of the operations inside the loop body. This transformation is used in combination with a "pipeline loop" transformation, in which a part of the loop body is mapped onto another processor.

"map symbol" transformation to map variables into special memory blocks or individual registers. An example is to map a global array used for communication between a microprocessor and an accelerator into an on-chip memory.

"map intrinsic" transformation to map a call to a predefined function in the program 996 to a predefined hardware module such as a peripheral or user-defined hardware IP block.

The object of a transformation often is a function or loop node in the tree 1299. A user can specify such a tree node in terms of a path in the original source code 996. In a preferred embodiment, the path is constructed as the list of functions and loops encountered on the execution path from the main function to the targeted call or loop node. If there are multiple calls to the same function in a function body, the call is identified with its relative position in the function body's source file with respect to the other calls to the same function. Similarly, loop nodes are identified with the keyword 'loop' and their relative position in the function body's source code with respect to other loops.

The following example:

main.foo.loop2.bar identifies the call to function bar in the second loop of the function foo when foo is called directly from main.

If a function bar is modified by transforming a loop body or call, a new function implementation bar' is created. The caller foo of the function bar' is a parent in the call hierarchy of tree 1299. Parent functions in the call hierarchy, in the above example foo and main, are adapted to call the new function. This way, the transformation is restricted a single path in the tree 1299 to bar, and leaves other invocations of bar unmodified.

"Remote Procedure Call" Transformation

Figure 14:
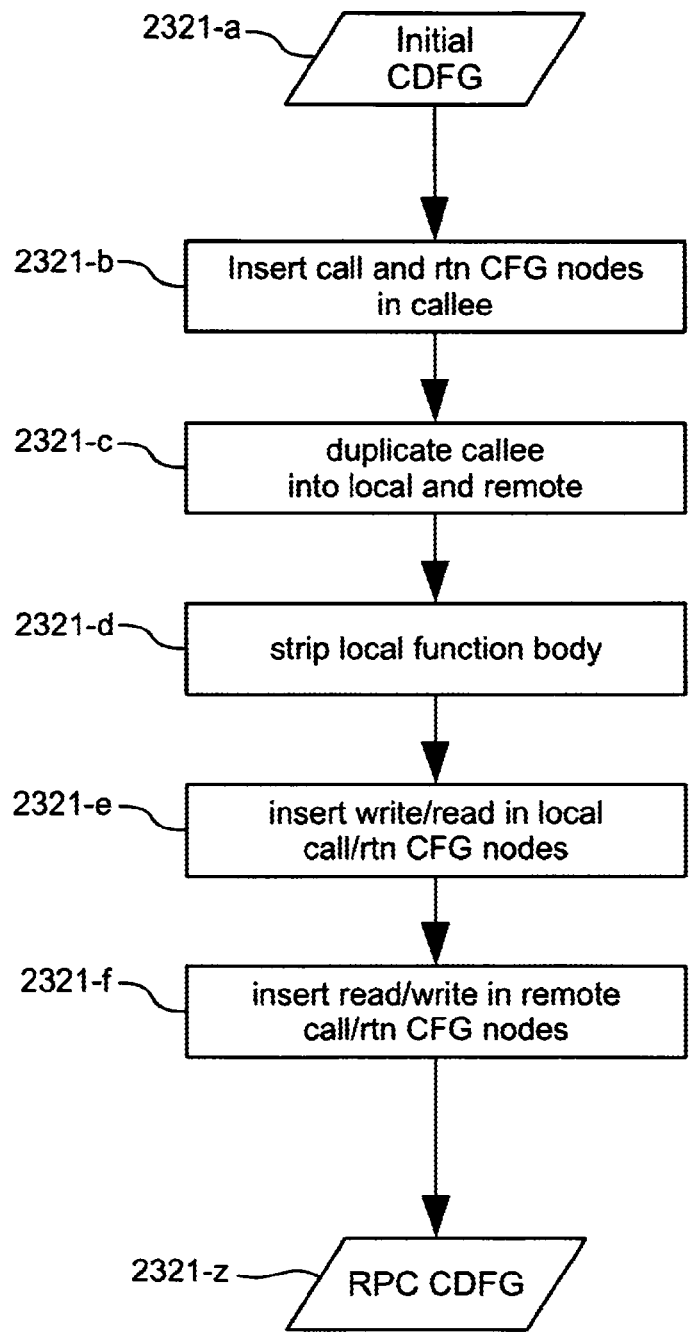
FIG. 14 shows an embodiment of transformation steps to transform a CDFG into a remote procedure call as part of the step of FIG. 13.

FIG. 14 shows an embodiment of remote procedure call transformation steps referred to above, transforming an initial CDFG 2321-$a$ into a remote procedure call or RPC CDFG 2321-$z$. An RPC transformation transforms a function call node in a CDFG into a remote function invocation. The caller stalls until the callee (remote function) returns. The callee is mapped onto a processor that can perform the function more efficiently than the caller's processor, for example a dedicated ASIC for the function.

This transformation does not touch the original CDFG function call node, but replaces the CDFG of the callee with channel write and read operations for the call arguments and call return value respectively. The remote function, a duplicate of the original callee CDFG is transformed to read the function arguments from the channel, execute the function body, and produce the return values on the return channel. In a preferred embodiment, the forward and return channels are also used to pass control to and from the remote function.

To perform the RPC transformation, first step 2321-$b$ inserts pseudo call and return nodes before and after the nodes of the initial CDFG 2321-$a$. Step 2321-$c$ subsequently duplicates the initial CDFG 2321-$a$, including the call and return nodes, into a local and remote copy. Next, step 2321-$d$ removes all CDFG nodes of the body of the local function, leaving only the call and return pseudo nodes. The live variables at the input of the local function are the original function call arguments. The live variables at the output of the return node are call return values.

Step 2321-$e$ inserts channel write and read operations into the call and return nodes of the local copy, effectively removing the live variables on the control edge between the call and return nodes. Similarly, Step 2321-$f$ inserts channel read and write operations into the call and return nodes of the remote copy, effectively removing the live variables at the input and output of the call and return node.

"Distribute Loop" Transformation

Figure 15A:
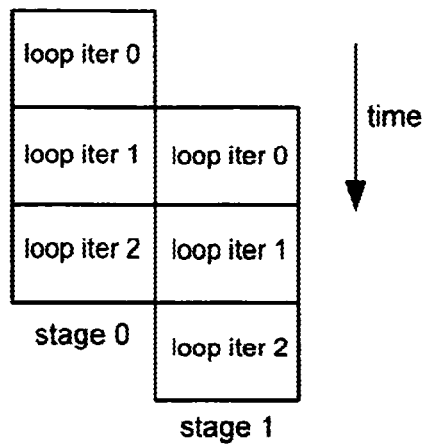
FIGS. 15(a), 15(b) and 15(c) show embodiments of transformation steps to create concurrency in the form of loop distribution as part of the step of FIG. 13.
Figure 15B:
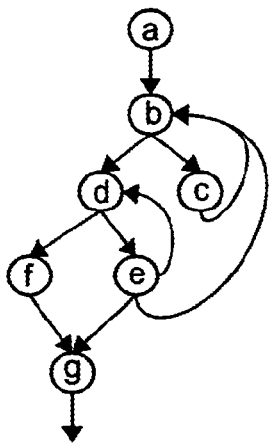
Figure 15C:
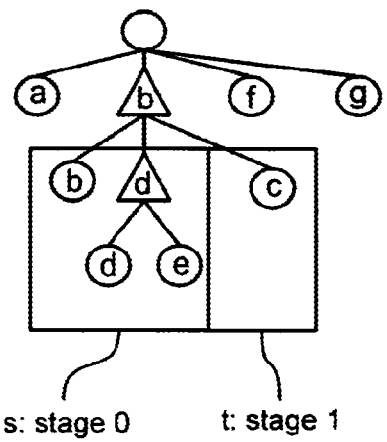

The "distribute loop" transformation creates concurrency in the form of loop distribution, where different CFG nodes execute in parallel. The parallelism obtained through loop distribution is the concurrent execution of the different stages. Pipeline stages are linearly ordered (0, 1, ... ). In FIG. 15($a$), (stage m, iter i) executes concurrent with (stage n, iter j) with m<n and i>j only. To allow such concurrent execution, data dependencies between stage 0 and stage 1 must be satisfied. A first embodiment is limited to the cases with data dependencies from (stage m, iter i) to (stage n, iter j) with m<n and i≤j only. In particular we assume that data dependencies with m>n are absent. That means in practice that execution of the stage 1 blocks in FIG. 15($a$) could be further postponed.

FIG. 15($b$) depicts a CFG in which a pipeline stage will be inserted in the loop. After creating the CFG loop nest tree, every loop consists of one or more individual CFG nodes, and maybe node-clusters of sub-loops. between these nodes and clusters, a partial ordering exists according to the CFG edges, omitting the loop-back edges. In this partial ordering, the loop entry node is always first. FIG. 15($c$) shows the loop nest structure corresponding with the loops in FIG. 15($b$). Control edges between nodes in different stages are always in pipeline-stage order. In FIG. 15($c$) they only run from b to C.

Figure 16:
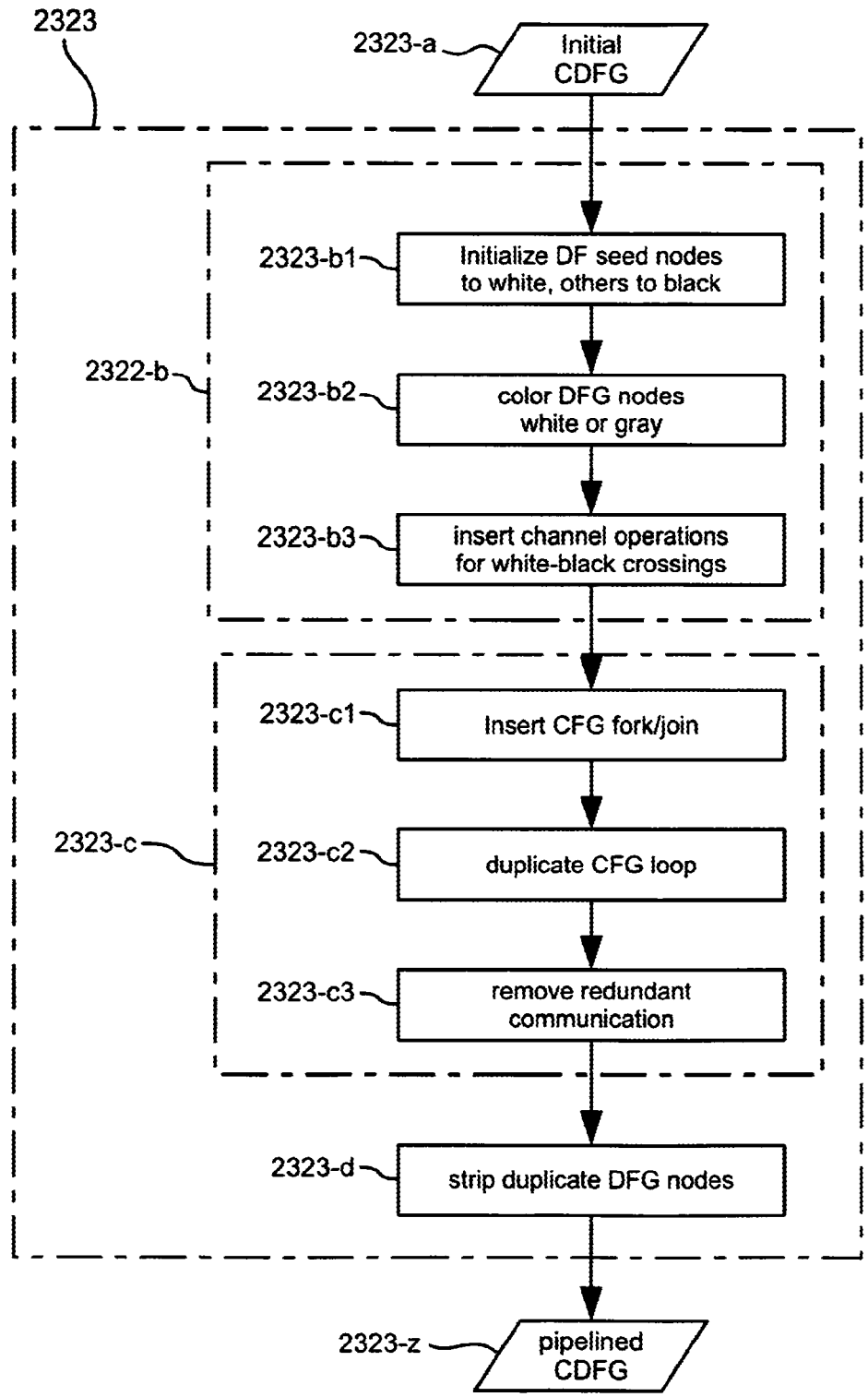
FIG. 16 shows a preferred embodiment of the loop distribution process as part of the process of FIG. 13.

FIG. 16 shows a preferred embodiment of the loop distribution process 2323. Step 2323-$b$ assigns dataflow operations to a pipeline stage and replaces data communication between pipeline stages with channel read/write operations. Step 2323-$c$ then duplicates the loop control at CFG level and inserts explicit fork and join CFG nodes. Step 2323-$d$ subsequently removes duplicate dataflow operations from each copy of the loop according to the earlier assignment 2323-$b$ of dataflow operations to pipeline stages.

Figure 17A:
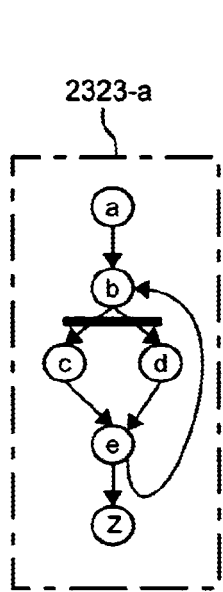
FIGS. 17(a) and 17(b) show original and pipelined control flow graphs as input and output of the process of FIG. 16.
Figure 17B:
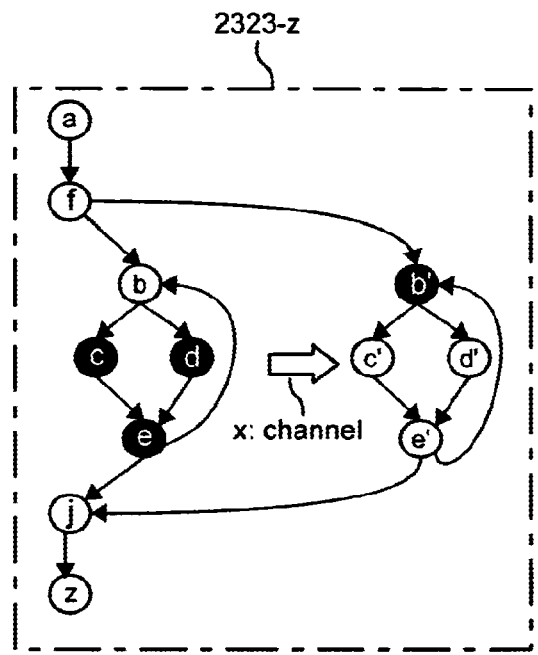

FIG. 17(a) depicts the original CFG 2323-a with the pipeline stage to be inserted between nodes b,c,d. FIG. 17(b) shows the resulting pipelined CFG 2323-z with fork node f and join node j. The shaded CFG nodes c,d,e and b' are stripped of all dataflow operations that are not explicitly needed for the loop control. Any data dependencies between the left and right loops (stages) is transferred via the channel x by means of channel write operations in CFG nodes c,d,e and read operations in nodes c',d',e'.

Pipelined Data Dependencies

Two types of data dependencies are distinguished:
1. Static data dependencies: these are explicitly available in the CFG (with SSA) and DFG graphs, and originate from assignment to and dereference of variables in the input program. Typically, such values are—in a later compilation stage—mapped to registers.
2. Dynamic data dependencies: these are caused by load- and store-operations in the program. If several such operations access the same address, ordering dependencies must be obeyed. If a load operation accesses the same address as some earlier store, a data value is transferred. Besides such a 'W→R' dependency, also 'W→W' and 'R→W' dependencies must be obeyed to maintain data correctness. These dynamic data dependencies are captured in the analysis trees 1299.

Furthermore, different data pass situations must be considered:
1. Data dependencies over forward pipeline boundaries, e.g. from FIG. 15(c) node b to node c.
2. Data dependencies over loop iterations, i.e. variables which are live across the loop-back edge.
3. Data dependencies from outside of the loop into loop nodes, e.g. from FIG. 15(c) node a to node c
4. Data dependencies from loop nodes to the outside, e.g. from FIG. 15(c) node b to node g Clearly, data dependencies which do not cross a pipeline stage boundary are not affected by the pipeline transformation.

Ad 1: Data Over Forward Pipeline Boundaries

For passing data over forward pipeline boundaries, typically extra data copies need to be made (or, in other words, an extra storage location for the value is needed). For a fixed 1-pipeline stage deep schedule, one extra copy would be sufficient. The extra copy decouples the exact moments in time of:
value consumption, somewhere in the time-interval of (stage 1, iter i)
value production, somewhere in the time-interval of (stage 0, iter i) and
value over-write, in the time-interval of (stage 0, iter i+1).

Such duplicate storage is normally referred to as a 'ping-pong' buffer. In general, values that are passed over a pipeline stage are more easily handled by a streaming channel. By adjusting the channel depth, the scheduling freedom for the pipeline can be improved. Moreover, a channel implementation with a blocking read/write leads straightforwardly to an automatic scheduling policy.

Ad 2: Data Dependencies Over Loop Iterations

Data dependencies over pipelined loop iterations basically cannot occur: these must be removed prior to, or as part of, introduction of the pipeline. The aim is to remove variables that are live over the loop-back edge. For (inevitable) loop carried data dependencies, it is supported to have live variables over loops inside a pipeline stage.

Ad 3: Data Dependencies into the Loop

During execution of the loop, the loop environment stands still. Variables created before the loop can be repeatedly dereferenced inside the loop. This behavior is not affected by the loop pipelining.

Ad 4: Data Dependencies Out of the Loop

During execution of the loop, the loop environment stands still. Variables created in the loop, can always be dereferenced outside the loop. Some support is needed to synchronize the loop-termination of the last pipeline stage with the environment.

Pipeline Assignment

Given a set of CFG nodes that together form a loop, step 2323 assigns all dataflow (DF) nodes in the DFGs that correspond to the loop to a pipeline stage. No data dependencies (data transport) shall remain backwards over pipeline stages, neither static nor dynamic. The assignment of DF nodes to pipeline stages to the following rules.
1. Operations with side effects, notably stores, must be assigned to a single pipeline stage. If called functions are not inspected, calls also cannot remain duplicated. This requirement may be relaxed in an alternative embodiment.
2. Load and store operations that have a dynamic data dependency must be assigned to the same stage. Alternatively the load and store operations must be converted to channel read/write operations to satisfy the dynamic dependency across the pipeline boundary. These restrictions also hold for function calls with load and store operations.
3. Every loop must fulfill its (static) data dependencies to compute its loop-exit condition.
4. Dynamic data dependencies across the pipeline boundary must be satisfied, i.e. only data dependencies from stage 0 to stage 1 are allowed.
5. The resulting loops must have a reasonable workload balancing.

In general, these criteria might be conflicting, invalidating a suitable loop distribution. The channel may be used to only transport the dynamic data dependencies that result from load/store operations in both loops (and the therein called functions). Static dataflow computations without side effects but with a dependency across the pipeline boundary are assigned to both pipeline stages. Alternatively, such static dataflow operations are each assigned to a single stage and the computed values are passed through the channel.

Step 2323-b assigns each DF node to a pipeline stage by means of the following color assignment:
white: this DF node becomes part of pipeline stage 0;
black: this DF node becomes part of pipeline stage 1;
gray: this DF node is copied in both pipeline stages.

Step 2323-b1 assigns an initial coloring to reflect the intended pipelining.
All DF nodes in the other CFG loop nodes become black. This represent the default assignment of all nodes to the last stage, stage 1.
All DF nodes in the CFG nodes in the first pipeline stage become white. These are the 'seed' nodes for pipelining, showing the intent of the user to ensure that these nodes are assigned to pipeline stage 0.

In Step 2323-b2, the node colors are updated (repeatedly) until the above rules are satisfied:
the loop-exit jump nodes are gray;
store and call nodes are black or white;
there is no data/order dependency from a black node to a white node or a gray node;

there is no data/order dependency from a gray node to a white node;

dynamic data dependencies between a white and a black (load, store or call) node are satisfied (i.e. have a loop distance of at least one).

A proposed algorithm for Step 2323-*b2* is to try to assign nodes that are by default assigned to the last stage to an earlier stage, starting with the 'seed' nodes. In effect, the algorithm initially colors all nodes black and tries to make the color of nodes lighter (from black to gray to white). This iteration is guaranteed to reach a fix point as it only makes the node color lighter, never darker. To avoid that the algorithm moves away from an intended solution, some DF nodes (e.g. critical call nodes) can be locked to white or black.

To create a deeper (multi-stage) pipeline, the pipeline assignment step 2322-*b* can be repeatedly applied to split pipeline stages. An alternative embodiment constructs a multi-stage pipeline in a single run of an extended algorithm. This is beneficial to achieve a more accurate balancing of pipeline stages. The extension from 2 to more pipeline stages (colors) can be implemented with a bit vector (0 ... n) per node, in which bit[i] represents assignment to the pipeline stage i. In the initial assignment of seed nodes all bits are cleared except the bit corresponding to the targeted stage. Default nodes only set bit n, representing the color black. Starting from the black default nodes, lower bits in the vector are set to satisfy data dependency constraints and higher bits are cleared to satisfy duplication constraints. For a two-bit vector (0 ... 1), the color white corresponds to 10, gray to 11, and black to 01.

Duplicate Loop Control for Each Pipeline Stage

Each pipeline stage can be considered as a separate thread of control. It is desired that each of these threads (loops) is itself specified with regular CFG semantics. Therefore, step 2323-*c* duplicates the loop such that each of these threads obtains its own loop control. Live data that was transferred (available) over edges that cross a pipeline stage are passed through a channel.

Introducing concurrent threads of control changes the semantics of the CFG. At the start of the pipelined loop, multiple nodes become active. On completion of the loop, multiple predecessor nodes must terminate after which the single successor becomes active. To capture this semantics without modifying the original CFG nodes, Step 2323-*c1* inserts explicit 'fork' and 'join' nodes the CFG.

Note that a loop (with a single loop-entry node) can have multiple loop-entry edges and multiple loop-exit edges. One 'fork' node is inserted in front of the loop-entry node, multiple 'join' nodes can be inserted: one for every loop exit edge.

When a value is needed behind the loop, it may be produced in both (more than one) loop copies. In such case, the multiple productions are assumed to have the same value. Step 2323-*c3* selects one of these for later use and discards the duplicate productions to avoid redundant data communication. The preferred value can be the one from the 'local' loop copy, assuming that the other copies execute on other processors. So, although the 'join' node has multiple inbound edges, each value arrives on one edge only. In case the second (right) pipeline stage executes 'remotely' on a different processor or hardware accelerator, the fork and join nodes are responsible for starting/initializing the remote thread, respectively finishing it.

"Parallel Loop" Transformation

Figure 18A:
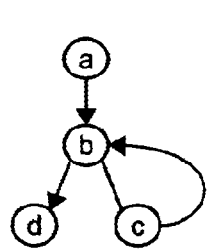
FIGS. 18(a), 18(b) and 18(c) show the use of loop unrolling to create parallel loops with a reduced iteration count as part of the step of FIG. 13.
Figure 18B:
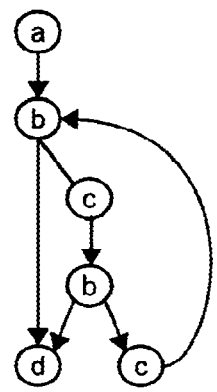
Figure 18C:
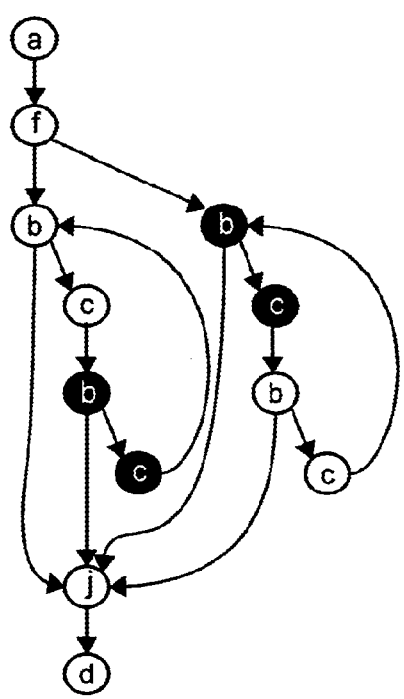

In case there are no (dynamic) loop carried data dependencies, loop bodies can execute in parallel, without introducing any loop pipelining. Obviously, such loops create a high degree of parallelism with resulting high speed-up when sufficient hardware is available. Without loop-carried dependencies, the channel between the pipeline stages remains empty. FIGS. 18(*a*), (*b*) and (*c*) show the use of loop unrolling to create parallel loops with a reduced iteration count.

The original loop as shown in FIG. 18(*a*) in the CDFG is first unrolled twice, i.e., the loop nodes are duplicated. This results in the loop of FIG. 18(*b*). The loop-back edges of the first copy point to the loop-entry of the second copy. Clearly, such CDFG transformation must maintain the original code functionality. Note that, in this step, we did not modify the DFG content of the CFG nodes, we only copied nodes and rerouted the CFG edges. The loop iteration count is now halved without requiring a detailed analysis of the loop control.

Next we execute the loop distribution transformation 2323, that (again) duplicates the loop, and strips the content of the loop bodies. If no dynamic loop data dependencies exist, this stripping will be successful, leading to CFG nodes that are empty except for loop control, as depicted in FIG. 18(*c*). Clearly, this unroll-and-strip procedure will work correctly also for loops that are not compile-time analyzable such as:

for (i=0; A[i]>0; i++) { ... }

This section showed how parallel loop bodies can be created from a loop without loop carried dependencies. First loop unrolling was performed, then the earlier presented pipelining. An alternative embodiment may optimize this procedure with a direct conversion collapsing both algorithms.

"Software Pipeline" Transformation

Software pipelining of loops is in general referred to as a transformation in which some part (computation) of a loop body is moved to a next iteration. This inevitably leads to a result, where the transformed loop is preceded by a loop 'preamble' and followed by a loop 'postamble', effectively duplicating the loop code. In general, the aim is to reduce the critical path length of the operations inside the loop body. In some implementations, the preamble and postamble are implemented by conditional execution of parts of the loop body, and adjusting the loop count accordingly, as to avoid code duplication.

A first embodiment implements a software pipeline using the pipeline assignment 2323-*b1*, 2323-*b2*, loop duplication 2323-*c2*, and stripping 2323-*d*. The pipeline assignment separates the preamble and postamble. Next, the original loop is duplicated and inserted between the post and preamble. Reconnecting the control edges of the preamble and postamble effectively creates a software pipeline with a 1-loop scheduling delay. Dynamic data dependencies must be satisfied by transforming the load/store operations to channel read/write operations or to a more efficient implementation using some form of FIFO variables. Note that by extending the pipeline assignment to more than two stages, software pipelines of arbitrary depth can be created.

An alternative embodiment avoids the duplication of preamble and postamble for each additional pipeline stage by keeping the preamble and postamble in the loop and guarding their execution with a loop iteration counter. In this case the pipeline assignment 2323-*b1*, 2323-*b2*, loop duplication 2323-*c2*, and stripping 2323-*d* steps are used to identify the preamble and postamble.

Design Selection Process

Figure 19:
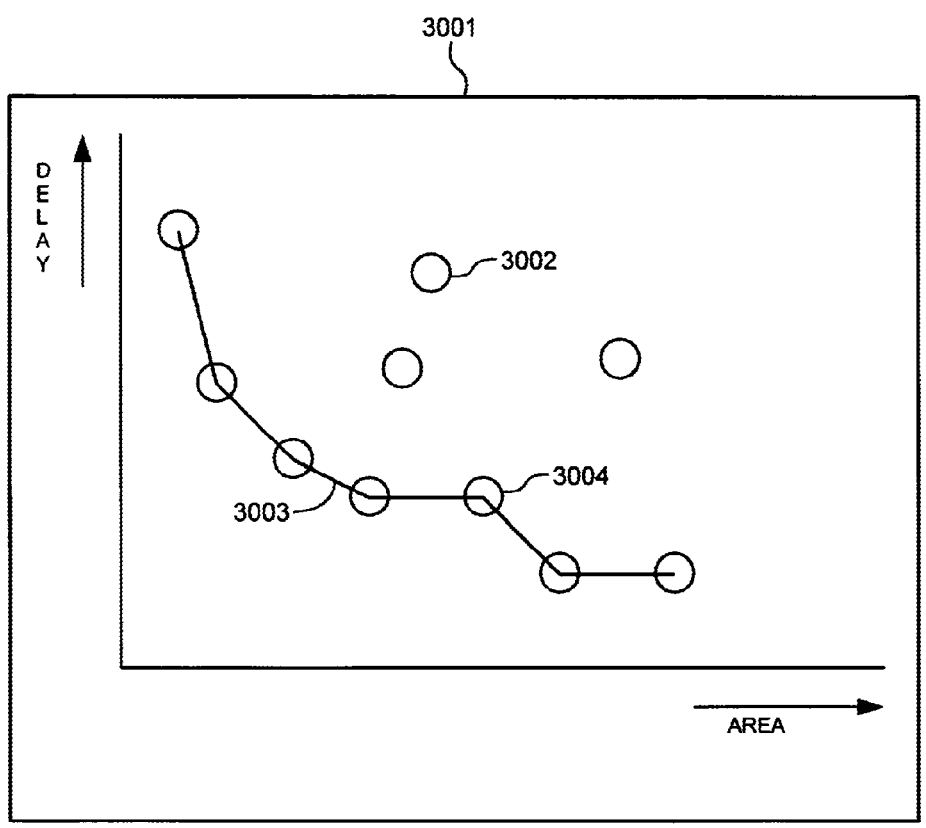
FIG. 19 shows a preferred embodiment of a user interface for use with the select process of the invention.

FIG. 19 shows a preferred embodiment of a user interface for use with the select process 3000 according to the invention. Select process 3000 presents the design alternatives 2999 generated by the transform process 2000 in the form of a design space view 3001. This design space view 3001 allows the user to conveniently select a design 3999 of his choice. Selecting a design indicates a request to execute build process 4000 in order to build the selected design 3999. A design is selected by performing some interaction with the corresponding design point 3002 in the design space view 3001, for example by double clicking on it using some pointing device. Many alternatives to present the design alternatives 2999 and to permit the user to choose the selected design 3999 are known to the skilled person.

Design Space View

The design space view 3001 efficiently captures the trade-offs of all design alternatives 2999 and allows for easy comparison. To compare the quality of the design alternatives 2999 in a convenient way, each design is associated with a point 3002 in the design space view 3001, which is a N-dimensional space, where N can be larger than 2. The location of these points is given by the value of characterizing quantities of the design they correspond to. Examples of these quantities are area, delay, power consumption and monetary cost. The design space view 3001 shown in FIG. 19 is a two-dimensional space because only area and delay are used as characterizing quantities.

For all known design alternatives 2999, a design point 3002 in the design space view 3001 exists. During the transform process 2000, in particular as a result of the execution of optimization process 2300, new design alternatives 2399 are being generated. Each of these alternatives is assigned a new design point 3002 and is added to the design space view 3001.

To assist the user in selecting the best design alternatives, a pareto frontier is shown in the design space. The pareto frontier 3003 is a set of pareto points 3004. A pareto point 3004 is a design point which is not strictly dominated by another design point. This means that each pareto point represents a design that is the best choice in the design space close to that point.

In a preferred embodiment, the set of pareto points which make up the pareto frontier 3003 is updated each time new design points are created. This allows for a real-time view of the progress of the transform process 2000. In another preferred embodiment, the estimates of the design alternatives 2999 as discussed above are refined during idle time of the host computer to increase accuracy of this set of points. The refinement can include actual compilation or synthesis using backend tools. While the user is viewing the pareto curve, the estimates are refined and updated.

User Interface with the Design Space View

The design space view 3001 is used to show all design alternatives in one view. It allows users to quickly gain insight in the way the design alternatives 2999 compare to each other in terms of quality.

Each design point 3002 is able to reveal detailed information about the design alternative it represents. The user can view this detailed information by performing some interaction with the design point 3002, for example by clicking on/moving over it using a pointing device. The detailed view may be shown as a pop-up window or in a separate view. The skilled person in the field of user interface design will easily be able to come up with many different graphical or other interfaces for viewing and interacting with the design space view 3001.

Gradual Refinement

Each design point 3002 can become more accurate over time, due to gradual refinement of the performance estimates of the design it represents. During idle time of the host machine, increasingly more detailed estimators can be run in the background, improving the accuracy of the estimates. This causes the design points to shift increasingly closer to the real value within the design space.

Recalling the definition of "design" given at FIG. 7, it is clear that estimates are not part of a design. Therefore it is possible to compute new estimates for an existing design without modifying said design. This is important because it allows computing new estimations without rerunning or interfering with the transformation step 2000. As a result, the gradual refinement process can run even after design step 2000 has completed, for example while the pareto curve is being presented in step 3000.

License Model

In a preferred embodiment a token-based license model is added to the design selecting procedure. As is well known from the field of e-commerce, tokens are digital codes that represent a monetary value. In the present invention, tokens are used to purchase specific design components. A token module (not shown) is then incorporated into the toolchain.

The user can buy or otherwise acquire certain amounts of tokens at any time, which add up to the user's total amount of available tokens. Various models may be used to make tokens available. For example subscription models may supply users with fixed amounts of tokens per month. Users could be billed in advance or retrospectively. Tokens could be sold to third-party resellers or be given away as promotional items. Tokens can be sold electronically, e.g. as e-mail or code in a web page, but may also be sold or given away recorded on a physical medium such as a USB memory stick. To keep track of available and used codes, the user may be required to log into a web site. Many schemes are known in the art to keep track of tokens, e.g. in the field of electronic gift certificates.

Building a certain design costs a certain amount of tokens. This amount depends on the quality of the selected design. This quality corresponds to the cost/benefit of each of the design components used. A component with small area and low delay may have a high associated cost, for example. The price of a component is typically set by its designer. Thus, this license model supports the creation of a marketplace for design components by different parties. Creators of components can put a price tag on their components, and actively compete with each other based on price, quality and other factors of components with similar functionality.

In one embodiment, each design point 3002 is shown in the design space view 3001 with its associated token cost to let the user take this factor into account in his comparison. Such a design point can then only be built after payment of the corresponding number of tokens. In another embodiment, the user can set a maximum cost, which eliminates all design points from the design space view 3001 whose associated cost exceeds the set maximum. This avoids the calculation of design points that are too expensive for the user.

Tokens are used to pay for each design that is produced using the toolchain. When building a design, the user's available tokens decrease with the cost of the selected design being built. The user may be required to pay the cost every time a design is built, or may be required to pay a single time to add the design component to the repertoire. Design components can be made available on a web site which developers can browse for potentially interesting components, much like stock photo sites of today. Tokens are then used to purchase a design component for download. No further payment of tokens is necessary.

To encourage the purchase of specific components, the toolchain may be programmed to generate design alternatives that rely on some or all these components. This way, the user can immediately see the benefits of choosing particular components and their associated costs. Effectively the used is teased into spending tokens this way.

Alternatively tokens may be used to pay for the calculation of each design alternative. The basis for payment then can be each alternative, the time spent on each alternative and so on. This allows for a reduction in the sales price of the toolchain itself, as most of the revenue will now be made through the token spending.

Alternatively or in addition to the above when the user manually performs steps 2200 and 2400 through the user interface, tokens may be used to pay for each generated design alternative 2399 as a result of the selected optimization 2299.

In addition or as an alternative to the token-based model, the supplier of a toolchain according to the invention may request a percentage of the price of a design component in return for adding this component to a standard library of available design components.

As an optional extension, users may be rewarded for reporting bugs by granting them some tokens. This is an easy and cheap way of generating user feedback that provides satisfaction to the users. Similarly, tokens can be used to pay for support and maintenance, for instance to buy support tickets.

Build Process

Figure 20:
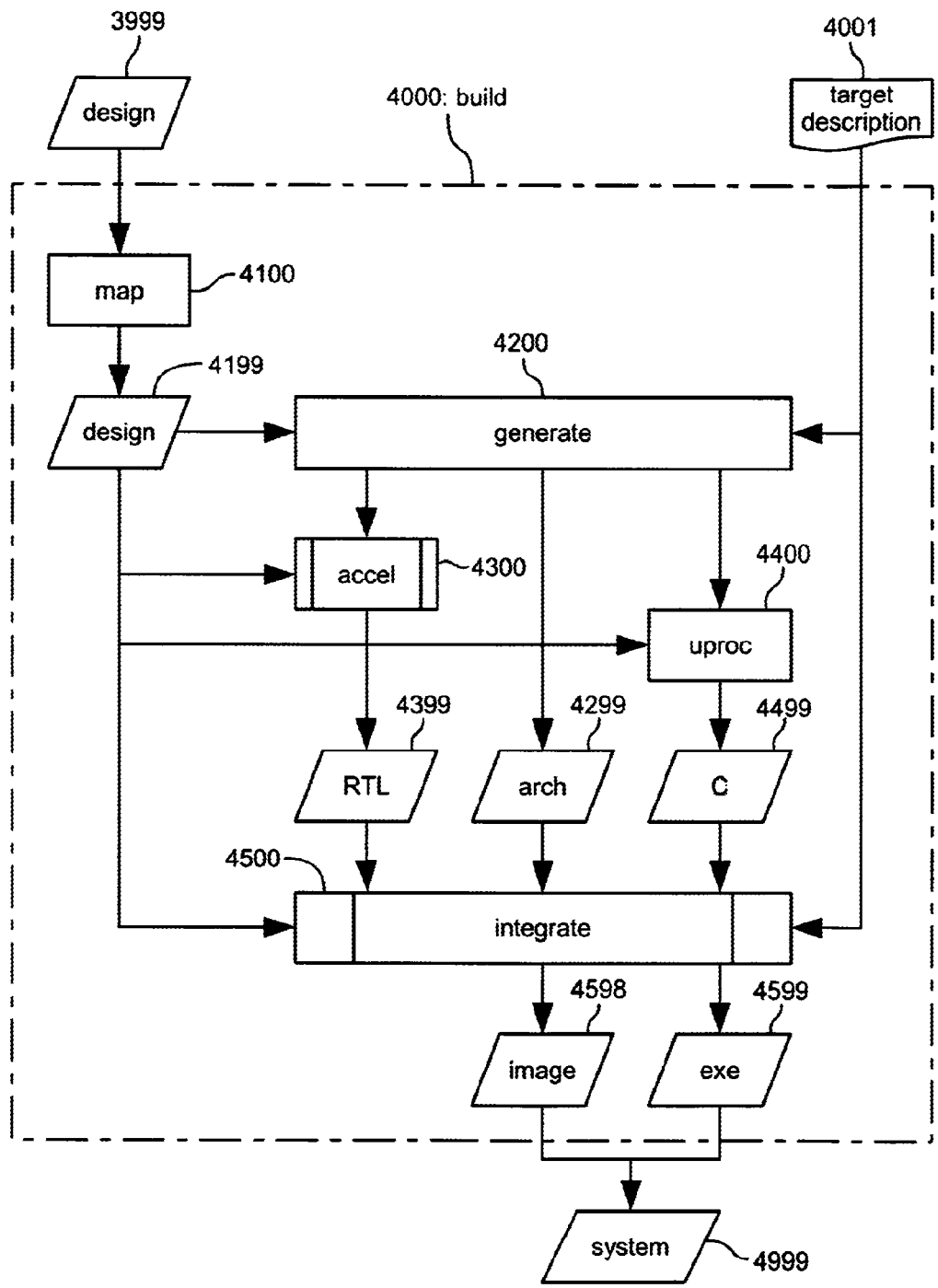
FIG. 20 shows a preferred embodiment of the build process of the invention.

FIG. 20 shows a preferred embodiment of the build process 4000 according to the invention. The build process 4000 creates the target-specific system implementation 4999 from the more abstract input design specification 3999 as selected in the selection process 3000.

First, the mapping process 4100 prepares the selected design 3999 for hardware and software generation by mapping variables to special memory blocks and mapping channel ports in the application to processor interfaces (physical ports). The mapping process 4100 in particular refines the selected design point 3999 into refined design 4199 by creating additional implementation choices. Some useful implementation aspects are the following:

Mapping of variables (or datastructures), such as found in the original program sources 996, into specific memory blocks which may appear in distributed form in the system architecture.

Creating a mapping for process ports that read/write to channels, to the physical ports that identify globally unique channel ports.

The mapping of variables into specific memory blocks is directed by different types of information, such as size of the variable in memory footprint, available space in the memory blocks, required bandwidth for accessing the variable, available bandwidth for the memory block, distance between the memory block and the processor(s) that access the variable.

Next, the generate process 4200 transforms refined design 4199 into hardware specification 4399, architecture description 4299 and software source code 4499. This is implemented by means of different components that each generate an aspect of the output. These components can be highly specific and optimized towards certain goals. For example a VLIW (Very Long Instruction Word) generator that generates highly optimized assembly code for a VLIW processor, or a vector processor generator that generates a hardware specification for an accelerator that is optimized towards SIMD (Single Instruction Multiple Data) processing. These generators can be acquired from third parties and/or be made available in a fashion similar to the token-based model described earlier.

In a preferred embodiment, the components used are:

accelerator generator 4300 creates a hardware specification 4399, preferably using the Register Transfer Level (RTL) language, from the CDFG of selected functions in the design 4199. The operation of the accelerator generator 4300 is described in more detail below.

code generator 4400 creates a software specification 4499, in a language such as C or assembly, from a CDFG of selected functions in the design 4199.

In addition to executing the generator components 4300 and 4400, the generate process 4200 creates the architecture description or 'netlist' 4299 using design 4199 as input.

Finally, the embedded system integration process 4500 creates the configuration image 4598 and executable software 4599 from this hardware specification 4399, architecture description 4299 and software source code 4499. To this end process 4500 calls standard (platform specific) lower-level implementation tools, such as logic synthesis, pin assignment, placement and routing, operating system configuration, and FPGA loading tools.

Accelerator Generator Process

Figure 21:
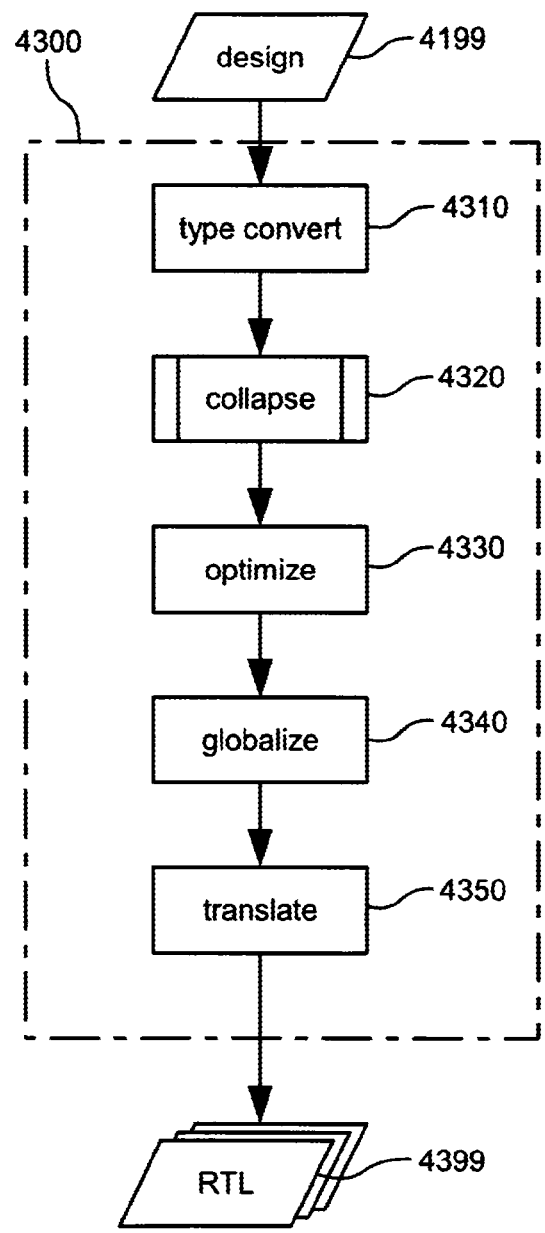
FIG. 21 shows the accelerator generator step of the process of FIG. 20 in more detail.

FIG. 21 depicts the accelerator generator process 4300 in more detail. The input design 4199 specifies that some sections of its program are to be mapped into a function-specific hardware accelerator structure. Accelerator generator 4300 converts each such program section into RTL code, which is the low-level specification of the accelerator to be implemented. The RTL code is generated in a well-known format such as Verilog or VHDL. Besides function-specific generated parts, this RTL code contains references to generic components from one or more standard libraries 4501. The resulting RTL is integrated into an image 4598 through standard back-end tools, such as logic synthesis, pin assignment, and placement and routing.

Accelerator generator 4300 generates the hardware specification 4399 of the CDFG functionality with a hardware structure that directly reflects the CDFG structure. Effectively, the semantics of the CDFG is mapped into system with token-flow semantics. The hardware implementations is characterized by the following features.

1. The DFGs inside the CDFG nodes are mapped into maximal parallel hardware to achieve high throughput.
2. The DFGs are controlled with distributed logic, according to Kahn-style token-flow semantics. The distributed control allows a high clock rate.
3. The token-flow control supports pipelined operation, where a new set of data inputs to operate on can be accepted before the results of the previous data set are produced.
4. The CDFG graph is mapped into additional control and data-routing hardware, also in a distributed style that mimics the CDFG structure.
5. The CDFG-induced hardware also supports pipelined execution, creating parallelism beyond traditional CDFG semantics: multiple CDFG nodes can be active concurrently for different input token sets.
6. The creation of this hardware control structure is supported for all 'reducible' CDFGs.

The accelerator generator 4300 implements the above features in the following sub processes, which may be executed in any order (although process 4350 should occur last) and some of these sub processes may be omitted if some of the above features are not desired or needed.

Type convert process 4310 converts the data types that occur in the input program into data types that fit the target system architecture. This conversion covers aspects such as the size of a pointer (number of bits to uniquely denote an address), default size of an integer, default size of a floating-point number, data-structure layout, data alignment restrictions, and endianness.

Collapse process 4320 collapses all basic blocks to a single basic block (DFG) in the CDFG for the specified functions to accelerate. Collapse hereby removes the synchronization points incurred at basic block boundaries and thereby increases potential concurrency. The collapse process 4320 is discussed below in more detail.

Optimize process 4330 simplifies data flow operations and removes redundant ordering constraints between operations that limit concurrency.

Globalize process 4340 defines interfaces for load/store traffic and channel operations to the accelerator. The accelerator is implemented as a hierarchy of RTL modules following the call hierarchy, i.e. each function is implemented in a separate RTL module. If a function contains load/store and/or channel operations, the corresponding bus and channel interfaces are added to the accelerator's top-level module and connected to the respective child modules.

Translate process 4350 generates hardware specification 4399 from the optimized CDFG resulting from the other steps, adding distributed control hardware and pipeline registers.

Collapse Process

In the collapse process 4320 DFGs with embedded control flow are obtained by collapsing several CDFG nodes, and inserting 'phi' DFG operations to represent the resulting (conditional) dataflow. These phi branch (BR) and merge (ME) nodes perform data routing based on a control input that specifies the selection. They are semantically different from a computation node in that not all ports transfer a data token when the node performs its operation. Only one output of a branch node produces a token, and only one data input of a merge node consumes a token. A loop entry (LE) node is used as alternative to merge to allow data to enter loop constructs. This structure with data routing using phi nodes is described in Van Eijndhoven and Stok, "A Data Flow Graph Exchange Standard", Proceedings of the 3rd European Conference on Design Automation, 19 Mar. 1992, page(s):193-199.

Non-Series-Parallel CDFGs

The collapse process using phi nodes is in particular easy to implement for series-parallel structured CDFGs. Series-parallel control structures fit with language constructs such as if-then-else and while-do in typical languages. However, the output of C-compilers, in particular the open source GNU Compiler Collection (gcc), often is not series-parallel, meaning that C-language constructs such as 'continue' and 'break' create a more complex (loop) structure. This also holds for using 'return' in inner blocks of if-then-else and loop constructs;

the C-compiler attempts to merge (collapse) simple basic blocks as to reduce branching overhead.

Figure 22A:
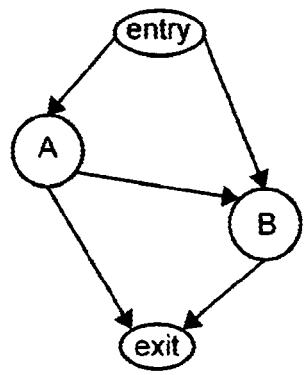
FIG. 22(a) shows an example reducible CDFG as input to the collapse step of the accelerator generator step of FIG. 21.
Figure 22B:
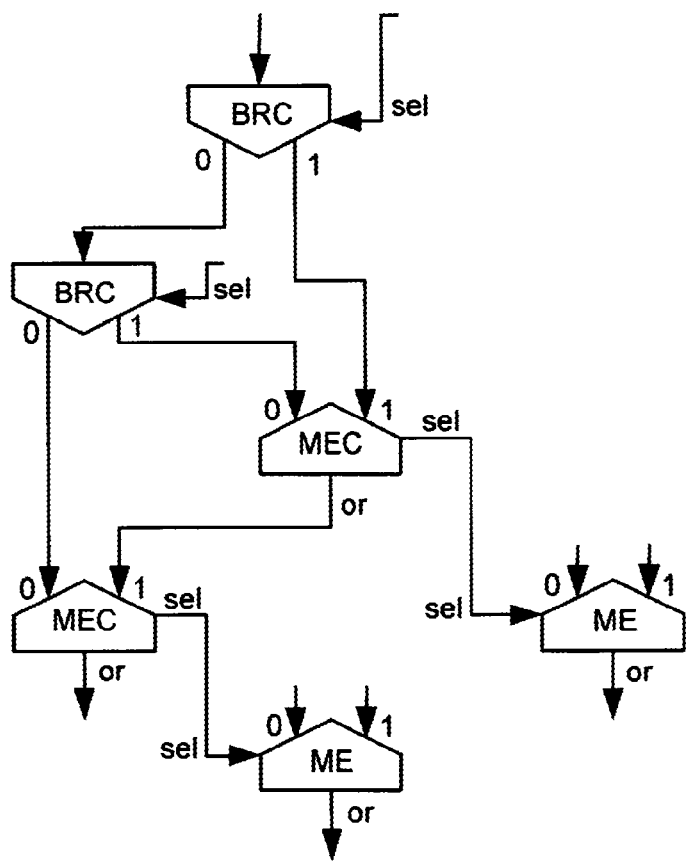
FIG. 22(b) shows the control structure with of the collapsed CDFG of FIG. 22(a)

FIG. 22(*a*) shows a typical CDFG that is not series-parallel as input to the collapse step 4320 of the accelerator generator step of FIG. 21. Note that each of the CDFG nodes in FIG. 22(*a*) contain a data flow graph, extended with conditional branches that create the two different exit points of the 'entry' and 'A' node.

A preferred embodiment of the invention provides a constructive method to collapse the more general reducible CDFGs into a hardware control structure. All series-parallel graphs are reducible. The CDFG of FIG. 22(*a*) is not series-parallel but still satisfies the reducible property, i.e., the graph can be reduced to a single node by repeatedly applying a collapse of a node pair, and removing self-loop edges. A node is allowed to be collapsed with its predecessor node, if it has one unique predecessor node. In above example, first 'A' can be collapsed, then 'B', and finally 'exit'.

CDFGs without Loops

The DFG of a CDFG node with multiple exit points contains branch nodes that create the values that are live over the exit edges. For a non-selected exit point, no token is made available. Correspondingly, for the selected exit, all outbound value tokens are offered. Note that due to scheduling, these tokens typically become available at different points in time.

To lift the series-parallel restriction, in this embodiment a control variable is introduced that reflects that a particular exit point is chosen. Exactly one such variable is available along each CFG edge. This variable is offered at each exit point, with a 'true' value for the selected exit, and a 'false' value for all other exits. So, this will be the only token that becomes available on a non-chosen exit. The purpose of this control variable is to:

mark activated CDFG nodes. This includes support for pipelined operation of the CDFG, coordinated such that the pipeline wave-fronts cannot bypass each other. This ensures the property that function invocations terminate (return) in the order that they were launched;

create the selection conditions for the 'phi' merge nodes at the entry of each CDFG node.

To compute the control variable, the phi nodes branch control (BRC) and merge control (MEC) are introduced. Table 1 gives the logic behavior of the BRC node. The BRC node handles the exit conditions of a CDFG node. Its 'sel' input is driven by the DFG content. In Table 1, 'none' means that for this execution, the node does not consume a token from the specified input.

Table 2 gives the logic behavior of the MEC node. The MEC node reflects the entry of a CDFG node. The MEC node creates the select condition for the dataflow merge nodes that select the other variables. In Table 2, 'none' means that no output token is created. 'ERR' indicates a situation that supposedly never occurs.

TABLE 1

Logic behavior of the BRC node

| D-in | sel-in | 0-out | 1-out |
|---|---|---|---|
| false | none | false | false |
| true | 0 | true | false |
| true | 1 | false | true |

TABLE 2

Logic behavior of the MEC node.

| 0-in | 1-in | or-out | sel-out |
|---|---|---|---|
| false | false | false | none |
| true | false | true | 0 |
| false | true | true | 1 |
| true | true | ERR | ERR |

In general, branches and merges can span more than 2 alternatives. In such case, the ports are numbered '0', '1', '2', . . . , and the sel token contains an integer value corresponding to the selected port number.

FIG. 22(*b*) shows the resulting control structure for the reducible CDFG of FIG. 22(*a*). The ME nodes select the dataflow for the (not shown) variables that are live over the CDFG edges. The open sel inputs are assigned by the computation nodes in the DFGs that belong to the respective CDFG nodes ('entry' and 'A'). Note that the lower-left sel input is not assigned if the entry node takes its right exit: in that case the DFG inputs into node 'A' will be inactive (have no token).

This embodiment allows deep pipelining in the execution of the resulting implementation, which improves throughput of the device. Although the original CDFG semantics assume that only one CDFG node is active at any moment, the generated implementation operates in a pipelined way, accepting new entry data before the exit data of a previous invocation is available. To obtain effective pipelining, the newly generated control variables need appropriate FIFO buffering.

CDFG with Loops

In reducible CDFGs, each loop is identified by exactly one LE (loop entry) node. The loop back edges are edges that arrive at the LE node, and create a cycle in the CDFG. Clearly, a LE node can have multiple loop back edges. The other inbound edges of the LE node are loop entry edges.

To implement loops in reducible CDFGs, we introduce a loop entry control (LEC) node which is very similar to the earlier MEC (merge control) node. Table 3 gives the logic behavior of the LEC node. The '0' input connects to a loop entry edge, and the '1' input connects to a loop-back edge. The LEC node has a special initialization condition similar to the LE node: upon reset, the '1' input buffer is initialized with a 'false' token. If multiple loop-entry edges exist, they can be merged with a MEC node before connecting to the '0' LEC input. The same holds for multiple loop-back edges to the '1' input.

TABLE 3

Logic behavior of the LEC node.

| 0-in | 1-in | or-out | sel-out |
|---|---|---|---|
| false | false | false | none |
| true | false | true | 0 |
| none | true | true | 1 |

The LEC node creates multiple tokens on its outputs for every token that arrives at its '0' (loop entry) input. For the loop exit edges, a control mechanism must be inserted to ensure that the loop exit edge is only activated on performing the actual loop exit, i.e., it does not create 'false' control tokens for every loop iteration. To this purpose, the loop exit control (LXC) node is defined.

Table 4 gives the logic behavior of the LXC node. Note that the LXC semantics are actually identical to a BR node, where the 'BR-1' output is left open. Open outputs are permitted in general: tokens appearing there are always accepted and dropped. This result is similar to loop construction in series-parallel graphs with BR/ME/LE nodes, where loop exits can be implemented with regular BR nodes.

TABLE 4

Logic behavior of the LXC node.

| D-in | sel-in | D-out |
|---|---|---|
| true/false | true | none |
| true | false | true |
| false | false | false |

If a CDFG node has more than two exits, these exits (jumps) have a strictly sequential order. The jump ordering directly results in a specific ordering (dependencies) between branch nodes, and therefore affects the resulting control structure. The control structure is created according to the following design rules.

Branches are made in a dependency relationship according the jump order inside the CDFG node. This holds for both regular (data) BR and the BRC nodes that create the control tokens for the guard inputs of the data BR/ME nodes.

LE and LEC nodes are created for each CDFG node with inbound loop-back edges. (A loop entry node with multiple loop-back edges will merge the loop-back edges, to obtain a single loop control condition, as shown in the previous paragraph.)

LXC nodes are inserted for the control token filtering, on every control-token edge which is a loop exit edge. Reducible graphs have a unique loop nesting. If a loop exit edge is a simultaneous exit of multiple loops, multiple LXC nodes are created in the order of the CDFG loop nesting: each LXC node belongs to a unique loop, represented by a loop entry node. The LXC nodes are controlled on their guard input by the respective loop-entry condition.

Figure 23A:
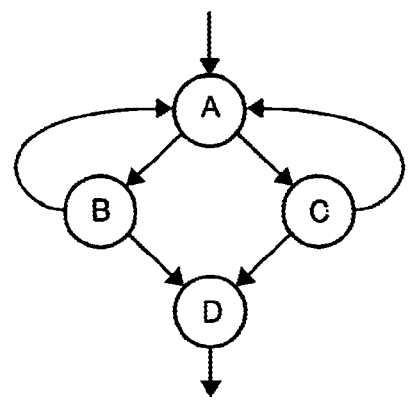
FIG. 23(a) shows an example reducible CDFG with a single loop as input to the collapse step of the accelerator generator step of FIG. 21.

FIG. 23(a) depicts an example CDFG of a single loop with multiple loop-back and loop-exit edges as input to the collapse step 4320 of the accelerator generator step of FIG. 21. In the CDFG, node A is the loop-entry node of the single loop that has two loop-back edges and two loop-exit edges. The node D is a single node that follows after loop termination. The CDFG is reducible but not series parallel.

Figure 23B:
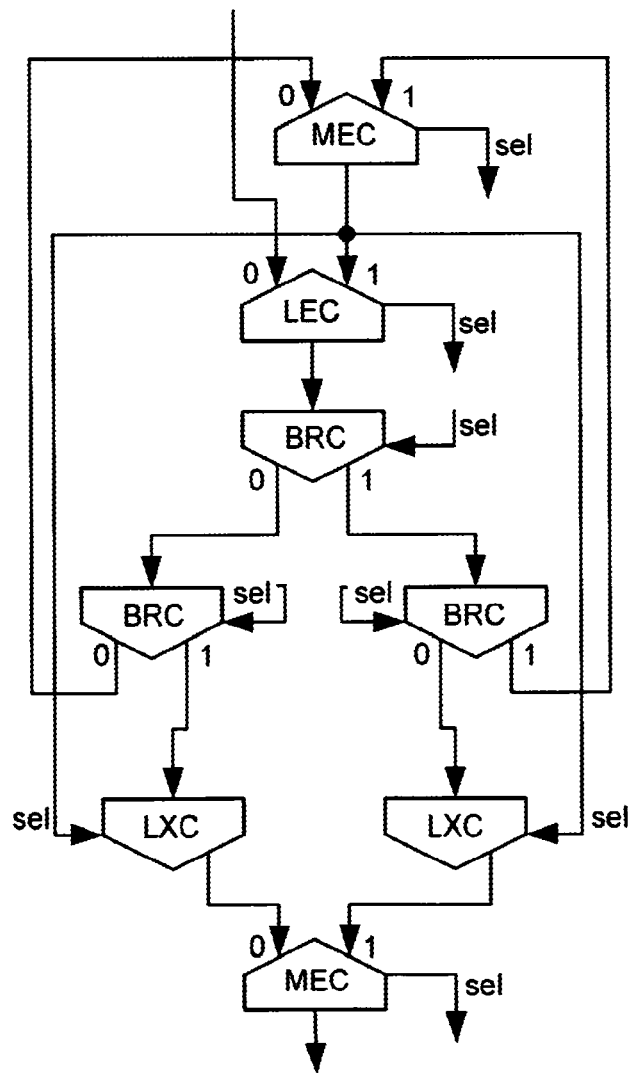
FIG. 23(b) shows the control structure of the collapsed CDFG of FIG. 23(a)

FIG. 23(b) gives the control structure associated with the collapsed CDFG of FIG. 23(a). The unconnected 'sel' inputs in FIG. 23(b) are to be driven by the respective DFG. The 'sel' outputs of the LEC nodes generate the selection tokens to control the corresponding dataflow loop-entry (LE) nodes (not shown in FIG. 23(b)) that select the other variables. Similarly, the 'sel' outputs of the MEC nodes generate the control tokens for the corresponding dataflow merge (ME) nodes (not shown in FIG. 23(b)).

Translate Process

Translate process 4350 generates a hardware description of the collapsed and optimized CDFG in the form of hardware specification 4399. Each computation node in the CDFG is instantiated as a corresponding RTL module with added control and optional buffering. Translate process 4350 instantiates and connects the modules. Most modules are predefined for a specific target in one or more standard libraries. Function call nodes are also treated as computational DFG nodes, where each function definition is generated as a separate RTL module.

In its hardware implementation, translate 4350 explicitly indicates the presence of a value (a token) on the DFG edge by the state of a handshake protocol.

A computation node buffers a single value (token) in a latch on its output port. A single bit latch keeps track of the full/empty state of the value buffer. In a preferred embodiment, the node has only one token buffer for the combined set of output edges. The single latch at each output of a computational node fits well to the typical FPGA organization, and effectively creates a deeply pipelined implementation that supports a high clock rate. As a consequence, the DFG execution schedule is an implicit result of the hardware token flow (token handshake). The single token buffer at each computation node represents a minimal buffering still avoiding deadlock. Optionally more buffer space (a FIFO) can be inserted in selected DFG edges, which potentially provides a higher computational throughput.

The DFG edge is reflected in the hardware implementation by a bundle of wires.

A set of wires, indexed [0:N−1], where N corresponds to the width in bits of the respective data type.

A 'request' wire. A high value indicates that the producer node actively offers a new token.

An 'acknowledge' wire. A high value indicates that the consumer node wants to consume a new token.

If during a clock cycle request and acknowledge are both raised, a token is transferred. Normally, an output value can be used by more than one consumer node. In that case some additional logic is required to implement the various handshake signals. In a preferred implementation, the outbound ack lines for the inputs do not combinatorially depend upon the inbound ack line of the output. This property helps to maintain a low logic depth (and small physical size), allowing a high clock rate.

Computation node types with minimal logic depth have no output buffer and operate strictly combinatorial. Examples are the bitwise logical operations, such as '&', '|', and '~' in C terminology. More complex node types, such as a multiply node, can have a deeper pipeline implementation to ensure a high clock rate. Note that function call nodes are also treated as computational DFG nodes, and typically will also have a deeper pipelined implementation.

In a preferred embodiment, a BR node implementation is extended with a small FIFO that buffers inbound selection tokens. This is relatively cheap, as these token values are only 1-bit wide. This extra buffering creates more parallelism (throughput) during the DFG execution.

The ME node is implemented with a hardware multiplexer. Since such multiplex units are relatively slow, they are followed by a latch (they are slow due to the high fanout (load) on the selection line). Additionally, the ME node implementation is extended with a small FIFO that buffers inbound selection tokens. This is relatively cheap, as these token values are only 1-bit wide. This extra buffering creates more parallelism (throughput) during the DFG execution. Furthermore, that buffering reduces the fanout on the node that creates the selection value. Since this fanout in particular can be very high, this has a positive effect on achievable clock rate.

An LE node is almost identical to a ME node, except that at least one extra storage location (buffer) is allocated for the inbound selection token. At reset, this buffer is initialized with a single token that selects the loop-entry input port. For the complementary LXC functionality, a regular branch node is applied. With the FIFO buffers applied in the select inputs of these phi nodes, the execution order of loops automatically supports loop pipelining. The pipelined operation—where different variables/computations in the loop body reach different loop counts at a given point in time—results from the implicitly obtained runtime/dynamic schedule.

During the translate process 4350, each call node in the DFG is normally replaced by instantiation of a module that implements the behavior of the called function with a dataflow handshake protocol on arguments and results, similar to regular computation nodes like 'add' and 'multiply'. Such function module is typically created by performing this same process 4300 on the called function. If a function is called at several locations in the program, this results in several instantiations of the same module, so each instantiation is typically implemented on its own hardware resources (computation nodes, control nodes, latches, fifo's).

For modules of significant size, an alternative implementation can share a single or few module instantiations to serve a larger number of calls. This sharing of hardware resources can lead to an implementation requiring less hardware, at the cost of a longer execution time. This represents a design trade-off, leading to additional implementation options on the curve 3001 in FIG. 19. This alternative implementation for sharing of hardware resources is implemented through the following steps:

a) An instantiation (call) to a shared module is not directly implemented by the requested module itself, but by a 'stub' module which mimics the module interface, and has an additional 'back door' interface to route the input/output token flow towards a concentrator module. This stub might implement local buffers on its input and/or output ports to support a more efficient use of the shared module through enhanced scheduling freedom. To avoid potential deadlocks in the system, a stub employs specific rules on when to activate the request on its 'back door' output. In a typical implementation, the back door output is activated when tokens are available on all inputs, and output buffers are available to latch the expected result tokens.

b) A concentrator module receives the 'back door' wires of several stub modules. The concentrator arbitrates over the interfaces of these stubs, and repeatedly selects one of the active interfaces to pass the request to its concentrated output. the concentrator remembers which interface caused this request, so that later it can pass the computed result value back to the requester. It is straightforward to remember this for several pending requests, to support pipelined operation.

c) An actual function module is connected to the concentrated output.

d) When a large number of calls is to be selected/arbitrated, multiple concentrator modules can be employed in a tree-like structure, which can help to maintain a high clock rate. In general, this tree can span over the entire process mapped to this accelerator, thus extend beyond function-body scope. This process-scope of the concentrator tree leads to extra 'back door' interfaces on the modules that implement function bodies.

e) An extended concentrated can have more than one output, as to distribute requests over more than one module for computation.

This scheme to reduce hardware resources for implementing function calls, is equally applicable to relatively large computation nodes like multipliers or dividers. This scheme to reduce hardware resources for implementing function calls, is also used to implement the memory load/store behavior. The load and store operations in the DFG are replaced by stubs, which pass their request to a tree of concentrators. At the top of the function call hierarchy of the process mapped to the accelerator, the concentrated result can be attached to a local memory block or to the on-chip memory bus to finally implement the load/store behavior. A concentrator for load/store traffic with multiple concentrated outputs directs each load/store request to one of the outputs based on address range partitioning. This scheme supports a non-uniform and distributed memory implementation of the system-on-chip. This results in more design implementation options, balancing the cost of local memories against the increased system execution speed or reduced system power consumption.

This scheme to reduce hardware resources for implementing function calls, is also applicable to implement intrinsic calls. In particular, system calls to the operating system kernel are not easily handled by a hardware accelerator. Replacing such intrinsic calls by stubs, allows routing the system call request to the boundary of the accelerator module. There, on this boundary, the request can be captured in a memory-mapped register, and an interrupt can be raised to a processor to request handling this call. The processor can perform the system call, for instance the Posix malloc( ) call, and can write the resulting value, for instance the malloc( ) result address, into the result-register at the accelerator boundary, from where the result value is passed back to the stub that issued the call.

Integrate Process

Figure 24:
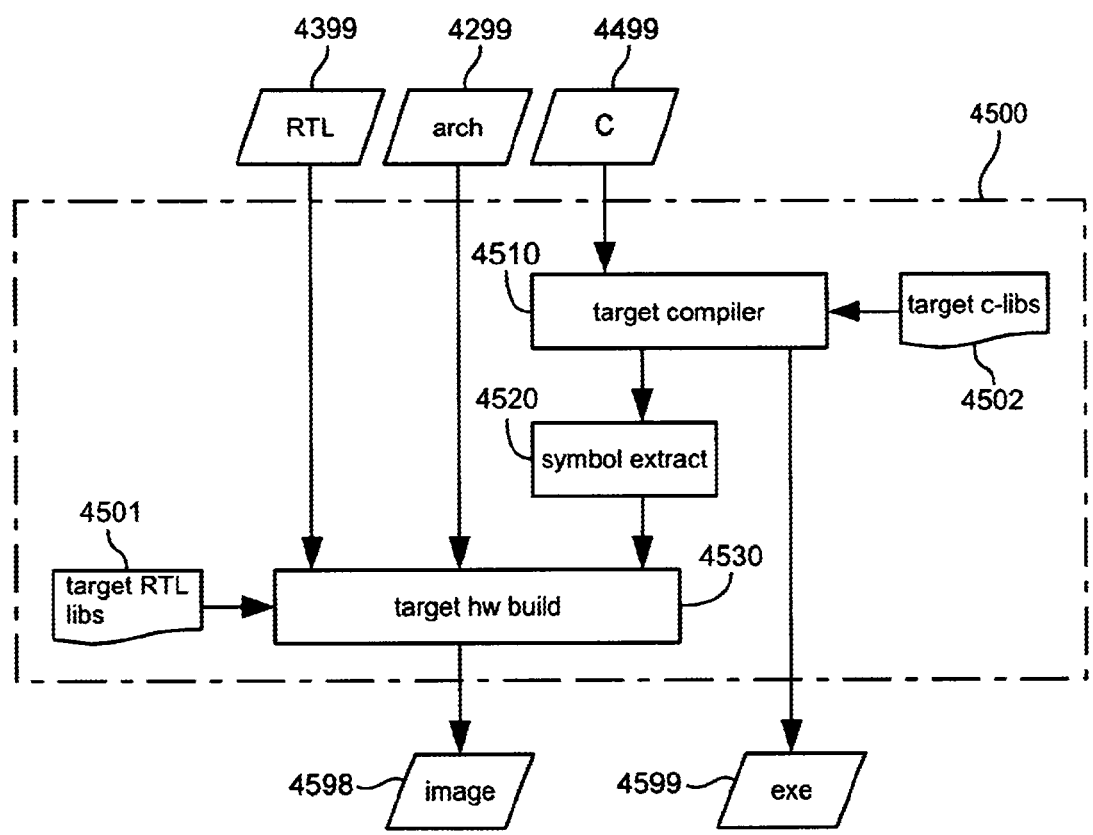
FIG. 24 shows the integrate process which creates the final configuration image and executable software from a hardware specification, architecture description and software source code as part of the process of FIG. 19 in more detail.

FIG. 24 depicts the integrate process 4500 which creates the final configuration image 4598 and executable software 4599 from the hardware specification 4399, architecture description 4299 and software source code 4499. To this end the integrate process preferably relies on well-known tools such as a compiler and linker for the target CPU, and logic synthesizers and floorplan placement- and routing-tools for hardware design.

The accelerators generated by accelerator generator process 4300 in a preferred embodiment directly generates addresses to access global variables in the program. In this embodiment, step 4520 extracts such software symbol addresses from the compiled and linked software 4599 and passes these addresses to the hardware build process 4530. This allows the hardware build to be performed with constant addresses, allowing for more compact hardware as result of 'constant expression elimination' during logic synthesis.

Additionally, the integrate process may provide link specifications to direct the target compiler to map certain program variables into selected (on-chip) random access memories. Such dedicated mapping of variables into memories can significantly reduce off-chip memory traffic, on-chip memory contention, and memory latencies, thereby improving performance/cost ratio of the resulting system.

Embedded operating systems that do not utilize a memory management unit (MMU) typically allocate static symbols starting from address 0 in the software image. The operating system defines the address offset to the actual memory location when loading the image. The standard software approach of patching all static symbol addresses with this offset at load time would require a programmable register for each such address in the accelerator, incurring a high area penalty. Therefore, preferably the control processor stores the base and size of the static symbol address range in the accelerator at load time. The accelerator then adds the offset to all outgoing symbol addresses within this specified range. This approach allows the above benefits of hardwired addresses in the accelerator using only a single adder to comply to typical embedded operating system's allocation schemes.

The embedded system 4999 finally is obtained by creating the actual hardware from the final configuration image 4598 and loading the software 4599 onto this hardware.

Besides or instead of compiling towards a specific hardware target platform, integrate process 4500 may also compile towards a virtual emulation platform, which runs on a host computer. This saves development cost and decreases development time because mistakes are noted earlier and no expensive hardware needs to be produced To create the emulation program, another translation step (not shown) converts the hardware specification 4399 into software source code, e.g. in the C language, that models the hardware behavior. Such translation is well-known technology, for example provided by the public domain Verilator software. For high-speed operation of the emulator, the source code for the target is compiled to run natively on the host computer. More specifically, that code is not executed by simulation of a target processor.

To allow such native execution, the hardware model memory interface obtains an execution stub which performs the hardware model memory read and write operations directly in the host computer memory. To build such an emulator, linking of symbols between the C source code and the RTL-to-C model is required. This linking can be done through two features: a) any mapping of symbols to dedicated memory instances is ignored, and b) symbol addresses for the RTL are provided in a symbolic way (by the symbol names), as to resolve these by a regular linking step in building the emulator.

The virtual emulation platform or 'emulator' models each hardware resource as a thread on the host computer. It is important that the host computer schedules said threads in a way that strongly resembles the actual execution progress in the real embedded system 4999. For example, if the emulator models a processor and an accelerator as two threads, then the relative pace of progression of these threads in the emulator must match the relative execution speed of said processor and accelerator in the real embedded system 4999.

To achieve this goal, in a preferred embodiment each thread in the virtual emulation platform updates a private timer when it executes operations or when it waits for other threads. To synchronize the private timers, a global variable num_threads is maintained that contains the number of threads that need to be synchronized. In addition, a global timer is maintained that contains the current 'fence time', i.e. the time point until which any thread is allowed to progress. Each time a thread increases its private timer, it checks that it is not crossing the fence time. If it is crossing the fence time then the thread puts itself to sleep and increments the global num_sleeping counter.

The last thread to arrive at the fence behaves differently: it checks whether the global counter num_kicked equals num_threads and num_sleeping equals (num_threads−1). If so, this last thread resets the global counter num_kicked to 1, increases the global fence time by a fixed amount defined as window_size, wakes up all sleeping threads and finally this last thread continues execution. A thread that wakes up always increments the num_kicked variable and decrements the num_sleeping variable. The above scheme guarantees that the threads never get out of sync by a range more than two times the defined amount window_size.

The reason for maintaining the second counter num_kicked is to allow a thread to reliably detect that it is the last thread to arrive at the fence time. A simpler test such as "num_sleeping equals num_threads minus 1" is not good enough, because that also includes the case where none of the other threads have actually woken up from their previous wake-up signal.

Cloud Computing

The invention may be deployed on a computer system local to the user. In an alternative embodiment, the invention is deployed as a web-based service. Such a Software-as-a-Service (SaaS) model has a number of benefits that further complement the invention. The SaaS model allows executing the invention in a scalable computing platform, such as Amazon EC2. Analysis, transformation, estimation, and generation of a design, as well as execution of the resulting virtual prototype benefit from scalable parallel computing. Deploying the invention as a software service allows the benefits of scalable and parallel computing without requiring the user to invest in a parallel computing platform.

In the SaaS approach, pattern detectors 1220 may run in parallel on different CPUs. In a preferred embodiment, the complete analysis step 1200 may run in parallel on multiple computers using a MapReduce algorithm in which the analysis step is mapped to different test data and the merge step 1290 reduces the trees 1229 from each analysis step 1200 to a merged tree 1299. Said parallel execution allows a quick analysis of a large data set where each computer analyzes part of the data set. To further increase code coverage and thereby increase the accuracy of the analysis, parallel analysis is run using random input stimuli generators.

The transform 2200 and optimization step 2400 benefit from parallel execution, where multiple seed designs and bottlenecks are transformed in parallel. Such parallel transform and optimization increases the number of design points that can be explored in a given time period. The resulting pareto curve has more design points with more efficient designs. In a preferred embodiment, the transform and optimization steps 2200 and/or 2400 use a MapReduce algorithm in which a seed design 2298 is mapped to different transformations, and the resulting design alternatives are reduced to pareto points in step 2500. In a preferred embodiment, different nodes in the tree are also estimated in parallel. A preferred design database as discussed in 'Design management' above stores each design alternative as a new design rather than overwriting a previous (seed) design. This functional behavior of the design database facilitates parallel transformation of the designs.

Generation of the embedded system includes logic synthesis and placement and route tools, which are known to speed up with parallel execution or increase the quality of the resulting design with parallel execution. An additional benefit of the SaaS approach is that all licenses required for all design components can be installed in the computing platform while the user only pays for the particular design components used in a selected design. With all licenses available, the transform 2200 or optimization 2400 steps create and display design points on the design space curve 3001 that are based on licensed design components. The user can subsequently select an optimal design point from a large range of design alternatives and only pay for the design components used in the selected design.

In a preferred embodiment, the generated emulation platform executes on multiple CPUs to reduce execution time. In a scalable computing environment, different instances of the virtual prototype execute in parallel with random input stimuli to quickly verify the correctness of a transformed design.

In a preferred embodiment, said virtual emulation platform either executes the different processes 9131 in a design in parallel or randomly schedules the execution of these processes to verify the synchronization of inter-process communication.

Closing Remarks

The above provides a description of several useful embodiments that serve to illustrate and describe the invention. The description is not intended to be an exhaustive description of all possible ways in which the invention can be implemented or used. The skilled person will be able to think of many modifications and variations that still rely on the essential features of the invention as presented in the claims. In addition, well-known methods, procedures, components, and circuits have not been described in detail.

The invention is preferably implemented in a computer program product, i.e. a collection of computer program instructions stored on a computer readable storage device for execution by a computer. The instructions of the present invention may be in any interpretable or executable code mechanism, including but not limited to scripts, interpretable programs, dynamic link libraries (DLLs) or Java classes. The instructions can be provided as complete executable programs, as modifications to existing programs or extensions ("plugins") for existing programs. Moreover, parts of the processing of the present invention may be distributed over multiple computers or processors for better performance, reliability, and/or cost.

Storage devices suitable for storing computer program instructions include all forms of non-volatile memory, including by way of example semiconductor memory devices, such as EPROM, EEPROM, and flash memory devices, magnetic disks such as the internal and external hard disk drives and removable disks, magneto-optical disks and CD-ROM disks. The computer program product can be distributed on such a storage device, or may be offered for download through HTTP, FTP or similar mechanism using a server connected to a network such as the Internet. Transmission of the computer program product by e-mail is of course also possible.

When constructing or interpreting the claims, any mention of reference signs shall not be regarded as a limitation of the claimed feature to the referenced feature or embodiment. The use of the word "comprising" in the claims does not exclude the presence of other features than claimed in a system, product or method implementing the invention. Any reference to a claim feature in the singular shall not exclude the presence of a plurality of this feature. The word "means" in a claim can refer to a single means or to plural means for providing the indicated function.

The invention claimed is:

1. A computer-implemented method of automatically generating an embedded system on the basis of an original computer program, which embedded system provides a parallelized hardware and software implementation of the original computer program, which parallellized implementation satisfies one or more predetermined criteria regarding hardware constraints of the embedded system, characterized by a step of analyzing the original computer program, comprising a step of compiling the original computer program into an executable to obtain control data flow graphs with static data dependencies and static data types, and a step of executing the executable on a host computer using test data, comprising observing a working memory of the host computer during the executing of the executable identifying sets of load and store operations of the original computer program that access the same memory locations as dynamic data dependencies, and representing said dynamic data dependencies in a dynamic tree, a step of representing the static data dependencies in a static tree from the obtained control data flow graphs, a step of merging the static tree and dynamic tree into a merged tree, being a data structure capturing the behavior of the original computer program, where in the merged tree the static data dependencies in the static tree are complemented with the dynamic data dependencies in the dynamic tree, a step of transforming the original computer program into an intermediary computer program that exhibits multi-threaded parallelism with inter-thread communication, which comprises identifying in the merged tree at least one dynamic data dependency that crosses a thread boundary, which dependency comprises a particular communication pattern that observes ordering relations among a set of load and store operations, where the store operations of the set are on a side of the thread boundary opposite to the side of the load operations, identifying in the control data flow graph the load and store operations from the merged tree that have the particular communication pattern to provide identified load and store operations, and converting said identified load and store operations in the identified control data flow graph from said dynamic data dependency into read/write access to a buffered communication channel with read/write access, by transforming instructions in the intermediary computer program that correspond to said identified load and store operations in the control data flow graph into instructions that implement said buffered communication channel with read/write access, the intermediary computer program employing a process network representing an assignment of program elements to processes or threads and an assignment of read and write operations in a transformed intermediary computer program to buffered communication channels between processes, using said process network, and a step of building the parallelized hardware and software implementation from the transformed intermediary computer program, comprising a step of compiling the transformed intermediary computer program to obtain the software implementation, wherein the parallelized hardware and software implementation are generated via a generate step that generates an architecture description and involves an acceleration step to convert the program function into register transfer level, which are then subjected to an integrate process, and wherein the parallelized hardware and software implementation exhibit an implementation of the process network and operate in parallel without further dynamic data dependency analysis.

2. The method of claim 1, in which the communication pattern in question is a saw tooth pattern, where one function executes stores with an address pattern that increases by a fixed amount, then at a given point wraps back to a lower address from where the pattern repeats.

3. The method of claim 1, in which the communication pattern in question is a first-in-first-out pattern, where a value is always stored and loaded exactly once, and the values are loaded in exactly the same order as they are stored.

4. The method of claim 1, in which the step of compiling comprises causing the executable to be annotated with extra code fragments that include one or more instructions that output observations regarding the dynamic behavior of the original computer program, in particular regarding loop nesting and loop iteration counts, which observations become part of said communication pattern, and in which the step of converting identified dynamic data dependencies that cross a thread boundary in the intermediary program is done on the basis of the observations that are output by the extra code fragments.

5. The method of claim 1 or 4, in which event tokens in an annotation stream or the observations are used to decide whether the dynamic data dependency fits the ordering requirements of a "distribute loop" parallelization, and only parallelizing the corresponding part of the original computer program if this is the case.

6. The method of claim 1, where the communication pattern indicates a data dependency into or out of a parallel loop, which dependency is accommodated by plain variables with repeated dereferencing, and avoiding the buffered channel conversion for this dependency.

7. The method of claim 1, comprising executing the step of transforming multiple times, each time varying the number of created threads in the intermediary computer program and the exact locations in the program where the threads are separated from each other to obtain multiple intermediary computer programs, followed by a step of evaluating each of the multiple intermediary computer programs based on at least one evaluation criterion, such as estimated implementation cost or performance of the embedded system, and generating the embedded system from one of the multiple intermediary computer programs that best matches the one or more evaluation criterion.

8. The method of claim 1, comprising executing the step of analyzing multiple times, each time using different sets of test data to produce different sets of data dependencies, followed by a step of merging each set of identified data dependencies into a single set of data dependencies, where this single set is structured as had it resulted from a single program execution on a the combined test data.

9. The method of claim 1, in which the analysis process recognizes updates to the available memory space, such as through free()and malloc()function calls from the C library, and disregards detected dependencies between load/store operations that occur before and after these memory space updates.

10. The method of claim 1, in which the step of analyzing the original computer program comprises generating structural and behavioral program models that provide indications of at least one of: the run time of every function invocation, the run time of every loop body invocation, the number of times each loop body is executed, indications of memory dependencies and indications of streaming dependencies.

11. The method of claim 1, in which at least one thread from the intermediary computer program is converted into a dedicated hardware accelerator that performs the thread's functionality in the embedded system operating in parallel to a processor that executes at least one thread of the software implementation.

12. The method of claim 1, in which the buffered communication channel is dimensioned based on static data type information in the static tree of the merged tree and on execution count information of the particular communication pattern in the dynamic tree of the merged tree.

13. A computer system for automatically generating an embedded system on the basis of an original computer program, which embedded system provides a parallelized hardware and software implementation of the original computer program, which parallellized implementation satisfies one or more predetermined criteria regarding hardware constraints of the embedded system comprising: a processor, a memory having code executed by the processor to perform operations, the operations comprising:

a step of analyzing the original computer program, comprising a step of compiling the original computer program into an executable to obtain control data flow graphs with static data dependencies and static data types, and a step of executing the executable using test data, comprising observing a working memory of the host computer during the executing of the executable identifying sets of load and store operations of the original computer program that access the same memory locations as dynamic data dependencies, to provide a dynamic tree representing dynamic data dependencies as communication patterns between load and store operations of the original computer program, and a step of representing the static data dependencies in a static tree from the obtained control data flow graphs, a step of merging the static and dynamic trees into a merged tree, being a data structure capturing the behavior of the original computer program, where in the merged tree the static data dependencies in the static tree are complemented with the dynamic data dependencies in the dynamic tree, a step of transforming the original computer program into an intermediary computer program that exhibits multi-threaded parallelism with inter-thread communication, which comprises identifying in the merged tree at least one dynamic data dependency that crosses a thread boundary which dependency comprises a particular communication pattern that observes ordering relations among a set of load and store operations, where the store operations of the set are on a side of the thread boundary opposite to the side of the load operations, identifying in the control data flow graph the load and store operations from the merged tree that have the particular communication pattern to provide identified load and store operations, and, and converting said identified load and store operations in the identified control data flow graph into read/write access to a buffered communication channel with read/write access, by transforming instructions in the intermediary computer program that correspond to said identified load and store operations in the control data flow graph into instructions that implement said buffered communication channel with read/write access, the intermediary computer program employing a process network representing an assignment of program elements to processes or threads and an assignment of read and write operations in the transformed intermediary computer program to buffered communication channels between processes using said process network, and a step of building the parallelized hardware and software implementation from the transformed intermediary computer program, comprising a step of compiling the transformed intermediary computer program, wherein the parallelized hardware and software implementation are generated via a generate step that generates an architecture description and involves an acceleration step to convert the program function into register transfer level, which are then subjected to an integrate process, and wherein, to obtain the software implementation, the parallelized hardware and software implementation exhibiting an implementation of the process network and operating in parallel without further dynamic data dependency analysis.

14. The method of claim 1 wherein the program elements are functions and loops.

15. The system of claim 13 wherein the program elements are functions and loops.

* * * * *